United States Patent
Kawamoto

(10) Patent No.: US 10,782,687 B2
(45) Date of Patent: Sep. 22, 2020

(54) DRIVING CONTROL APPARATUS, DRIVING CONTROL METHOD, AND PROGRAM

(71) Applicant: Sony Corporation, Tokyo (JP)

(72) Inventor: Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 15/761,837

(22) PCT Filed: Sep. 16, 2016

(86) PCT No.: PCT/JP2016/077432
§ 371 (c)(1),
(2) Date: Mar. 21, 2018

(87) PCT Pub. No.: WO2017/057059
PCT Pub. Date: Apr. 6, 2017

(65) Prior Publication Data
US 2018/0284774 A1 Oct. 4, 2018

(30) Foreign Application Priority Data
Sep. 30, 2015 (JP) .................. 2015-194555

(51) Int. Cl.
*G05D 1/00* (2006.01)
*B60W 50/08* (2020.01)
(Continued)

(52) U.S. Cl.
CPC .......... *G05D 1/0088* (2013.01); *B60W 30/085* (2013.01); *B60W 30/09* (2013.01);
(Continued)

(58) Field of Classification Search
CPC .. G05D 1/0088; G05D 1/0246; G05D 1/0257; G05D 1/0278; G05D 2201/0213;
(Continued)

(56) References Cited

U.S. PATENT DOCUMENTS 9,766,625 B2 9/2017 Boroditsky et al.
10,077,056 B1 9/2018 Fields et al.
(Continued)

FOREIGN PATENT DOCUMENTS

DE 11 2012 007 124 T5 7/2015
EP 1 045 173 A2 10/2000
(Continued)

OTHER PUBLICATIONS

Extended European Search Report dated Apr. 24, 2019 in connection with European Application No. 16851233.3.
(Continued)

*Primary Examiner* — Calvin Cheung
(74) *Attorney, Agent, or Firm* — Wolf, Greenfield & Sacks, P.C.

(57) ABSTRACT

The present disclosure relates to a driving control apparatus, a driving control method, and a program that can resolve a conflict between a deliberate action and a reflex action during determination of a next action in autonomous driving.

During autonomous driving, a reflex action is determined as a simplified action on the basis of detection results detected by a variety of sensors provided in a vehicle, and a deliberate action ranked higher than a reflex action is determined through elaborate processing. A plurality of resolution modes are made available to deal with a possible conflict between the reflex action and the deliberate action, and by which of the resolution modes the conflict is resolved is specified in advance so that the conflict is resolved by the specified resolution mode. The present disclosure is applicable to motor vehicles that drive autonomously.

18 Claims, 28 Drawing Sheets

(51) Int. Cl.
*B60W 50/10* (2012.01)
*B60W 30/09* (2012.01)
*B60W 30/085* (2012.01)
*B60W 30/14* (2006.01)
*G01C 21/26* (2006.01)
*B60W 30/10* (2006.01)
*B60W 30/182* (2020.01)
*B60W 50/00* (2006.01)
*G08G 1/16* (2006.01)
*B60W 50/14* (2020.01)
*G05D 1/02* (2020.01)

(52) U.S. Cl.
CPC ............ *B60W 30/10* (2013.01); *B60W 30/14* (2013.01); *B60W 30/182* (2013.01); *B60W 50/0098* (2013.01); *B60W 50/082* (2013.01); *B60W 50/085* (2013.01); *B60W 50/10* (2013.01); *B60W 50/14* (2013.01); *G01C 21/26* (2013.01); *G08G 1/16* (2013.01); *B60W 2554/00* (2020.02); *G05D 1/0246* (2013.01); *G05D 1/0257* (2013.01); *G05D 1/0278* (2013.01); *G05D 2201/0213* (2013.01)

(58) Field of Classification Search
CPC ...... B60W 30/09; B60W 30/10; B60W 30/14; B60W 30/182; B60W 50/0098; B60W 50/082; B60W 50/085; B60W 50/10; B60W 50/14; B60W 30/085; B60W 2550/10; G01C 21/26; G08G 1/16
See application file for complete search history.

(56) References Cited

U.S. PATENT DOCUMENTS

| | | | |
|---|---|---|---|
| 10,239,538 B1 | 3/2019 | Fields et al. | |
| 2012/0083960 A1* | 4/2012 | Zhu | G05D 1/0214 701/23 |
| 2013/0338877 A1* | 12/2013 | Straus | G08G 1/161 701/41 |
| 2015/0166069 A1 | 6/2015 | Engelman et al. | |
| 2015/0189241 A1* | 7/2015 | Kim | G06F 3/013 348/148 |
| 2015/0274162 A1 | 10/2015 | Sato | |
| 2015/0360697 A1* | 12/2015 | Baek | B60W 40/09 701/23 |
| 2015/0364039 A1* | 12/2015 | Cudak | G01C 21/26 701/23 |
| 2016/0026182 A1 | 1/2016 | Boroditsky et al. | |
| 2017/0088142 A1* | 3/2017 | Hunt | B60W 40/09 |
| 2017/0135621 A1* | 5/2017 | Lee | A61B 5/163 |
| 2017/0229029 A1* | 8/2017 | Klinger | G05D 1/0214 |
| 2017/0297586 A1* | 10/2017 | Li | B60W 50/0098 |
| 2018/0072315 A1 | 3/2018 | Enthaler et al. | |
| 2018/0259956 A1 | 9/2018 | Kawamoto | |

FOREIGN PATENT DOCUMENTS

| | | | |
|---|---|---|---|
| EP | 2 314 490 A1 | 4/2011 |
| JP | 07-108849 A | 4/1995 |
| JP | 2002-195063 A | 7/2002 |
| JP | 2006-349003 A | 12/2006 |
| JP | 2008-180591 A | 8/2008 |
| JP | 2008-290680 A | 12/2008 |
| JP | 2010-221858 A | 10/2010 |
| JP | 2015-011458 A | 1/2015 |
| JP | 2015-058902 A | 3/2015 |
| JP | 2015-089801 A | 5/2015 |

OTHER PUBLICATIONS

International Search Report and Written Opinion and English translation thereof dated Dec. 13, 2016 in connection with International Application No. PCT/JP2016/077432.
International Preliminary Report on Patentability and English translation thereof dated Apr. 12, 2018 in connection with International Application No. PCT/JP2016/077432.
International Search Report and Written Opinion and English translation thereof dated Dec. 6, 2016 in connection with International Application No. PCT/JP2016/077433.
International Preliminary Report on Patentability and English translation thereof dated Apr. 12, 2018 in connection with International Application No. PCT/JP2016/077433.
Extended European Search Report dated Apr. 24, 2019 in connection with European Application No. 16851234.1.
U.S. Appl. No. 15/761,884, filed Mar. 21, 2018, Kawamoto.
Japanese Office Action dated Jun. 9, 2020 in connection with Japanese Application No. 2017-543147 and English translation thereof.

* cited by examiner

FIG.12

| Go or No-go | | DELIBERATE ACTION | | | |
|---|---|---|---|---|---|
| | | G/G | G/N | N/G | N/N |
| REFLEX ACTION | G/G | G | G | G | △ |
| | G/N | G | G | □ | N |
| | N/G | G | □ | N | N |
| | N/N | △ | N | N | N |

DRIVING CONTROL APPARATUS, DRIVING CONTROL METHOD, AND PROGRAM

CROSS-REFERENCE TO RELATED APPLICATIONS

This application claims the benefit under 35 U.S.C. § 371 as a U.S. National Stage Entry of International Application No. PCT/JP2016/077432, filed in the Japanese Patent Office as a Receiving Office on Sep. 16, 2016, which claims priority to Japanese Patent Application Number JP2015-194555, filed in the Japanese Patent Office on Sep. 30, 2015, each of which is hereby incorporated by reference in its entirety.

TECHNICAL FIELD

The present disclosure relates to a driving control apparatus, a driving control method, and a program, and more particularly, to a driving control apparatus, a driving control method, and a program that ensure improved safety and comfort in autonomous driving of a movable apparatus such as motor vehicle.

BACKGROUND ART

So-called autonomous driving technology that permits driving of a motor vehicle or other vehicle using vehicle-mounted sensors, typically GPS (Global Positioning System), without driver's maneuver is on its way to materializing (refer, for example, PTL 1).

CITATION LIST

Patent Literature

[PTL 1]
JP 2008-290680A

SUMMARY

Technical Problems

Incidentally, sensors are installed in motor vehicles to monitor a variety of conditions such as speed, acceleration, and position. In autonomous driving, a next action is determined on the basis of ever-changing detection results detected by these various sensors.

However, some actions in autonomous driving such as selection of a route and a driving lane in consideration of traffic jams require processing time to determine using a plurality of detection results such as current position information, traveling speed, congestion in surrounding area, and prospect of congestion, whereas other actions in autonomous driving such as avoiding collision with someone rushing out in front of the motor vehicle or with other motor vehicle have little time to spend on decision.

Even when these processes, whose processing times required for these actions are different, are carried out in parallel, if a conflict occurs between requested actions, there has been a possibility that safe autonomous driving may not be realized as a result of wrong selection of an action.

Also, even if safe autonomous driving that permits reliable travel to a destination is realized, there has been a possibility that driving tailored to preferences of a driver (user) may not necessarily be realized, resulting in failure to realize comfortable driving.

That is, for example, when the vehicle is braked, one may feel that the vehicle is braked earlier than he or she would during driving, or conversely, later. As a result, simply riding in the vehicle may result in stress. Thus, although the vehicle can be driven safely because of autonomous driving, there has been a possibility that one may feel stressed while riding or comfortable driving may not be realized.

The present disclosure has been devised in light of the above problems, and it is particularly an object of the present disclosure to ensure improved safety and comfort during travel by autonomous driving.

Solution to Problems

A driving control apparatus of an aspect of the present disclosure includes a detection section, a deliberate action determination section, a reflex action determination section, and an action control section. The detection section detects a condition of a moving object. The deliberate action determination section determines an action of the moving object as a deliberate action on the basis of a detection result of the detection section. The reflex action determination section determines, on the basis of the detection result of the detection section, an action of the moving object in a shorter time period than a process carried out by the deliberate action determination section. The action control section controls the action of the moving object on the basis of the deliberate action and a reflex action determined by the reflex action determination section.

The deliberate action determination section can be caused to include a local processing section, a global processing section, and a behavior determination section. The local processing section extracts local information around the moving object on the basis of the detection result of the detection section. The global processing section extracts global information in a wider area than around the moving object on the basis of the detection result of the detection section. The behavior determination section determines an action on the basis of the local information and the global information.

The action control section can be caused to perform control such that if a conflict occurs between the deliberate action and the reflex action, the occurrence of the conflict is presented.

The action control section can be caused to resolve the conflict in response to input from the driver and control the action of the moving object on the basis of the deliberate action and the reflex action.

The action control section can be caused to store a plurality of resolution modes in advance to deal with a conflict between the deliberate action and the reflex action, resolve the conflict in accordance with one of the plurality of resolution modes, and control the action of the moving object on the basis of the deliberate action and the reflex action.

The resolution modes can be caused to include a first resolution mode that gives priority to the deliberate action or the reflex action, a second resolution mode that selects 'first come priority' or 'replace with last come' between the deliberate action and the reflex action, a third resolution mode that gives priority to the deliberate action or the reflex action, whichever is higher in terms of command priority level or action environment certainty level, a fourth resolution mode that takes a weighted average or majority decision using both the deliberate action and the reflex action, a fifth resolution mode that adds the fact that the deliberate action and the reflex action are opposed to each other to the input so that recalculation is performed by the two, a sixth resolution mode that gives priority to the priority level of the command itself for the deliberate action and the reflex action, a seventh resolution mode that stops the vehicle without issuing either of the deliberate action or the reflex action or maintains the current state, and an eighth resolution mode that allows the driver of the moving object to intervene.

The action control section can be caused to display a slide bar that can be operated to specify a parameter that is used when the deliberate action and the reflex action are determined and control the action of the moving object on the basis of the deliberate action and the reflex action determined by using the parameter whose value is proportional to the position of the slide bar operated by the driver.

The action control section can be caused to control the action during autonomous driving control of the moving object on the basis of the deliberate action and the reflex action.

A driving control method of an aspect of the present disclosure includes the steps of detecting a condition of a moving object, determining an action of the moving object as a deliberate action on the basis of a detection result of the condition of the moving object, determining, on the basis of the detection result, an action of the moving object in a shorter time period than a process carried out by the deliberate action determination section, and controlling the action of the moving object on the basis of the deliberate action and a reflex action determined in a shorter time period than the process for determining the deliberate action.

A program of an aspect of the present disclosure is a program that causes a computer to function as a detection section, a deliberate action determination section, a reflex action determination section, and an action control section. The detection section detects a condition of a moving object. The deliberate action determination section determines an action of the moving object as a deliberate action on the basis of a detection result of the detection section. The reflex action determination section determines, on the basis of the detection result of the detection section, an action of the moving object in a shorter time period than a process carried out by the deliberate action determination section. The action control section controls the action of the moving object on the basis of the deliberate action and a reflex action determined by the reflex action determination section.

In an aspect of the present disclosure, a condition of a moving object is detected, an action of the moving object is determined as a deliberate action on the basis of a detection result, an action of the moving object is determined in a shorter time period than a process for determining the deliberate action, and the action of the moving object is controlled on the basis of the deliberate action and a reflex action determined in a shorter time period than the process for determining the deliberate action.

Advantageous Effect of Invention

According to an aspect of the present disclosure, it is possible to ensure improved safety and comfort during travel by autonomous driving.

BRIEF DESCRIPTION OF DRAWINGS

FIG. 12 is a diagram describing an example in which occurrence of a conflict is suppressed.

DESCRIPTION OF EMBODIMENTS

Figure 1:
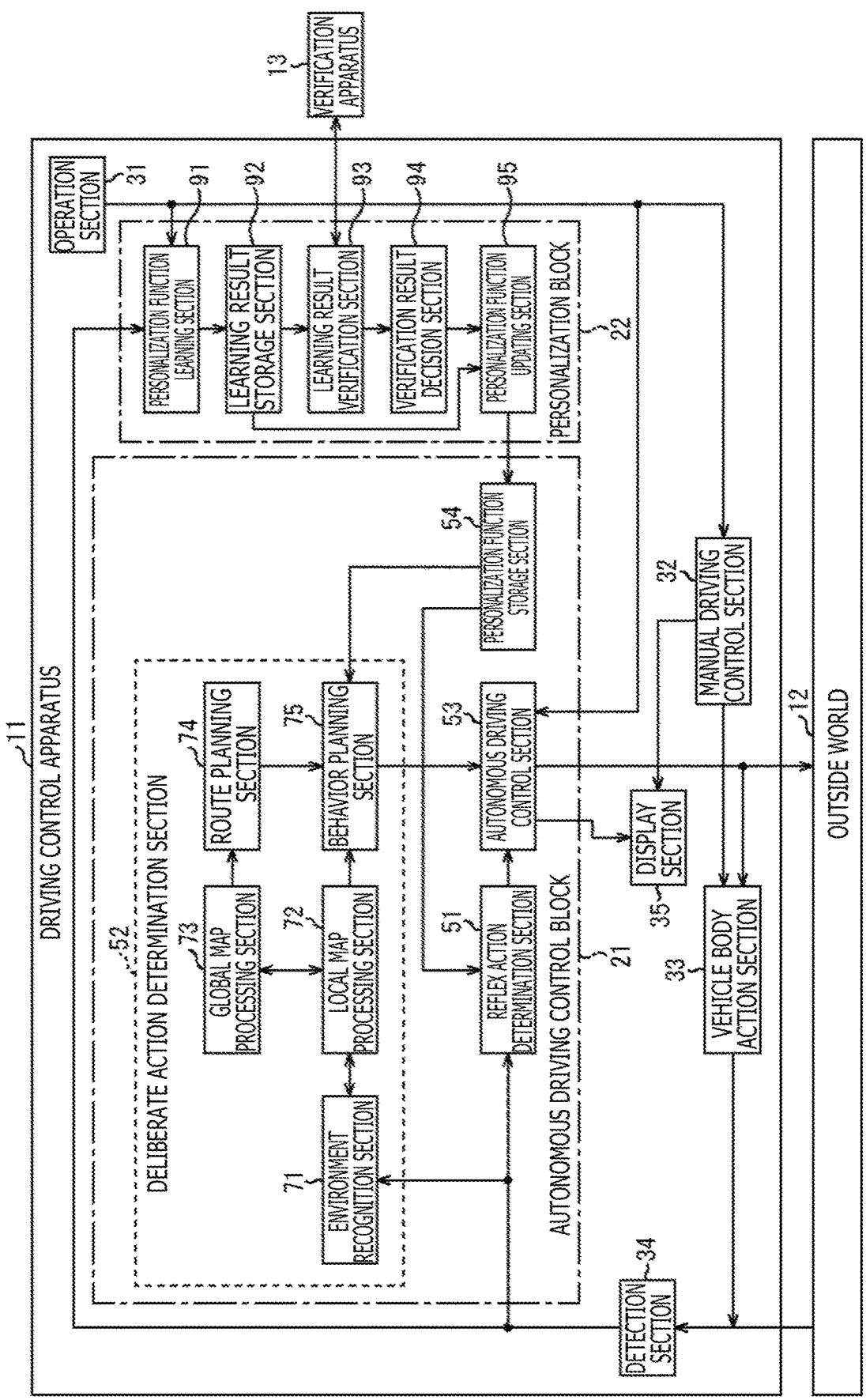
FIG. 1 is a diagram describing a configuration example of a driving control apparatus to which the present disclosure is applied.

A detailed description will be given below of preferred embodiments of the present disclosure with reference to accompanying drawings. It should be noted that components having substantially the same functional configuration are denoted by the same reference numeral in the present specification and the drawings to avoid duplicate descriptions.

Also, a description will be given in the following order:
1. Embodiment of the present disclosure
2. First modification example
3. Second modification example
4. First application example
5. Second application example 1. Embodiment of the Present Disclosure <Configuration Example of the Driving Control Apparatus>

FIG. 1 is a block diagram describing a configuration example of an embodiment of a motor vehicle driving control apparatus to which the present disclosure is applied.

The driving control apparatus depicted in FIG. 1 is mounted to a motor vehicle to control the driving thereof. It should be noted that although a description will be given by taking, as an example, the driving control apparatus depicted in FIG. 1 that controls the driving of a motor vehicle, the driving control apparatus is applicable to other vehicles and so on so long as the vehicle can be driven (piloted) by a driver (including a pilot).

Although a driving control apparatus 11 depicted in FIG. 1 controls the driving of a motor vehicle, there are two driving modes. A first mode is manual driving mode in which a driver drives a motor vehicle by operating a brake and a steering. A second mode is autonomous driving mode in which the motor vehicle is driven automatically without driver intervention into driving operation.

This driving mode can be selectively specified by the user, and the driving control apparatus 11 controls the motor vehicle driving in the specified driving mode.

To be more specific, in manual driving mode, the driving control apparatus 11 generates, by learning, a personalization function that reflects driving habits and customs and so on of each driver based on detection results of a detection section 34. The detection section includes a variety of sensors that are linked to details of operation of an operation section 31 by the driver such as details of operation of the steering and the brake (e.g., steering angle and pedal depression force), an outside world 12, and motor vehicle body behavior. The driving control apparatus 11 updates the personalization function when the driving ends.

In autonomous driving mode, on the other hand, the driving control apparatus 11 controls a vehicle body action section 33 that includes a plurality of components that activate the outside world 12 and the motor vehicle body, acquires detection results of the detection section 34 that includes a variety of sensors linked to the outside world 12 and the motor vehicle body, and determines the action of each of the components making up the vehicle body action section 33 to realize autonomous driving.

Further, when the driving control apparatus 11 determines, in autonomous driving mode, an action of each of the components making up the vehicle body action section 33 based on a detection result of the detection section 34 that includes various sensors, the driving control apparatus 11 corrects an operative action using the personalization function obtained by learning, and realizes autonomous driving tailored to driver's habits and customs by activating each of various components making up the vehicle body action section 33.

To be more specific, in autonomous driving mode, the driving control apparatus 11 finds two kinds of actions, a deliberate action and a reflex action, based on the detection result of the detection section 34, and determines a final autonomous driving action based on the found two kinds of actions.

Here, a deliberate action refers to an action that is determined with sufficiently high accuracy through elaborate processing by using the detection result of the detection section 34 although it requires a relatively long processing time. A deliberate action is used when an action requiring an extremely small amount of time is not needed.

On the other hand, a reflex action of the detection section 34 refers to an action that is determined speedily without spending much time through simpler processing than that for determining a deliberate action. A reflex action is used primarily when an action is needed in a short time period.

The driving control apparatus 11 determines details of the action of each of the various components making up the vehicle body action section 33 to realize autonomous driving by using these deliberate and reflex actions.

To be more specific, the driving control apparatus 11 includes an autonomous driving control block 21, a personalization block 22, an operation section 31, a manual driving control section 32, a vehicle body action section 33, a detection section 34, and a display section 35.

The autonomous driving control block 21 controls the action of each of components making up the vehicle body action section 33 in autonomous driving mode based on various detection results detected by the detection section 34 and a personalization function.

In contrast, the manual driving control section 32 controls the action of each of components making up the vehicle body action section 33 in manual driving mode in response to an operation signal at the time of operation of each of components such as steering or brake by the driver to activate the vehicle body.

The personalization block 22 finds, based on details of operation of the operation section 31 operated by the driver in manual driving mode and detection results of the detection section 34 in response to action of each of the various components making up the vehicle body action section 33, a personalization function of the driver and supplies the function in autonomous driving mode. A personalization function is designed to reflect personal habits and customs in driving action. Therefore, as the action of each of the various components making up the vehicle body action section 33 determined in autonomous driving mode is corrected because of the use of a personalization function, it is possible to customize the driving action in autonomous driving mode by reflecting habits and customs of each driver, thereby ensuring improved comfort in autonomous driving.

In addition to various operational apparatuses related to driving such as steering, brake pedal, and accelerator pedal, the operation section 31 generates operation signals for almost all operations of those that can be operated in the motor vehicle by the driver, a user, ranging from operational apparatuses such as turn signals, windshield wipers, window washers, horn, lights, and instrument panel related to operation of various components making up the motor vehicle body to which the driving control apparatus 11 is mounted to operational apparatuses for switching between manual driving mode and autonomous driving mode. The operation section 31 supplies operation signals to the personalization block 22 and the manual driving control section 32.

The manual driving control section 32 supplies, based on the operation signals supplied from the operation section 31, commands instructing various actions to the vehicle body action section 33 and activates various components for activating the motor vehicle body making up the vehicle body action section 33.

The vehicle body action section 33 includes a specific group of components for activating the motor vehicle body and is, for example, a group of various components for activating the motor vehicle body such as steering wheel, brake, and engine.

The detection section 34 includes, a group of sensors for detecting various states related to the action of the motor vehicle body to which the driving control apparatus 11 is mounted. These sensors include GPS (Global Positioning System) for detecting the motor vehicle's position, steering wheel steering angle, speed, and 3D acceleration sensors, yaw, roll, and pitch sensors, cameras (image sensors) (including stereo camera sensors), rain drop detection sensor, dense fog sensor, illuminance sensor, atmospheric pressure sensor, tire pressure sensor, millimeter wave radar (millimeter wave sensor), infrared sensor, beacon sensor, and temperature, pressure, and other sensors of various components. The detection section 34 supplies detection results to the autonomous driving control block 21 and the personalization block 22.

The display section 35 is a display apparatus that includes, for example, an LCD (Liquid Crystal Panel) provided in the instrument panel and displays the current driving mode, either autonomous driving mode or manual driving mode, or various kinds of information in autonomous driving mode or manual driving mode. The display section 35 may have an integral structure with the operation section 31 to function, for example, as a touch panel. By having such a configuration, operating buttons for switching between autonomous driving mode and manual driving mode, for example, may be displayed so that these modes are switched by accepting input through touch operation.

The autonomous driving control block 21 is a block that determines the action of each component of the vehicle body action section 33 of the motor vehicle in autonomous driving mode. To be more specific, the autonomous driving control block 21 includes a reflex action determination section 51, a deliberate action determination section 52, an autonomous driving control section 53, and a personalization function storage section 54.

The reflex action determination section 51 determines, based on detection results of the detection section 34, an action of each of the various components making up the vehicle body action section 33 in autonomous driving mode by a process simpler than that carried out by the deliberate action determination section 52 which will be described later and supplies the command that matches the determined action to the autonomous driving control section 53.

The reflex action determination section 51 decides that there is a risk of collision, for example, when the distance to the motor vehicle in front is shorter than a given distance and when the speed is higher than a given speed, and determines, for example, an action of activating a so-called pre-clash safety apparatus for taking emergency avoidance behavior such as steering action or automatic brake. Then, the reflex action determination section 51 reads, from the personalization function storage section 54, a personalization function that has the habits and customs of each driver reflected and specified therein, corrects the command associated with the reflex action in such a manner as to reflect driver's preferences, and supplies the command to the autonomous driving control section 53.

That is, a reflex action includes a number of highly urgent actions that require a decision in an extremely short period of time. Therefore, a reflex action may include, to a certain extent, a number of predetermined actions with respect to detection results, and this makes it possible to determine an action that allows for response in an extremely short time period. Hereinafter, an action determined by this reflex action determination section 51 will be simply referred to as a reflex action.

The deliberate action determination section 52 determines, based on detection results of the detection section 34, an action of each of the various components making up the vehicle body action section 33 in autonomous driving mode by a process more elaborate than that carried out by the reflex action determination section 51, and supplies the associated command to the autonomous driving control section 53. Then, the deliberate action determination section 52 reads, from the personalization function storage section 54, a personalization function that has the habits and customs of each driver reflected and specified therein, corrects the command associated with the deliberate action in such a manner as to reflect driver's preferences, and supplies the command to the autonomous driving control section 53.

Thus, as the driver's preferences are reflected into the reflex action and deliberate action, it is possible to ensure improved comfort for each driver in autonomous driving mode.

The deliberate action determination section 52 determines an action of controlling steering operation, for example, when one passes an oncoming vehicle on a narrow road, estimating the ever-changing vehicle-to-vehicle distance between one's own vehicle and the oncoming vehicle and the motion of the vehicle body to suit the steering operation conducted a plurality of times and determining a relatively time-consuming action such as an action that suits the estimation results. Hereinafter, an action determined by the deliberate action determination section 52 will be simply referred to as a deliberate action.

The autonomous driving control section 53 determines an action of the vehicle body action section 33 in autonomous driving mode based on a reflex action command supplied from the reflex action determination section 51 and a deliberate action command supplied from the deliberate action determination section 52 and supplies the associated command to the vehicle body action section 33.

The reflex action determination section 51 can, in general, determine a reflex action quicker than the processing time required until a deliberate action is determined by the deliberate action determination section 52. It should be noted, however, that, depending on the conditions of the detection results obtained from the detection section 34, the processing time required until a deliberate action is determined may be shorter than the processing time required until a reflex action is determined, and that the processing times may be approximately the same.

Further, the autonomous driving control section 53 determines an action based on a reflex action and a deliberate action, and in general, on the premise that mutual processing results agree with each other, and supplies the associated action signal to the vehicle body action section 33.

However, a reflex action and a deliberate action may conflict with each other depending on the detection results.

Therefore, an autonomous driving action is determined by a resolution mode selected from among the following plurality of resolution modes:

That is, there are seven (7) resolution modes, i.e., a first resolution mode that gives priority to a deliberate action or a reflex action, a second resolution mode that selects 'first come priority' or 'replace with last come,' a third resolution mode that gives priority to whichever is higher in terms of priority level or certainty level, a fourth resolution mode that takes a weighted average using both actions or majority decision, a fifth resolution mode that adds the fact that the two are opposed to each other to the input so that recalculation is performed by the two, a sixth resolution mode that gives priority to priority levels of commands themselves, and a seventh resolution mode that stops the vehicle without issuing either or maintains the current state. Further, there is an eighth resolution mode that allows the driver's decision to intervene, which makes a total of eight kinds of resolution modes. It should be noted that the eight kinds of resolution modes cited here are merely examples, and that other resolution modes may be further specified.

It is possible to specify, by using the operation section 31 in advance, which of the eight kinds of resolution modes described above is used to resolve a conflict. Therefore, the autonomous driving control section 53 stores details of resolution mode setting, determines an action of the vehicle body action section 33 in autonomous driving mode in accordance with the stored resolution mode using deliberate and reflex actions, and supplies the action to the vehicle body action section 33.

The deliberate action determination section 52 includes an environment recognition section 71, a local map processing section 72, a global map processing section 73, a route planning section 74, and a behavior planning section 75.

The environment recognition section 71 recognizes the environment surrounding the own vehicle, generates environmental information as a recognition result, and supplies the information to the local map processing section 72. Environmental information of the own vehicle is information required for the local map processing section 72 and the global map processing section 73 and includes, for example, GPS information indicating a position on earth (position on a route specified as a route on a map) and images captured by image sensors or other devices to recognize the lane on the road being travelled and the road conditions. Environmental information also includes surrounding environmental information, traffic jam information, and so on such as beacon information including traveling speed of the own vehicle, weather, and traffic information.

The local map processing section 72 extracts, as local information, local map-based narrow-range information around the vehicle such as position of the lane on the road being travelled, traveling speed, detailed shape of the road, traffic signs, traffic lights, and so on from the environmental information extracted based on the detection results and supplies the information to the behavior planning section 75. The local map processing section 72 also supplies the environmental information to the global map processing section 73.

The global map processing section 73 extracts, as global information, global map-based wide-range information around the vehicle such as beacon information and GPS information that is included in the environmental information ranging from traffic jam condition and accident information to prospect of traffic jams in the route from the origin to destination and supplies the information to the route planning section 74.

That is, local information is information in a relatively narrow range in connection with the surroundings of the motor vehicle body based on a local map (map information that covers a relatively short distance from the vehicle body). In contrast, global information is information in a relatively wide range in connection with the surroundings of the motor vehicle body on the route to be travelled from now based on a global map (map information that covers a relatively long distance from the vehicle body).

The route planning section 74 plans a traveling route of the own vehicle based on global information supplied from the global map processing section 73 and supplies the route to the behavior planning section 75 as route planning information.

The behavior planning section 75 plans a behavior for activating the vehicle body action section 33 based on the local information and the route planning information and supplies the associated command as a deliberate action. More specifically, the behavior planning section 75 determines, for example, a steering angle of the steering, braking timing, accelerator opening angle, and so on required to change the lane as a deliberate action when it is necessary to change the lane because of the relationship between the route such as turning right or left next and the currently travelled lane based on detailed road shape and travelled lane information, local information, and route information found from the global information. The behavior planning section 75 supplies the command associated with the deliberate action to the autonomous driving control section 53.

The personalization block 22 includes a personalization function learning section 91, a learning result storage section 82, a learning result verification section 93, a verification result decision section 94, and a personalization function updating section 95.

The personalization function learning section 91 finds, by learning, a personalization function for each driver based on an operation signal supplied from the operation section 31 and various detection results supplied from the detection section 34 and stores the function in the learning result storage section 92. That is, the personalization function learning section 91 is designed to find, by learning, a personalization function that reflects driving habits and customs of the driver based on an operation signal during driving by the driver by actually operating the operation section 31 in manual driving mode and based on the detection results of the detection section 34 at that time. Therefore, in accordance with the length of driving time in manual driving mode, the longer the learning time, the more strongly a personalization function reflects the habits and customs of each driver.

Also, the personalization function learning section 91 may specify a plurality of personalization functions for the same driver. That is, the driving action of the driver is not always constant but changes depending on the physical and mental conditions.

Therefore, it is possible to specify a requested personalization function as a personalization function for each mood of the driver for each of the plurality of driving modes.

For example, a personalization function used when one drives in a "slow and safe" manner requested from an operation signal with slow braking and accelerating operations can be used as a first mode. Also, a personalization function used when one drives in a "speedy" manner requested from an operation signal for braking operation that stops the vehicle over a short distance or an operation signal for repeatedly depressing and releasing the accelerator pedal in an intensive manner can be used as a second mode. Then, a third personalization function obtained from the average or weighted average of the parameters for these "slow and safe" and "speedy" manners can be used as a third mode.

Thus, by specifying a plurality of personalization functions for the same driver to match the mood of the driver in manual driving mode, it is possible to change the autonomous driving action to suit the mood of the driver at that time, thereby contributing to improved comfort in autonomous driving. It should be noted that this mode tailored to the mood of each driver in a personalization function will be referred to as a user mode. Therefore, it is possible for the driving control apparatus 11 to learn a personalization function in manual driving mode for each driver and for each user mode, and it is possible to make adequate correction in autonomous driving mode for each driver and for each user mode.

The learning result verification section 93 reads the personalization function, a learning result stored in the learning result storage section 92, when the driving is over, supplies the personalization function to an external verification apparatus 13 via a network, typically, the Internet, requests verification of the personalization function, and acquires a verification result.

The verification apparatus 13 is an apparatus realized, for example, by cloud computing. When a request is made by the driving control apparatus 11 to verify a personalization function, the verification apparatus 13 verifies safety by virtually using the personalization function and realizing autonomous driving through simulation and supplies the verification result. To be more specific, the verification apparatus 13 corrects the command virtually determined by the autonomous driving control section 53 using the personalization function and repeatedly simulates the activation of the vehicle body action section 33 for a set time period, thereby reproducing autonomous driving using the personalization function, recording traveling information at this time as a verification result, and supplying the verification result to the driving control apparatus 11. It should be noted that a detailed configuration of the verification apparatus 13 will be described later with reference to FIG. 15.

When the verification result, a simulation result using the personalization function, is acquired, the verification result decision section 94 verifies whether or not the personalization function is guaranteed safe based, for example, on whether or not an anticipated risk-avoiding behavior was fully taken with no accidents during the simulation. Then, the verification result decision section 94 decides the verification result of the verification apparatus 13 and supplies the decision result to the personalization function updating section 95.

When the decision result can be considered safe with no possibility of accidents even after correction of the command with a personalization function, the personalization function updating section 95 reads the personalization function stored in the learning result storage section 92 and whose safety is guaranteed by the verification apparatus 13, and updates the personalization function stored in the personalization function storage section 54.

Through such a series of processes, it is possible to correct a variety of commands for the vehicle body action section 33 using a personalization function having the user's preferences reflected therein and whose safety is guaranteed and realize driving control processes in autonomous driving mode. Consequently, it is possible to realize safe and comfortable autonomous driving in autonomous driving mode. It should be noted that if there is a problem with the verification result of the personalization function supplied to the verification apparatus 13, data in the case of occurrence of the problem may be further supplied from the verification apparatus 13 so that the data is fed back to the personalization function learning section 91 for relearning.

<Driving Control Process>

Figure 2:
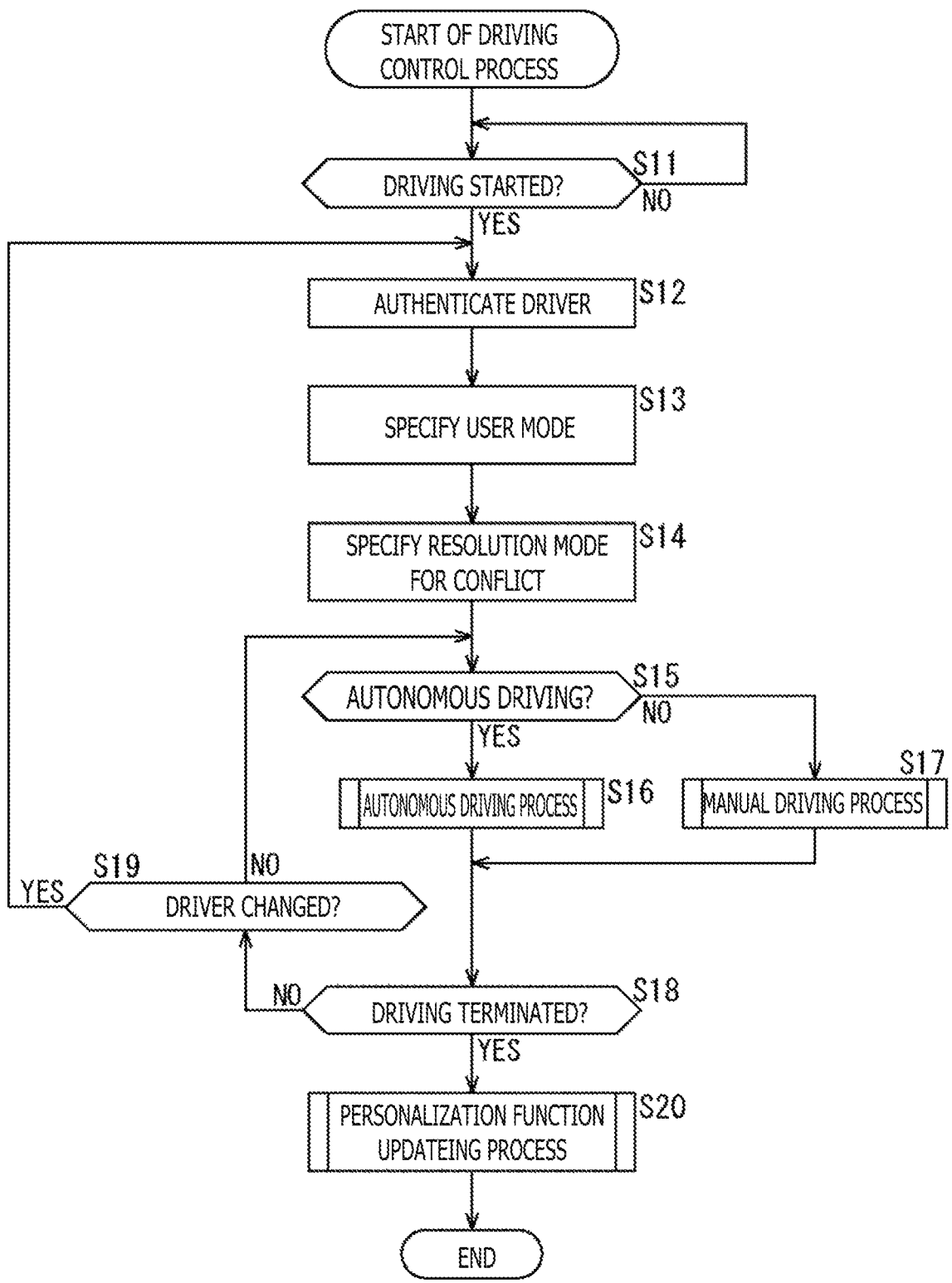
FIG. 2 is a flowchart describing a driving control process by the driving control apparatus depicted in FIG. 1.

A description will be given next of a driving control process handled by the driving control apparatus 11 depicted in FIG. 1 with reference to the flowchart depicted in FIG. 2. It should be noted that although either autonomous driving mode or manual driving mode is normally specified as a driving mode, we assume here that manual driving mode is specified as a default mode and that the driving mode can be switched to autonomous driving mode after the driving begins. Also, the default driving mode may be either one of autonomous driving mode and manual driving mode, and either mode may be freely specified.

In step S11, the manual driving control section 32 decides whether or not the driving has been started by operating the operation section 31 and repeats the same process until the driving is started. That is, in this case, for example, a decision as to whether or not the driving has been started may be made based on whether or not the operation section 31 that includes a start button and so on for starting the engine and enabling driving operation has been operated. In step S11, when it is decided that the driving has been started, the process proceeds to step S12.

In step S12, the manual driving control section 32 authenticates the driver. For example, the manual driving control section 32 displays, on the display section 35, a display image that looks as if it prompts information input for identification of the driver depicted on the left in FIG. 3, accepts operation input, and identifies the driver in accordance with details of operation accepted.

Figure 3:
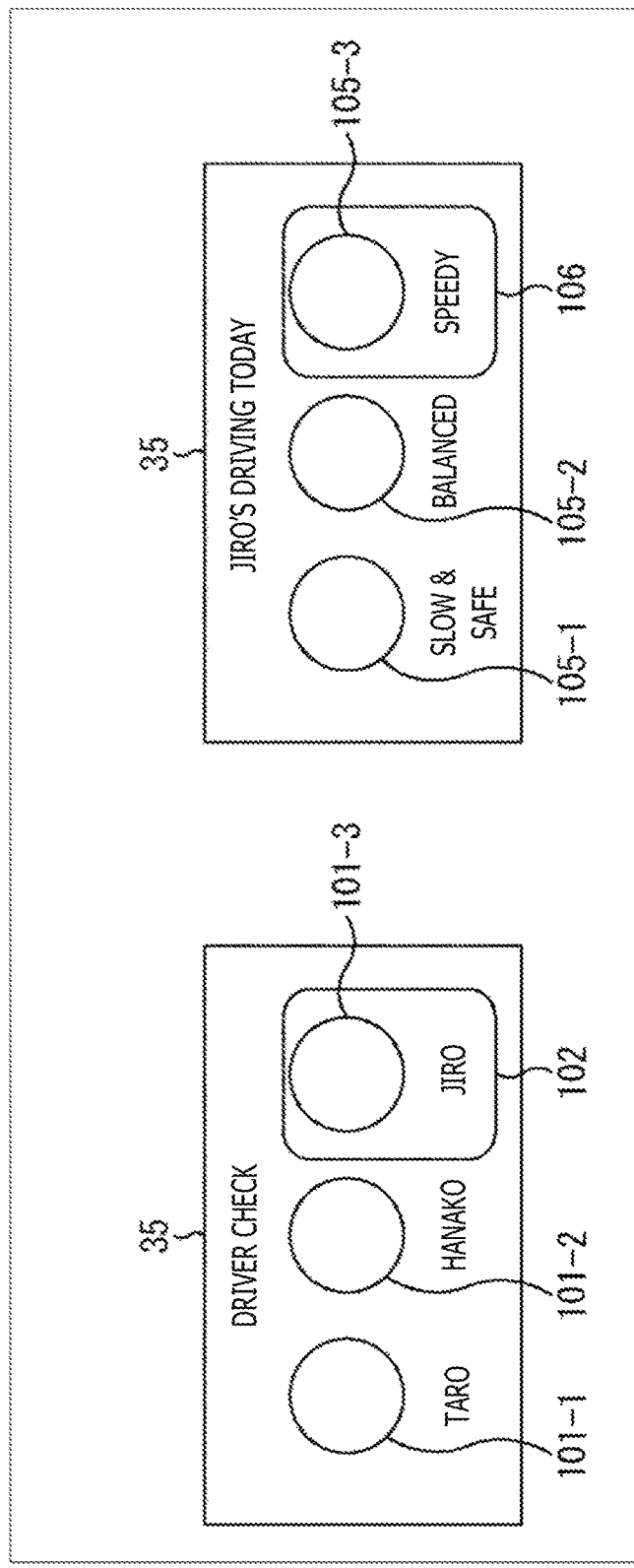
FIG. 3 is a diagram describing a display image used for driver authentication.

It should be noted that an example of a display image displayed assuming that the display section 35 is a touch panel integral with the operation section 31 is depicted on the left in FIG. 3. "Driver Check" is depicted at the topmost row, and operation buttons 101-1 to 101-3 are depicted thereunder from left. At the corresponding positions, "Taro," "Hanako," and "Jiro" appear as drivers' names registered in advance. Then, a column 102 is displayed on the left in FIG. 3 that depicts that "Jiro" is selected as a result of operation of the operation button 101-3. In this case, therefore, the manual driving control section 32 recognizes that the driver is "Jiro." Also, if the driver is a new user, a registration image may be displayed separately to prompt registration.

Also, the identification of the driver may be realized by face image recognition using a camera that captures an image inside the vehicle. Alternatively, other authentication method such as fingerprint authentication, palm authentication, vein authentication, retina authentication, and voice print authentication may be used as long as the driver can be identified.

In step S13, the manual driving control section 32 specifies a user mode. That is, for example, the manual driving control section 32 displays an image that depicts user modes, modes of the personalization function specified to suit the mood of the driver as depicted on the right of FIG. 3, prompts selection of one of the user modes, accepts operation input, and identifies the user mode in accordance with details of operation accepted.

That is, on the right in FIG. 3, "Jiro's Driving Today" is depicted at the topmost row, and selectable user modes are depicted thereunder, with buttons 105-1 to 105-3 appearing from left. At the corresponding positions, "Slow and Safe," "Balanced," and "Speedy" appear as user modes. Then, a column 106 is displayed on the right in FIG. 3 that depicts that "Speedy" is selected as a result of operation of the button 105-3. In such a case, the manual driving control section 32 recognizes that the user mode is "Speedy."

It should be noted that a user mode may be specified by using means other than the touch panel. For example, a user mode may be specified by audio input. Alternatively, a user mode may be selected by a physical button or switch. In the meantime, a new user mode may be specified, and in this case, an image may be displayed to prompt registration of a new user mode.

In step S14, the manual driving control section 32 displays an image to prompt specification of a resolution mode for resolving a conflict which may occur between a deliberate action and a reflex action in autonomous driving mode and stores the specified resolution mode in the autonomous driving control section 53.

That is, one of eight (8) kinds of resolution modes is specified, i.e., a first resolution mode that gives priority to a deliberate action or a reflex action, a second resolution mode that selects 'first come priority' or 'replace with last come,' a third resolution mode that gives priority to whichever is higher in terms of priority level or certainty level, a fourth resolution mode that takes a weighted average using both actions or majority decision, a fifth resolution mode that adds the fact that the two are opposed to each other to the input so that recalculation is performed by the two, a sixth resolution mode that gives priority to priority levels of commands themselves, a seventh resolution mode that stops the vehicle without issuing either or maintains the current state, or an eighth resolution mode that accepts the driver's intervention for resolution. Also, if there are options in any of the resolution modes, the selection of an option is specified.

Specifically, this process may be conducted, for example, by displaying an image in which selection buttons are provided not only to select one of the first to eighth resolution modes but also, in the presence of further options in each resolution mode, to select one of the options, as done on the right in FIG. 3 so that the resolution mode whose selection button has been pressed is specified. Selection buttons that allow physical selection of a resolution mode at all times may be provided on the operation section 31. Alternatively, one of the resolution modes is selected in a fixed manner at all times.

A resolution mode with options refers, for example, to the first resolution mode. That is, because the first resolution mode is a mode that gives priority to a deliberate action or a reflex action, an item to which priority should be given, i.e., deliberate action or reflex action, serves as an option. For this reason, when the first resolution mode is selected, it is also necessary to specify an option, deliberate action or reflex action. In the resolution modes other than the fifth, sixth, and eighth resolution modes, it is similarly necessary to specify an option.

It should be noted that the resolution mode selection process in this step S14 is not always necessary once it is specified. Therefore, this process may be performed only when requested by the driver. Alternatively, one of the modes may be specified as a default mode. Further, if a physical button is provided, the setting may be changed immediately when the physical button is operated irrespective of when the button is operated.

In step S15, the manual driving control section 32 decides whether or not the driving mode is autonomous driving mode. As for a decision as to the driving mode which is either autonomous driving mode or manual driving mode, for example, whether or not the driving mode has been changed may be decided by decision whether or not the switching operation was performed, for example, by operating a selector switch (not depicted) that appears constantly on the display section 35.

Also, a physical switch or button (both not depicted) may be provided so that the driving mode can be changed. When it is assumed that the switching operation was performed and that manual driving mode, a default mode, has been switched over to autonomous driving mode in step S15, the process proceeds to step S16 to perform an autonomous driving process. In this case, the section that mainly takes charge of control is switched from the manual driving control section 32 over to the autonomous driving control section 53 so that the autonomous driving control section 53 handles the autonomous driving process.

On the other hand, when the driving mode remains the default mode, namely, manual driving mode, rather than autonomous driving mode, in step S15, the process proceeds to step S17 to perform a manual driving process. In this case, the manual driving control section 32 remains the section that mainly takes charge of control and handles the manual driving process.

Also, when the autonomous driving process has been performed so far, and when the driving mode is switched to manual driving mode as a result of the process in step S15, the manual driving process is performed in step S17. In this case, the section that mainly takes charge of control is switched from the autonomous driving control section 53 over to the manual driving control section 32 so that the manual driving control section 32 handles the manual driving process.

It should be noted that a description will be hereinafter given by assuming that manual driving mode, the default mode, is selected, that is, the manual driving control section 32 mainly takes charge of control, unless otherwise specified. It should be noted, however, that when a process is performed in autonomous driving mode, the autonomous driving control section 53 takes charge of control. As for the processes described in the flowchart depicted in FIG. 2, the same processes as for the manual driving control section 32 are performed. Also, the autonomous driving and manual driving processes will be described in detail later.

In step S18, the manual driving control section 32 decides whether or not the operation for terminating the driving was performed by operating the operation section 31. When the operation for terminating the driving has yet to be performed in step S18, the process proceeds to step S19.

In step S19, the manual driving control section 32 decides whether or not the drivers have been changed. For example, the manual driving control section 32 decides whether or not any operation was performed to request a change to the driver as a result of operation of the operation section 31. If, for example, the driver has been changed in step S19, the process returns to step S12. That is, the driver authentication process, the user mode specification, and the resolution mode specification are performed on the changed driver by the processes from step S12 to step S14, followed by the subsequent processes.

On the other hand, when the driver is not changed in step S19, the process returns to step S15. That is, the processes from step S12 to step S14 are skipped.

When it is assumed in step S18 that the operation for terminating the driving was performed, the process proceeds to step S20.

In step S20, the personalization block 22 performs a personalization function updating process, verifying the personalization function learned by manual driving and updating the personalization function in accordance with the verification result. It should be noted that the personalization function updating process will be described in detail later.

Because of the processes described heretofore, it is possible to realize driving control that switches between autonomous driving mode and manual driving mode and make it also possible to generate, by learning, a personalization function learned in manual driving mode which will be described later and further update the personalization function.

<Autonomous Driving Process>

A description will be given next of the autonomous driving process handled by the driving control apparatus 11 depicted in FIG. 1 with reference to the flowchart depicted in FIG. 4.

In step S31, the detection section 34 supplies all of a plurality of detection results detected by a group of various sensors to the autonomous driving control block 21 and the personalization block 22.

In step S32, the reflex action determination section 51 determines a reflex action on the basis of the detection results (or some of the detection results).

In step S33, the reflex action determination section 51 reads, of the personalization functions stored in the personalization function storage section 54, the function of the authenticated driver that is associated with the currently specified user mode and corrects the action determined as a reflex action with the personalization function.

In step S34, the deliberate action determination section 52 determines a deliberate action by performing a deliberate action determination process.

<Deliberate Action Determination Process>

Figure 5:
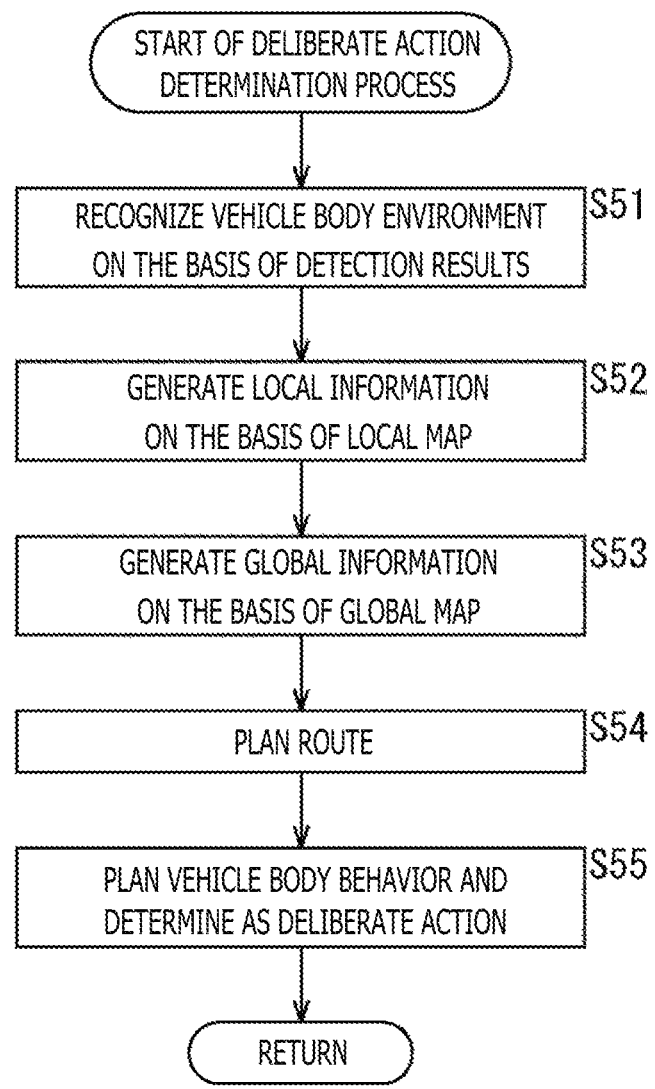
FIG. 5 is a flowchart describing a deliberate action determination process depicted in FIG. 4.

A description will be given here of the deliberate action determination process with reference to the flowchart depicted in FIG. 5.

In step S51, the environment recognition section 71 extracts environment information on the basis of the detection results supplied from the detection section 34 and supplies the information to the local map processing section 72.

In step S52, the local map processing section 72 extracts, from the environment information, local information around the own vehicle, and supplies the information to the behavior planning section 75. Also, the local map processing section 72 supplies the environment information to the global map processing section 73.

In step S53, the global map processing section 73 extracts, from the environment information, global information that includes map information of the areas surrounding the route that will be travelled by the own vehicle from now and traffic information on the route and supplies the global information to the route planning section 74.

In step S54, the route planning section 74 plans a traveling route of the own vehicle based on the global information supplied from the global map processing section 73 and supplies the route to the behavior planning section 75 as a route plan. That is, the route planning section 74 searches for routes from the current position to the destination based, for example, on traffic information and plans, in the presence of traffic jam on the route, a route by searching for a route that leads to the destination while avoiding the traffic jam.

In step S55, the behavior planning section 75 plans a behavior for activating the vehicle body action section 33 based on the local information and the route plan, considers the planning result as a deliberate action, and supplies the command associated with the deliberate action to the autonomous driving control section 53. That is, the behavior planning section 75 determines, for example, a steering angle of the steering, braking timing, accelerator opening angle, and so on required to change the lane as a deliberate action when it is necessary to change the lane because of the relationship between the route such as turning right or left next and the currently travelled lane based on detailed road shape and travelled lane information, local information, and route information found from the global information. The behavior planning section 75 supplies the command associated with the deliberate action to the autonomous driving control section 53.

Because of the above processes, environment information is found from the detection results, local and global information is found from the environment information, a route is specified from the global information, and a deliberate action is found from the specified route and the local information.

Figure 4:
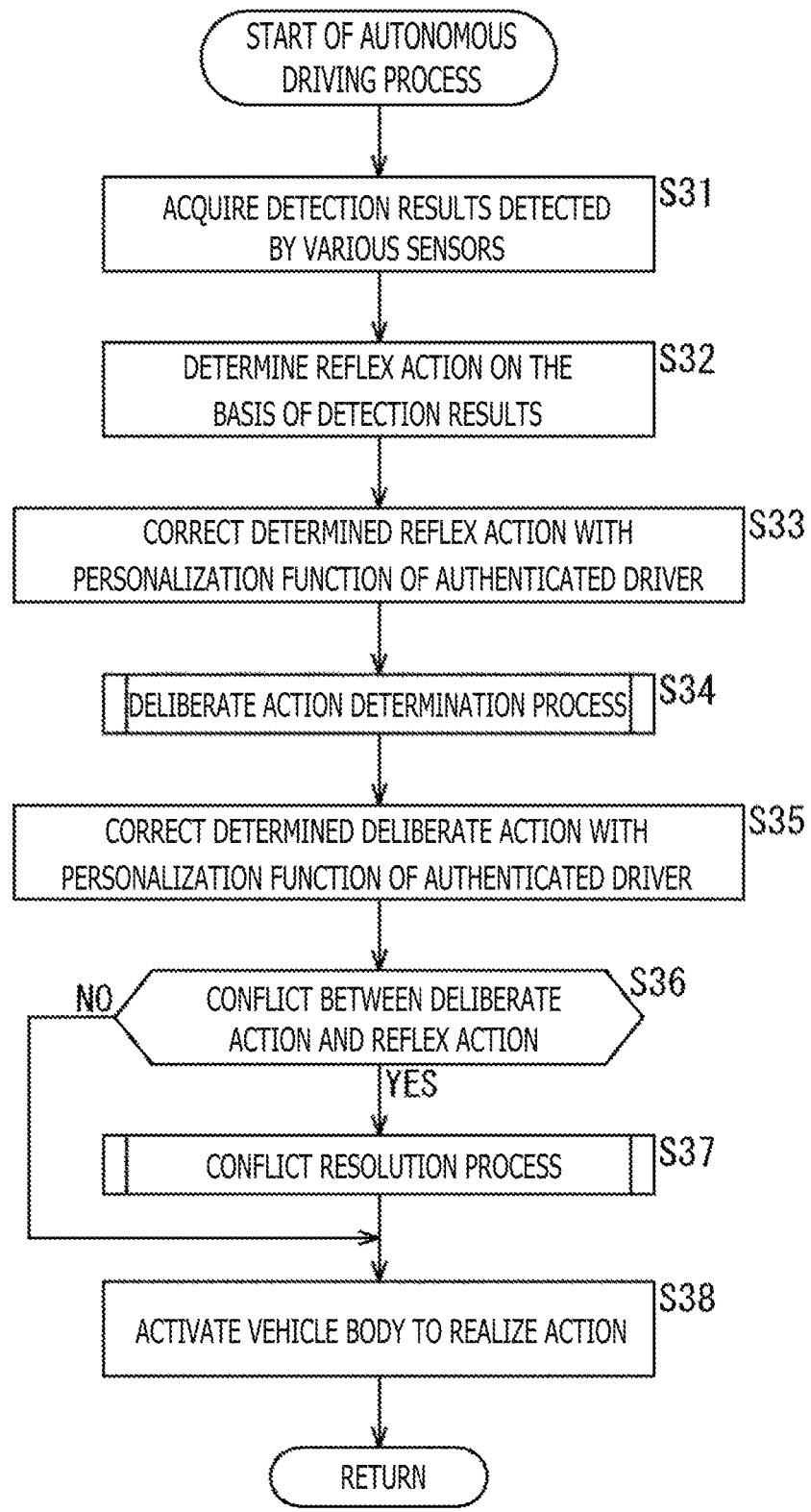
FIG. 4 is a flowchart describing an autonomous driving process depicted in FIG. 2.

Here, we return to the description of the flowchart depicted in FIG. 4.

In step S35, the behavior planning section 75 of the deliberate action determination section 52 reads, of the personalization functions stored in the personalization function storage section 54, the function of the authenticated driver that is associated with the currently specified user mode and corrects the action determined as a deliberate action with the personalization function.

In step S36, the autonomous driving control section 53 decides whether or not there is a conflict between the deliberate action and the reflex action because of a mismatch therebetween. When it is determined in step S34 that there is a conflict, the process proceeds to step S35.

In step S37, the autonomous driving control section 53 resolves the conflict between the deliberate action and the reflex action by performing a conflict resolution process, determines an action to be performed by the vehicle body action section 33, and supplies the command associated with the determined action to the vehicle body action section 33. It should be noted that the conflict resolution process will be described in detail later with reference to FIGS. 6 and 7.

It should be noted that when it is decided in step S36 that there is no conflict, the process in step S37 is skipped.

Then, in step S38, the autonomous driving control section 53 supplies, to the vehicle body action section 33, the command associated with the action to be performed by the vehicle body action section 33. That is, when there is a match between the reflex action and the deliberate action, the autonomous driving control section 53 supplies the command associated with the matching action to the vehicle body action section 33. When there is a conflict between the reflex action and the deliberate action because of a mismatch therebetween, the autonomous driving control section 53 supplies, to the vehicle body action section 33, the command associated with the action determined by the conflict resolution process. As a result, the vehicle body action section 33 acts in accordance with the command from the autonomous driving control section 53.

As a result, as will be described later, as a reflex action and a deliberate action is individually corrected by a personalization function that is learned when the driver himself or herself drives in manual driving mode, it is possible to reflect the habits and customs of the authenticated driver into the actions, making it possible to realize safe autonomous driving and comfortable autonomous driving tailored to each driver.

It should be noted that FIG. 4 states that a series of reflex action-related processes including the determination of a reflex action and the correction of the personalization function for the reflex action determined, realized by the processes in steps S32 and S33, are performed first, followed by a series of deliberate action-related processes including the determination of a deliberate action and the correction of the personalization function for the deliberate action determined realized by the processes in steps S34 and S35.

However, the reflex action-related processes and the deliberate action-related processes described above are processes performed individually by the reflex action determination section 51 and the deliberate action determination section 52 that are configured in parallel between the detection section 34 and the autonomous driving control section 53, as is also evident from the block diagram depicted in FIG. 1. Therefore, the reflex action-related processes and the deliberate action-related processes are processes performed in parallel, i.e., simultaneously. Although the flowchart depicted in FIG. 4 depicts these processes as if the reflex action-related processes are performed first, followed by the deliberate action-related processes, this is a result of depiction for convenience with a single flowchart. As a matter of course, it may be depicted that the deliberate action-related processes are performed first, followed by the reflex action-related processes. Also, for the same reason, the reflex action-related processes and the deliberate action-related processes may be depicted as individual flowcharts that are processed simultaneously in parallel. In this case, the processes from step S36 onward in FIG. 4 are performed only after both the reflex action-related processes and the deliberate action-related processes are complete.

<Conflict Resolution Process>

A description will be given next of the conflict resolution process with reference to the flowcharts depicted in FIGS. 6 and 7.

Figure 8:
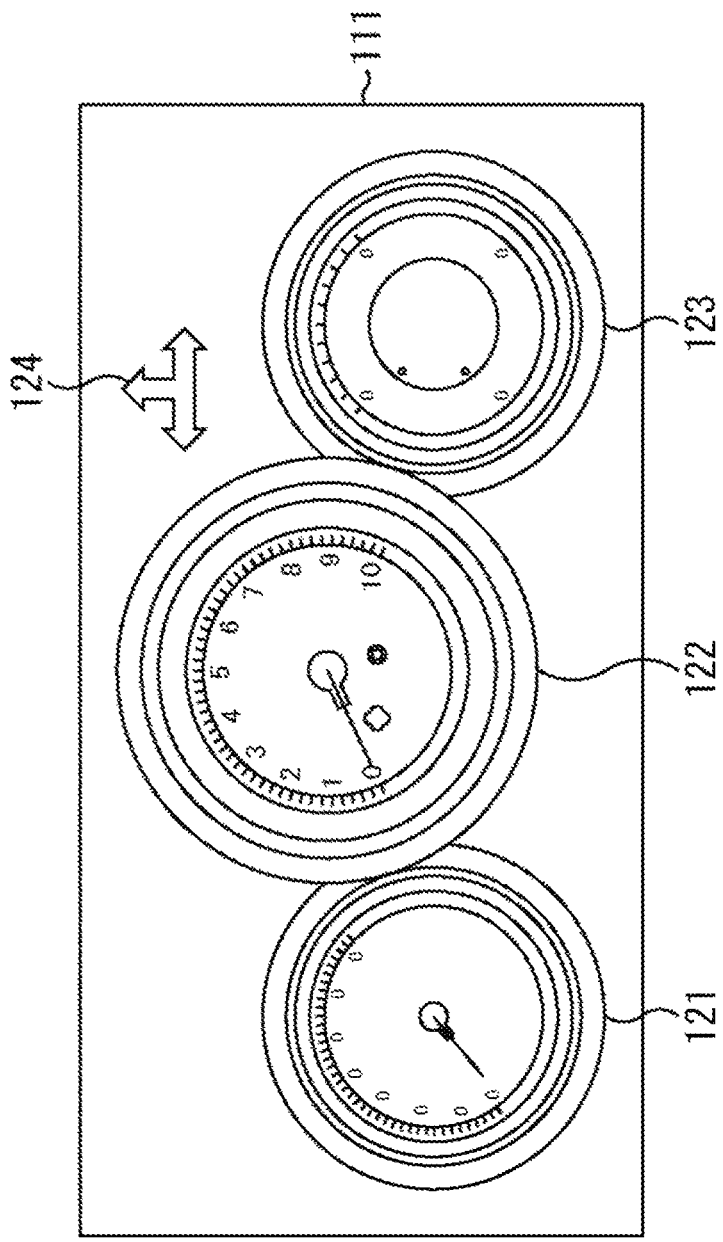
FIG. 8 is a diagram describing what is displayed indicating the occurrence of a conflict between a reflex action and a deliberate action.

In step S71 (FIG. 6), the autonomous driving control section 53 presents the occurrence of a conflict between the deliberate action and the reflex action to the driver by displaying information indicating the occurrence of a conflict to the display section 35 because of a mismatch between the deliberate action and the reflex action. The autonomous driving control section 53 displays a mark 124 indicating the occurrence of a conflict in an instrument panel 111 of the motor vehicle to which the driving control apparatus 11 is mounted, corresponding to the display section 35, for example, as depicted in FIG. 8. It should be noted that a speedometer 121, a tachometer 122, and a fuel gauge 123 appear from left each in the form of a disk-shaped meter with a needle in the instrument panel 111 depicted in FIG. 8, and that the mark 124 indicating the occurrence of a conflict appears at the top left of the fuel gauge 123 as a mark that includes arrows pointing in three directions. The driver can recognize a conflict between the deliberate action and the reflex action because of a mismatch therebetween by visually recognizing this mark 124. The driver can perceive a possibility that he or she may switch to manual driving mode by himself or herself and drive manually as necessary, making it possible to keep to a minimum inadvertent action as a result of a sudden need to drive himself or herself.

It should be noted that although an example is depicted in which the mark 124 is displayed and presented to the driver as an example of occurrence of a conflict, the occurrence of a conflict may be presented in other manner. For example, the occurrence of a conflict may be presented by audio, sheet vibration, and so on.

In step S72, the autonomous driving control section 53 decides whether or not the resolution mode in the event of occurrence of a conflict is a resolution mode that preferentially selects the deliberate action or the reflex action over the other. For example, when it is decided in step S72 that the resolution mode is not a mode that preferentially selects the deliberate action or the reflex action over the other, the process proceeds to step S73.

Figure 7:
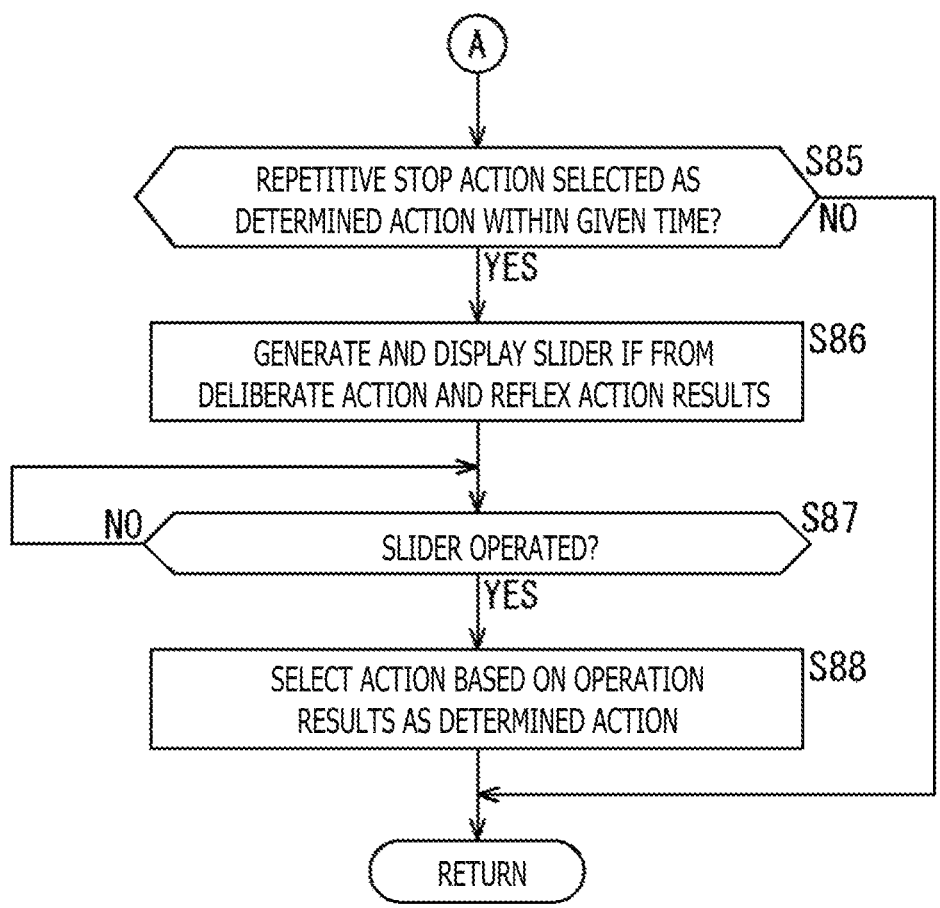
FIG. 7 is a flowchart describing the conflict resolution process depicted in FIG. 4.

In step S73, the autonomous driving control section 53 selects, of the resolution modes specified in advance, the specified action, either the deliberate action or the reflex action, as a determined action, and the process proceeds to step S85 (FIG. 7).

We assume, for example, that the reflex action is an action like following the vehicle in front while remaining on the currently traveled lane, and that the deliberate action is an action that suits the result of search for a route that avoids construction work and traffic jam in consideration of the route to the destination.

Here, when the setup is such that priority is given to the deliberate action, and when the optimal route is changed, for example, because of new traffic information acquired, priority will be given to an action such as traveling the route found by a search for a route that avoids construction work and traffic jap as a deliberate action. As a result, an action is implemented that guides the motor vehicle to a detour for avoiding the traffic jam as a motor vehicle's route, thereby ensuring reduced time required.

We also assume that the reflex action is an action that performs an emergency brake operation if an obstacle of a given size or larger is detected by forward millimeter wave radar, and that the deliberate action is an action that realizes in-lane driving at constant speed tailored to the surrounding environment.

Here, when the setup is such that priority is given to the reflex action, and if someone rushes out onto the road, it is possible to avoid an accident by an extremely brief action based on the reflex action.

Also, in step S72, when it is determined that the resolution mode is not the one that preferentially selects the deliberate action or the reflex action over the other, the process proceeds to step S74.

In step S74, the autonomous driving control section 53 decides whether or not the resolution mode in the event of occurrence of a conflict is a resolution mode that selects 'first come priority' or 'replace with last come.' When it is decided in step S74 that the resolution mode is not a mode that selects 'first come priority' or 'replace with last come,' the process proceeds to step S75.

In step S75, the autonomous driving control section 53 selects, of the resolution modes specified in advance, the action specified for the specified scheme, either 'first come priority' or 'replace with last come,' as a determined action, and the process proceeds to step S85 (FIG. 7).

The commands that indicate the deliberate action and the reflex action each specify the execution times expressly or implicitly (e.g., 4 ms). Normally, commands are accumulated in a list in the order of arrival and are executed starting from the first one in the list. As a result, the action is determined on a 'first come priority' basis. This realizes accelerator and steering control, predictive driving, and so on in a constant time loop. Therefore, when 'first come priority' is specified, the action is determined by common processes.

Also, each control module issues a command in a timely manner in response to a change in circumstances such as interrupt and does not perform anything unless the behavior up to that moment is changed. On the other hand, if the command representing the action up to that moment is overwritten by a new command that arrives later when such a command arrives, and if the action is immediately switched over to the one represented by the later command, a speedy action can be realized. In this case, therefore, whether the resolution mode selects the deliberate action or the reflex action is not a factor that determines the action, and the current action command is overwritten by the action command that arrives later in any case.

Also, when it is decided in step S74 that the resolution mode is not a mode that selects 'first come priority' or 'replace with last come,' the process proceeds to step S76.

In step S76, the autonomous driving control section 53 decides whether or not the resolution mode in the event of occurrence of a conflict is a resolution mode that selects whichever is higher in terms of priority level or certainty level. When it is decided in step S76, for example, that the resolution mode is a mode that selects whichever is higher in terms of priority level or certainty level, the process proceeds to step S77.

In step S77, the autonomous driving control section 53 selects, of the resolution modes specified in advance, the action with higher priority level or certainty level, as a determined action, and the process proceeds to step S85 (FIG. 7).

Commands that indicate various deliberate and reflex actions that are urgently issued in response to a change in circumstances such as interrupts have a high priority flag. If the priority level flag for the command accumulated in the list or the command being executed is lower than that of a new command, the autonomous driving control section 53 replaces the command in the list or the command being executed with the new one (e.g., emergency braking) even through cancellation. In this case, therefore, the determined action may be a reflex action or a deliberate action.

Also, the reflex action and the deliberate action may be equal in terms of priority level, and either thereof may be selected in accordance with the reliability level of information recognized as environment information.

That is, we assume, for example, that the reflex action and the deliberate action are speed increasing action and speed reducing action, individually. In such a case, for example, when environment information to the effect that there is no vehicle ahead is highly reliable, increasing the speed will be a determined action. When environment information to the effect that there is an obstacle ahead is highly reliable, reducing the speed will be a determined action.

Also, we assume, for example, that the reflex action and the deliberate action are an action of passing the vehicle in front traveling in the same direction as the own vehicle and an action of following the vehicle in front traveling in the same direction as the own vehicle, individually. In this case, when environment information to the effect that the vehicle in front traveling in the same direction as the own vehicle is a bicycle is highly reliable, passing the bicycle may be a determined action, and when environment information to the effect that the vehicle in front traveling in the same direction as the own vehicle is a motor vehicle is highly reliable, following the motor vehicle may be a determined action.

Also in this case, therefore, the determined action may be a reflex action or a deliberate action.

When it is decided in step S76 that the resolution mode is not a mode that selects whichever is higher in terms of priority level or certainty level, the process proceeds to step S78.

In step S78, the autonomous driving control section 53 decides whether or not the resolution mode in the event of occurrence of a conflict is a resolution mode that determines an action by weighted average or majority decision. When it is decided in step S78, for example, that the resolution mode is a mode that determines an action by weighted average or majority decision, the process proceeds to step S79.

In step S79, the autonomous driving control section 53 selects, of the resolution modes specified in advance, the specified action, the action determined by weighted average or majority decision, as a determined action, and the process proceeds to step S85 (FIG. 7).

That is, when both the reflex action and the deliberate action are actions of specifying a continuous value such as steering angle, an action may be determined by weighted average using the certainty level of each action.

It should be noted that both the reflex action determination section 51 and the deliberate action determination section 52 determine a plurality of actions for the plurality of components making up the vehicle body action section 33, and actions that lead to a conflict are also a plurality of actions for the plurality of components. For example, when one makes an emergency stop to avoid a collision with the obstacle ahead, respective actions such as braking and action of taking an avoidance behavior by steering that involve the brake and the steering, are determined. In the case of a discrete action with two options, an example of which is whether to carry out emergency braking, therefore, an action may be determined by majority decision by using the plurality of these actions.

When it is decided in step S78 that the resolution mode is not a mode that determines an action by weighted average or majority decision, the process proceeds to step S80.

In step S80, the autonomous driving control section 53 decides whether or not the resolution mode in the event of occurrence of a conflict is a resolution mode that determines an action by using mutual results of the reflex action and the deliberate action. When it is decided in step S80, for example, that the resolution mode is a mode that determines an action by using mutual results of the reflex action and the deliberate action, the process proceeds to step S81.

In step S81, the autonomous driving control section 53 determines an action, determined using mutual results of the reflex action and the deliberate action, as a determined action, and the process proceeds to step S85 (FIG. 7).

That is, the reflex action and the deliberate action is an action determined separately. However, if there is a discrepancy between the decisions of the two, the autonomous driving control section 53 controls, for example, the reflex action determination section 51 and the deliberate action determination section 52 to recalculate the mutual actions by using the results found from the mutual processes as reference values, thereby bringing the two actions into agreement with each other. Also, the autonomous driving control section 53 controls, for example, the reflex action determination section 51 and the deliberate action determination section 52 to repeat recalculations for finding reflex and deliberate actions until a prescribed number of repetitions is reached, thereby bringing the two actions into agreement with each other.

When it is decided in step S80 that the resolution mode is not a mode that determines an action by using mutual results of the reflex action and the deliberate action, the process proceeds to step S82.

In step S82, the autonomous driving control section 53 decides whether or not the resolution mode in the event of occurrence of a conflict is a resolution mode that determines an action in accordance with the priority levels of commands indicating the activation of the reflex action and the deliberate action. When it is decided in step S82, for example, that the resolution mode is a mode that determines an action in accordance with the priority levels of commands indicating the activation of the reflex action and the deliberate action, the process proceeds to step S83.

In step S83, the autonomous driving control section 53 selects the action determined in accordance with the priority level of the command indicating the reflex action and the deliberate action as a determined action, and the process proceeds to step S85 (FIG. 7).

That is, commands for emergency braking and so on are defined in advance, and if that is selected as a reflex action or a deliberate action, the action is handled with upmost priority. A superiority-inferiority relationship may be established between commands other than emergency commands so that an action is determined based on the superiority or inferiority of the priority level in the event of a conflict between actions. The superiority or inferiority of commands may be specified in advance in such a sequence as stop>drive straight ahead within lane>deviate from lane>back.

When it is decided in step S82 that the resolution mode is not a mode that determines an action in accordance with the priority level of the command indicating the reflex action and the deliberate action, the process proceeds to step S84.

In step S84, the autonomous driving control section 53 performs a driver intervention process and resolves the conflict by intervention of the driver's operation, and determines an action. That is, this case is considered a resolution mode that resolves the conflict by accepting the driver's intervention.

<Driver Intervention Process>

Figure 9:
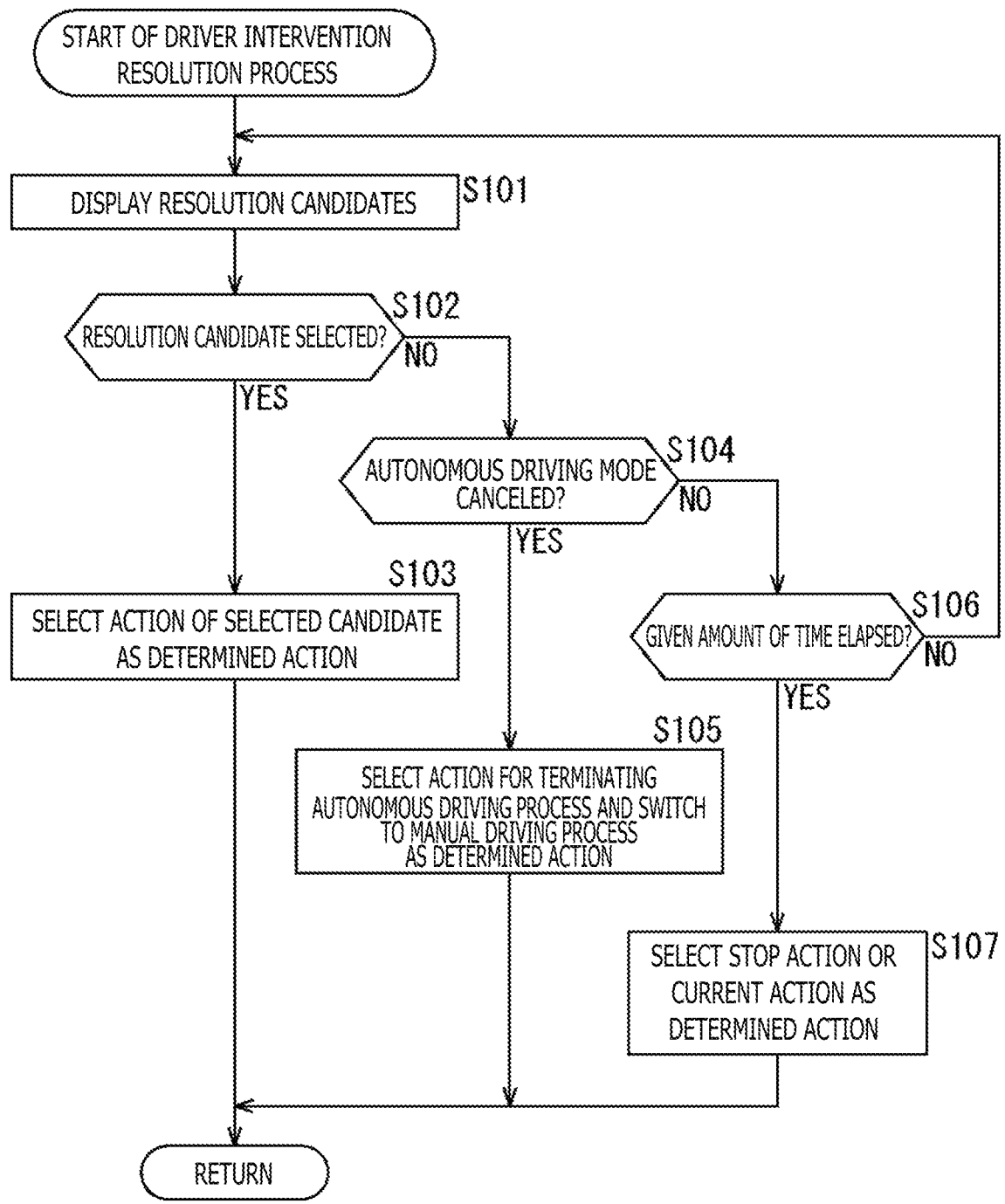
FIG. 9 is a flowchart describing a driver intervention resolution process depicted in FIG. 6.

A description will be given here of the driver intervention process with reference to the flowchart depicted in FIG. 9.

In step S101, the autonomous driving control section 53 controls the display section 35 to display the conflicting reflex action and deliberate action as resolution candidates and display an image prompting the selection of one of the actions for resolving the conflict.

Figure 10:
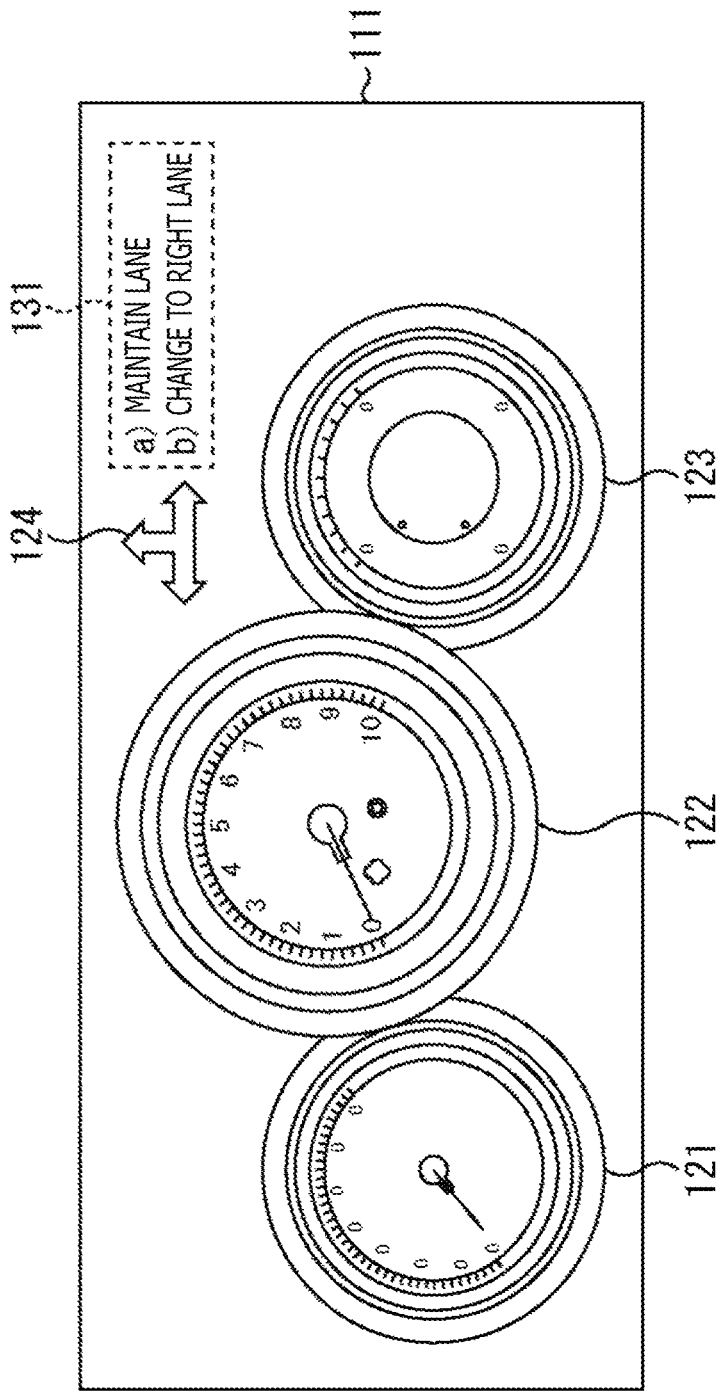
FIG. 10 is a diagram describing an example in which options are presented in the driver intervention resolution process.

That is, for example, the conflicting actions, i.e., "a) Maintain Lane" and "b) Change to Right Lane," are displayed as resolution candidates 131 on the right of the mark 124 indicating the occurrence of a conflict in the instrument panel 111 depicted in FIG. 10. "a) Maintain Lane" and "b) Change to Right Lane," the resolution candidates 131, can be selected by touching the touch panel.

In step S102, the autonomous driving control section 53 decides whether or not one of the resolution candidates has been selected as a result of operation of the operation section 31. When one of "a) Maintain Lane" and "b) Change to Right Lane" in a resolution candidate column 131 depicted in FIG. 10 is selected in step S102, the process proceeds to step S103.

In step S103, the autonomous driving control section 53 selects, of the resolution candidates displayed in the resolution candidate column 131, the action of the selected resolution candidate as a determined action.

On the other hand, when none of the resolution candidates in the resolution candidate column 131 is selected in step S102, the process proceeds to step S104.

In step S104, the autonomous driving control section 53 decides whether or not autonomous driving mode has been cancelled as a result of operation of the operation section 31. When an action is detected that corresponds to the expression of intention to cancel autonomous driving mode such as operation of the selector switch or button displayed on the display section 35 and depression of the brake pedal or the accelerator pedal, the action is considered a request to cancel autonomous driving mode, and the process proceeds to step S105.

In step S105, the autonomous driving control section 53 terminates autonomous driving mode to switch to manual driving mode. As a result of this process, a manual driving process will be hereinafter carried out by the manual driving control section 32.

Further, when it is considered in step S104 that no request has been made to cancel autonomous driving mode, the process proceeds to step S106.

In step S106, the autonomous driving control section 53 decides whether or not a set time period has elapsed after the occurrence of a conflict. When it is considered in step S106 that a set time period has yet to elapse after the occurrence of a conflict, the process returns to step S101 so that the processes from step S101 to step S106 are repeated until the set time period elapses. Then, when it is considered in step S106 that the set time period has elapsed, the process proceeds to step S107.

In step S107, the autonomous driving control section 53 considers that the resolution mode selects the action of stopping the traveling of the motor vehicle or maintaining the current state as a determined action, thereby selecting the action of stopping the motor vehicle or maintaining the current state as a determined action. In this case, the resolution mode is considered as stopping the motor vehicle without issuing neither a reflex action nor a deliberate action or maintaining the current state.

That is, if a conflict between a reflex action and a deliberate action cannot be resolved, or if there is no reflex action or deliberate action in the command accumulation list, the specified action is selected from the stopping action and the current state maintaining action as a determined action.

That is, if the conflict between the reflex action and the deliberate action cannot be resolved by the above processes, it is possible to determine an action by allowing the driver to intervene (allowing the driver to determine one of the actions or cancel autonomous driving mode to switch to manual driving mode so that the driver drives the vehicle by himself or herself). Also, when there is no driver's intervention, the motor vehicle is stopped, or the current state is maintained, thereby making it possible to safely stop the vehicle or prompt the driver to drive manually.

Figure 6:
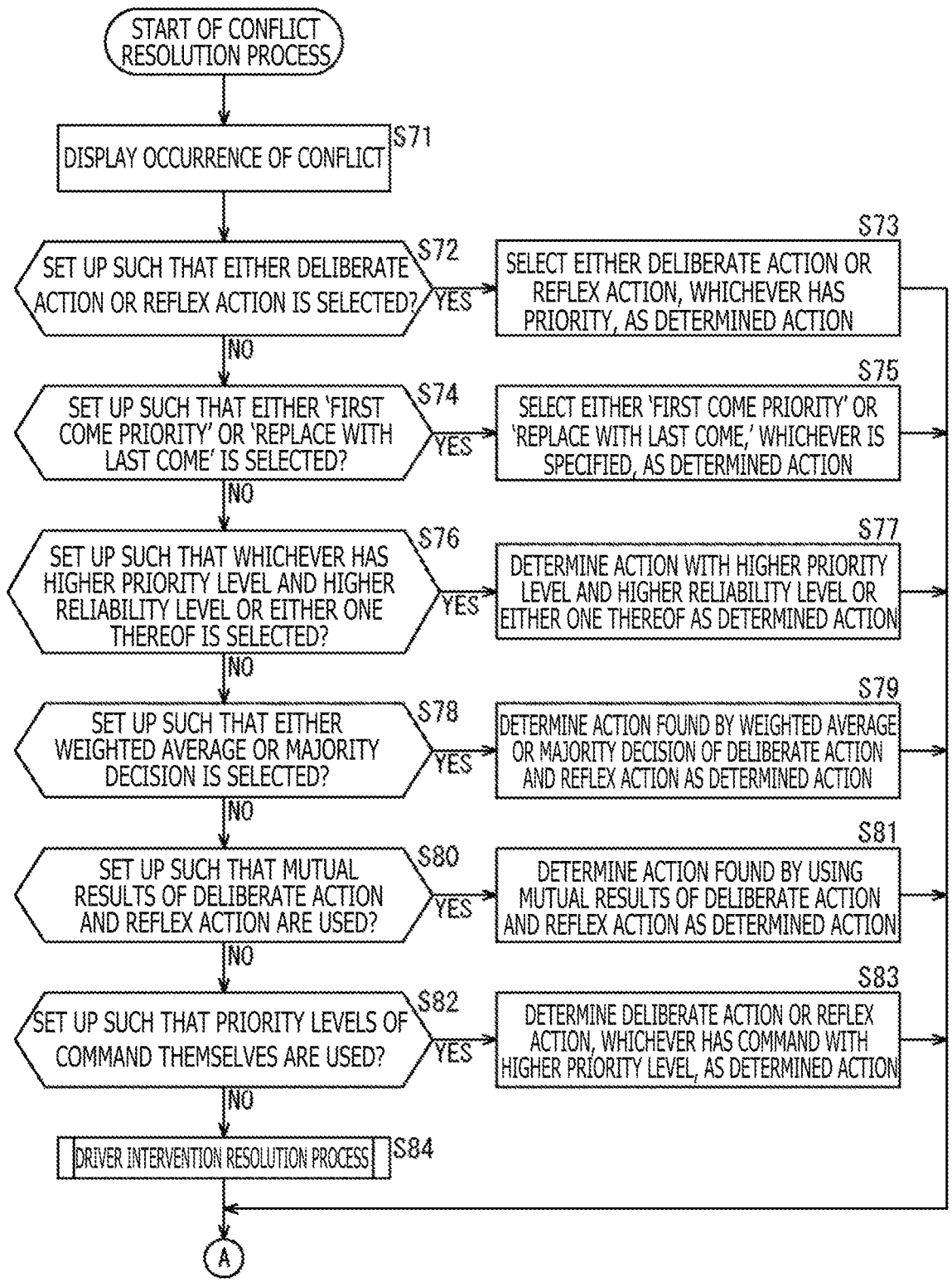
FIG. 6 is a flowchart describing a conflict resolution process depicted in FIG. 4.

We return here to the description of the flowcharts depicted in FIGS. 6 and 7.

Because of the processes up to this point, an action is determined by one of the resolution modes specified in advance, making it possible to maintain autonomous driving mode. On the other hand, if the conflict cannot be resolved in autonomous driving mode, it is possible to prompt the driver to intervene as necessary.

In step S85 (FIG. 7), the autonomous driving control section 53 decides whether or not the repetitive stopping action within a set time period is selected as a determined action. When it is decided, for example, that the repetitive stopping action within a set time period is selected as a determined action, the process proceeds to step S86.

Figure 11:
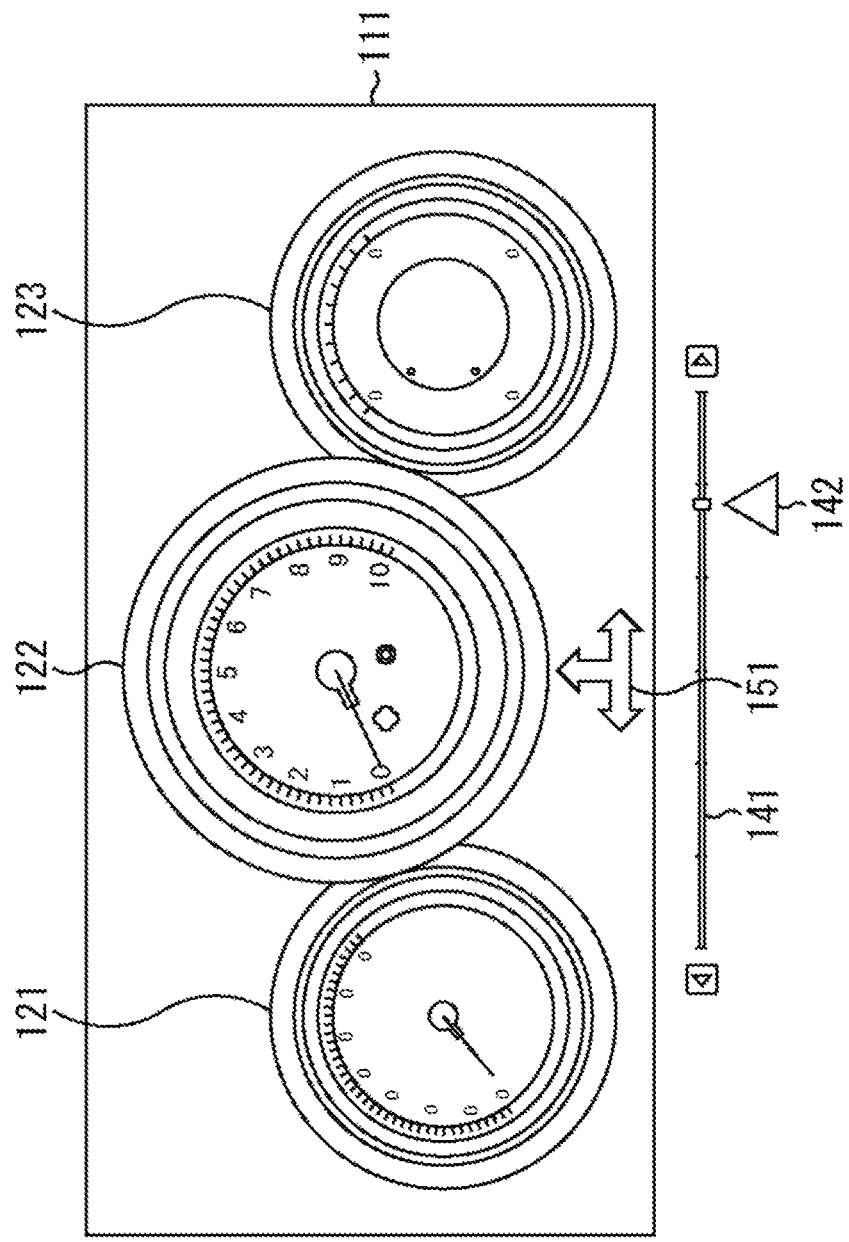
FIG. 11 is a diagram illustrating an example in which a slide bar is presented in the driver intervention resolution process.

In step S86, the autonomous driving control section 53 displays, for example, an interface (slide bar IF) image including a slide bar for adjusting parameters that control a threshold and a safety factor required to determine a reflex action and a deliberate action on the display section 35, thereby prompting the adjustment of the parameters that control the threshold and the safety factor. That is, the autonomous driving control section 53 displays, for example, an image that includes the slide bar IF as depicted in FIG. 11, thereby prompting the adjustment of the parameters that control the threshold and the safety factor. FIG. 11 depicts a mark 151 indicating the occurrence of a conflict appears under the tachometer 122, and a gauge 141 for representing, by a continuous variable, parameters that control the threshold and the safety factor related to a deliberate action and a reflex action, and a slide bar 142 for specifying the parameters that control the threshold and the safety factor. The slide bar 142 is moved horizontally in FIG. 11 by touch panel operation and specifies the parameters that control the threshold and the safety factor to match the position pointed to on the gauge 141.

It should be noted that although an example is described here in which the parameters that control the threshold and the safety factor are specified using the slide bar IF, other parameters may be specified as long as they can be specified with the slide bar IF. For example, if the reflex action and the deliberate action can be treated with continuous variables, individually, a weight added to each action and so on may be specified when an action is determined by weighted average thereof.

In step S87, the autonomous driving control section 53 decides whether or not the slide bar 142 has been operated horizontally and repeats the same process until it is considered that the slide bar 142 has been operated horizontally. Then, when the slide bar 142 is operated, the process proceeds to step S88.

In step S88, the autonomous driving control section 53 finds an action that is the weighted average of the deliberate action and the reflex action in accordance with the weight specified by the slide bar 142 and selects this action that is the weighted average as a determined action.

It should be noted that when the repetitive stopping action within a set time period is not considered a determined action in step S85, the processes from step S86 to step S88 are skipped.

That is, the situation in which the repetitive stopping action within a set time period is selected as a determined action is, for example, likely to be an action of passing an oncoming vehicle on a narrow road. At this time, we assume that the deliberate action determines the direction of travel by referring to global map information, that the reflex action observes the surrounding circumstances, and that the width of the space around the own vehicle is smaller than the width specified by (own vehicle width+margin θ), the stopping action is selected as a determined action.

Under these circumstances, for example, there is a possibility that, in the presence of a bicycle parked on the roadside, the determined action may be unable to escape from a condition in which the determined action is a stopping action because of the difficulty in allowing for enough margin relative to the own vehicle width. Such a condition is called a deadlock, and as a result of continuing to select safe actions, the stopping action is repeatedly selected as a determined action, and the vehicle ends up remaining in that condition.

By changing the margin θ here using the slide bar 142, it is possible for the driver to adjust the motor vehicle behavior while watching the surrounding situation. To be more specific, the driver can control the motor vehicle by adjusting abstracted adjustment parameters using the slide bar 142 rather than directly controlling the motor vehicle's behavior using the accelerator and the wheel.

In general, it is difficult for ordinary drivers to specify these adjustment parameters properly. However, if the adjustment can be made using the slide bar 142 as depicted here, it is easy to deal with the real world and possible to make adjustment with ease regardless of the driver.

It should be noted that as an adjustment value that adjustment can be made easier by decelerating the motor vehicle as the weight specified by this slide bar 142 deviates from a reference value.

<Improvement for Suppressing the Occurrence of a Conflict>

A description has been given so far of examples for resolving a conflict using a reflex action and a deliberate action in accordance with a resolution mode specified in advance in the event of occurrence of a conflict. However, it is possible to make the driving control process smoother by suppressing the occurrence of a conflict itself.

For example, as for margins specified to find a reflex action and a deliberate action, a first value and a second value are specified. The first value contains almost no margin, and the second value contains enough margin, after which first and second reflex actions and first and second deliberate actions are found for these values.

Then, an action is determined based on each of the first and second reflex actions and the first and second deliberate actions, thereby making it possible to reduce conflicts.

For example, when the reflex action and the deliberate action select either a forward-driving action or a stopping action as a determined action, a determined action is determined in accordance with a combination of the first and second reflex actions and a combination of the first and second deliberate actions.

That is, FIG. 12 vertically depicts combinations of first and second reflex actions, and horizontally depicts combinations of first and second deliberate actions. Also, "G" is a mark that approves a forward-driving action as a determined action based on a combination of the first and second reflex actions and a combination of the first and second deliberate actions, and "N" is a mark that does not approve a forward-driving action and selects a stopping action as a determined action.

That is, if both the first reflex action and the first deliberate action, both with a small margin, of the combinations of the first and second reflex actions and those of the first and second deliberate actions depicted in FIG. 12 approve a forward-driving action (G/X where X may be N or G), and when the first reflex action is a stopping action, but the second reflex action is a forward-driving action (N/G), and, at the same time, both the first and second deliberate actions approve a forward-driving action (G/G), or when the first deliberate action is a stopping action, but the second deliberate action is a forward-driving action (N/G), and, at the same time, both the first and second reflex actions approve a forward-driving action (G/G), a forward-driving action (G) is selected as a determined action.

Conversely, if both the first reflex action and the first deliberate action, both with a small margin, of the combinations of the first and second reflex actions and those of the first and second deliberate actions depicted in FIG. 12 are stopping actions (N/X where X may be N or G), and when the first reflex action is a forward-driving action, but the second reflex action is a stopping action (G/N), and, at the same time, both the first and second deliberate actions approve a stopping action (N/N), or when the first deliberate action is a forward-driving action, but the second deliberate action is a stopping action (G/N), and, at the same time, both the first and second reflex actions approve a stopping action (N/N), a stopping action (N) is selected as a determined action.

Then, in such a case, when the combination of the first and second reflex actions and the combination of the first and second deliberate actions include both forward-driving actions (G/G), and when they include both stopping actions (N/N) (triangles in FIG. 12), a first conflict condition takes place. On the other hand, when each combination includes of a forward-driving action and a stopping action and includes a stopping action and a forward-driving action (squares in FIG. 12), a second conflict condition takes place.

In such a case, in the first conflict condition, the reflex actions and the deliberate actions produce opposite results. Therefore, a stopping action may be selected. In the second conflict condition, the reflex actions and the deliberate actions produce contradictory results. Therefore, the conflict condition may be resolved through driver intervention.

Also, in each of the first and second conflict conditions depicted in FIG. 12, one of the above seven kinds of conflict resolution modes may be specified.

Thus, a plurality of reflex actions and a plurality of deliberate actions, each with a different margin, are determined, and actions are determined based on a plurality of action patterns. This makes it possible to reduce the occurrences of conflicts, thereby ensuring smooth driving control process.

Further, although a description has been given heretofore of a process by which the autonomous driving control section 53 resolves a conflict by one of eight kinds of resolution modes specified in advance to determine an action, a conflict may be resolved, for example, by a conflict resolution apparatus that is separately realized by an external server and cloud computer using a network such as the Internet to realize more rigorous resolution of a conflict.

<Manual Driving Process>

Figure 13:
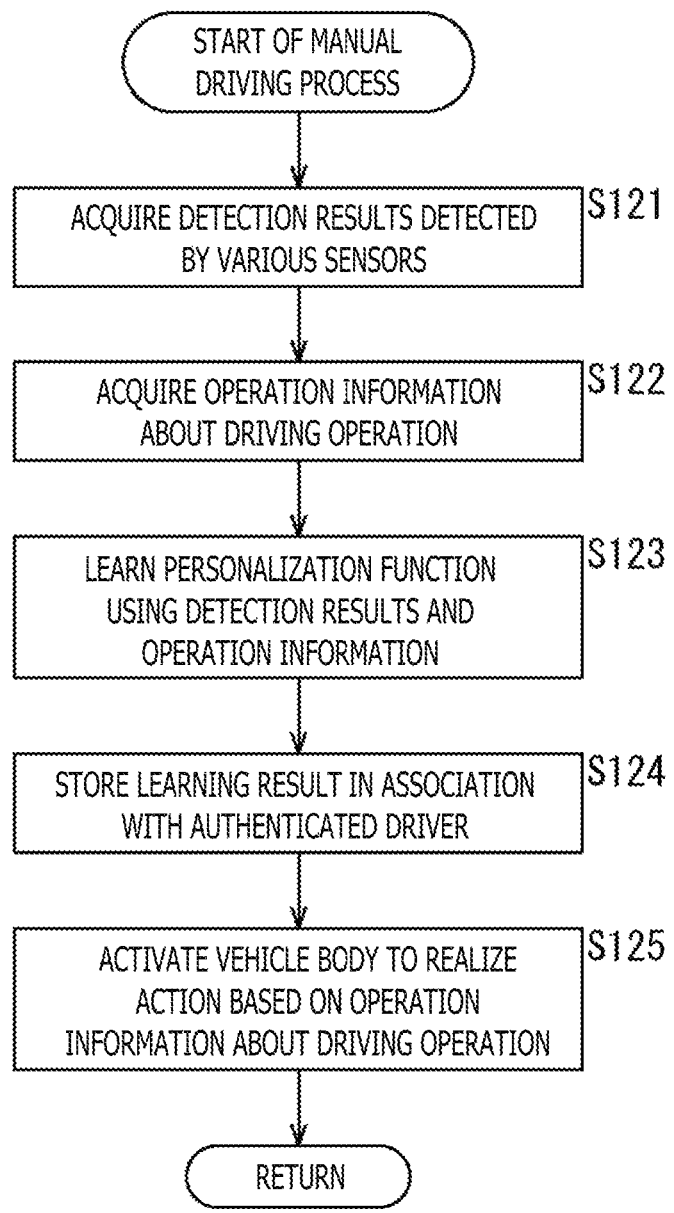
FIG. 13 is a flowchart describing a manual driving process depicted in FIG. 2.

A description will be given next of the manual driving process with reference to the flowchart depicted in FIG. 13.

In step S121, the personalization function learning section 91 of the personalization block 22 selects a learning model for learning the personalization function of the driver identified by authentication and a storage destination DB (database) in the learning result storage section 92 to match the driver and the user mode. It should be noted that if a learning model and a storage destination DB are not registered in advance in the learning result storage section 92, the personalization function learning section 91 creates a new personalization function to be learned to match the user mode and the new storage destination DB.

In step S122, the personalization function learning section 91 acquires, from the detection section 34, detection results detected by various sensors.

In step S123, the personalization function learning section 91 acquires operation information on the driver's driving operation based on operation signals supplied from the operation section 31. At this time, the manual driving control section 32 acquires the same operation signals.

In step S124, the personalization function learning section 91 causes the learning model that matches the habits and customs of the user mode at that time, the driver identified by authentication, to learn the personalization function by using operation information acquired from the operation section 31 and the detection results acquired from the operation section 34.

In step S125, the personalization function learning section 91 stores the personalization function acquired from learning in the learning result storage section 92 in association with the user mode at that time, the driver identified by authentication.

In step S126, the manual driving control section 32 supplies, to the vehicle body action section 33 including the components that render various actions of the vehicle body functional, a command that carries out the associated action based on operation information, thereby activating the vehicle body action section 33.

As a result of the processes described heretofore, the personalization function is learned to match the user mode based on operation information of the operation section 31 operated by the driver and detection results detected by the detection section 34 and is stored in the learning result storage section 92. At this time, the manual driving control section 32 supplies a command associated with operation information to the vehicle body action section 33, thereby controlling manual driving of the motor vehicle.

<Learning of a Personalization Function>

A description will be given here of learning of a personalization function.

We let the detection result (observation value) of the detection section 34 at time t be denoted by St, operation information of the driver be denoted by at, and further the target of the driving operation at that point in time be denoted by gt. Here, when one attempts to directly imitate the driver's operation, learning is a process of learning the function defined by the following formula (1) as a personalization function:

[Math. 1]

$$a_t = f(s_t, g_t) \tag{1}$$

We consider, for example, an action of stopping a motor vehicle. What is anticipated here is that the motor vehicle travels within a given lane, and smoothly decelerates and comes to a stop behind the vehicle in front or before the white stop line because of red light or other reason.

In this case, some people like to depress the brake pedal early while others like to come very close to the vehicle in front, decelerate rapidly, and come to a stop. Further, still others like to keep a distance and stop at his or her desired speed without being affected by the behavior of the vehicle in front.

The personalization function learning section 91 extracts, from operation information making up the driving operation history of the driver, a piece of operation information that corresponds to the action of stopping the motor vehicle driven by the driver within a lane and configures a set Xstop. The learning problem in this case is expressed by the function depicted as formula (2).

[Math. 2]

$$a_t = f_{stop}(s_t) \tag{2}$$

A function $f_{stop}(S_t)$ is a function obtained from detection results related to an action of stopping within a lane.

The objective here is to imitate the driver's behavior. Therefore, learning is achieved by realizing the following formula (3):

[Math. 3]

$$\min \sum_{(s_i, a_i) \in X_{stop}} f_{diff}(a_i, f_{stop}(s_i)) \tag{3}$$

The following formula (4), for example, can be used as an error function:

[Math. 4]

$$f_{diff}(a_1, a_2) \equiv \|a_1 - a_2\|^2 \tag{4}$$

Then, learning by function approximation is carried out that makes an output value of a machine represented by the following formula (5) approach an instructor signal ai with respect to history data Xstop including operation information at the time of stopping within a lane.

[Math. 5]

$$a_i = f_{stop}(s_i) \qquad (5)$$

A learner called Deep Learning based on multi-layered feedforward neural network, for example, can be used as a learner. For more information about learning with Deep Learning, "Machine Learning Professional Series: Deep Learning (Takayuki Okaya, Kodansha Scientific)," for example, should be referred to. Naturally, not only this but also an arbitrary function approximator may be used.

It should be noted that the operation information at may be learned with the detection result St in a given condition by inverse reinforcement learning using the driver's driving operation as an instructor signal.

Also, data other than the above may be used for learning, and for example, information about the driver, information about passengers, information about in-vehicle environment, information about out-vehicle environment, information about motor vehicle's traveling plan, and so on may be used.

Here, specific information about the driver may include one or a plurality of pieces of information from among driver's vital information (e.g., heart rate, pulse, blood pressure, temperature, blood sugar level, breath alcohol concentration, blood alcohol concentration, blood oxygen concentration, awakeness level, concentration level, feeling, emotion, brain wave), and information about the driver's attitude, line of sight, body motion information, and so on, movements, and behavioral state.

Also, information about passengers may include one or a plurality of pieces of information from among number of passengers, ages, sexes, seat positions, usage condition of safety apparatuses such as seat belts, fellow passenger vital information (e.g., heart rate, pulse, blood pressure, temperature, blood sugar level, breath alcohol concentration, blood alcohol concentration, blood oxygen concentration, awakeness level, concentration level, feeling, emotion, brain wave), and information about the driver's attitude, line of sight, body motion information, and so on, movements, and behavioral state.

Further, information about in-vehicle environment may include one or a plurality of pieces of information from among in-vehicle (at driver's seat, assistant driver's seat, and each passenger's seat) environment measured values (e.g., temperature, humidity, air flow, vibration, noise, illuminance, oxygen concentration), data of sensors mounted to the target motor vehicle, real-time information related to motor vehicle's motion, motor vehicle's position, traveling direction (and measurement accuracy thereof), motor vehicle's speed, angular speed, acceleration, and angular acceleration (and measurement accuracy thereof), operation values in connection with the accelerator, brake, and steering, operation information of turn signals, windshield wipers, and other mounted equipment, activation states of safety apparatuses such as ABS (Antilock Brake System), TCS (Traction Control System), LKAS (Lane Keep Assist System), and ACC (Adaptive Cruise Control), and failure-related information or warning information and error information.

Also, information about out-vehicle environment may include one or a plurality of pieces of information from among positions, traveling directions, speeds, angular speeds, accelerations, and angular accelerations (and measurement accuracy thereof) of surrounding nearby motor vehicles (including motorcycles), operational states of brake lamp, turn signals, hazard lamp of surrounding nearby motor vehicles (including motorcycles), V2V (Vehicle to Vehicle) communication data from surrounding nearby motor vehicles (including motorcycles), positions, traveling directions, speeds, angular speeds, accelerations, and angular accelerations (and measurement accuracy thereof) of surrounding light motor vehicles, positions, traveling directions, speeds, angular speeds, accelerations, and angular accelerations (and measurement accuracy thereof) of surrounding pedestrians, states of traffic lights in surrounding area, and in particular, states of those ahead, information about accidents, construction works, lane closures, or the like on the roads to be travelled by the motor vehicle in question, V2X (Vehicle to X (X: Everything)) communication data from surrounding pedestrians or out-vehicle infrastructure, and climate and weather information in the area to be travelled by the motor vehicle in question.

Further, information about traveling plan of the motor vehicle in question may include one or a plurality of pieces of information from among origin and departure time, or destination (a plurality of candidates thereof), or area scheduled to be traveled, current location and current time, and traveling (scheduled) route from origin to destination (candidate).

<Personalization Function Updating Process>

Figure 14:
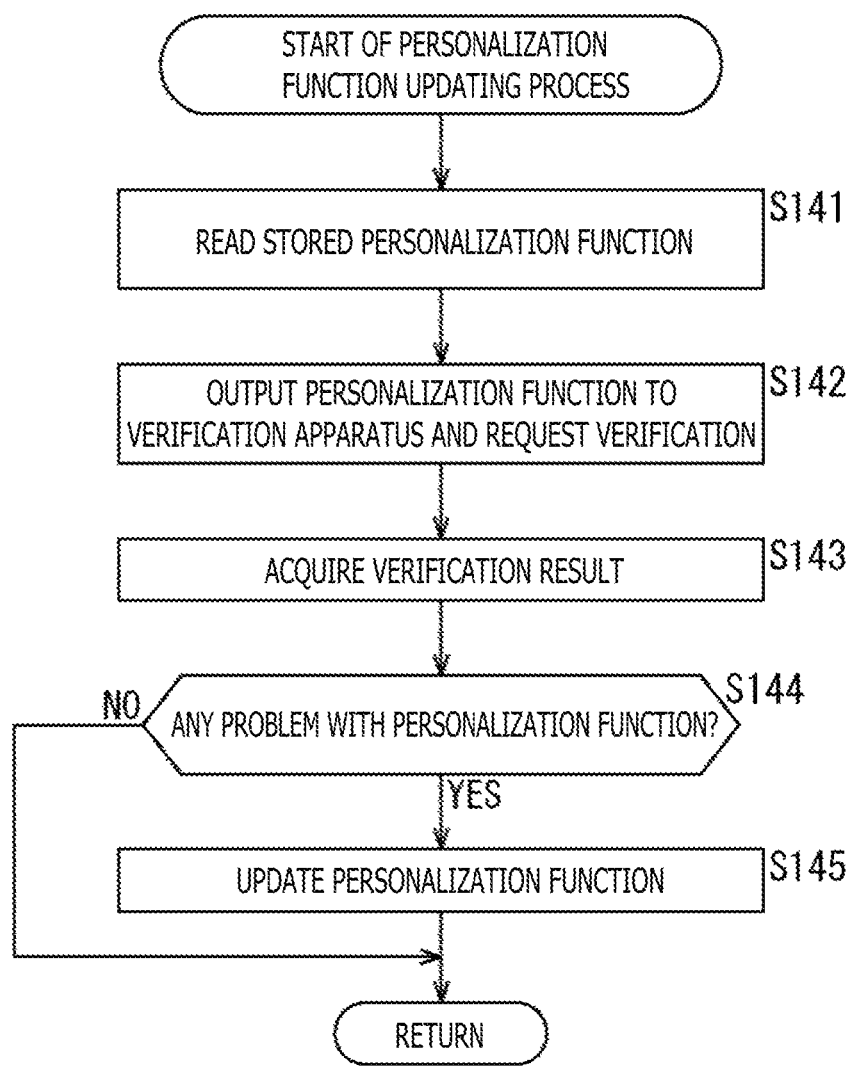
FIG. 14 is a flowchart describing a personalization function updating process depicted in FIG. 2.

A description will be given next of the personalization function updating process with reference to the flowchart depicted in FIG. 14.

The personalization function updating process is generally carried out after the end of the driving control process as described with reference to FIG. 2. However, the personalization function updating process may be carried out at other timing as long as the driving control process is not in progress.

In step S141, the learning result verification section 93 reads a personalization function stored in the learning result storage section 92. When there are a plurality of personalization functions or when there is a personalization function for each of a plurality of user modes, the learning result verification section 93 reads these functions individually.

In step S142, the learning result verification section 93 supplies the read personalization function to the verification apparatus 13 via a network, typically the Internet, and requests verification. As a result of this process, the verification apparatus 13 carries out a verification process, thereby verifying whether or not there is any problem with the action of the personalization function such as safety. It should be noted that the verification process will be described later with reference to FIG. 15 onward.

In step S143, the verification result decision section 94 acquires the verification result from the verification apparatus 13.

In step S144, the verification result decision section 94 decides, based on a verification result, whether or not the corrected action using the personalization function has realized problem-free driving in a virtual space. In step S144, when it is considered, for example, that the corrected action using the personalization function has realized problem-free driving in a virtual space, the process proceeds to step S145.

In step S145, the verification result decision section 94 notifies the personalization function updating section 95 that the action of the corrected command using the personalization function has realized problem-free driving. As a result of this notice, the personalization function updating section 95 updates the personalization function of the associated driver and the associated user mode that is stored in the personalization function storage section 54 with the personalization function that has undergone learning to a problem-free level and that is stored in the learning result storage section 92.

It should be noted that, in step S144, when it is considered, for example, that the action of the corrected command using the personalization function has failed to realize problem-free driving, the process in step S145 is skipped, and the personalization function is not updated. Also, when there are personalization functions for a plurality of drivers, or when there is a personalization function specified for each of a plurality of user modes, each personalization function is subjected to the verification process and updated individually depending on the verification result.

That is, as a result of the processes described heretofore, a personalization function is found for each driver and for each user mode by learning. Further, the verification process is carried out individually. When there is no problem with the autonomous driving process carried out by the corrected action corrected by using a personalization function for each, the personalization function is corrected.

As a consequence, of the personalization functions learned in such a manner as to reflect driving-related habits and customs of the driver in manual driving mode, only those considered error-free by the verification process are updated.

As a result, even in autonomous driving mode, it is possible to safely realize autonomous driving control that reflects driving habits and customs of the target driver in manual driving mode for each driver and for each driver's user mode.

Also, in the case of a neural network, personalization functions such as network weights are updated to those that have undergone learning. In general, "dictionary data" for calculating the operation information at for the detection result St is updated. However, the calculation algorithm itself may be changed so that the execution code itself of the function for calculating the operation information at as an output result by using the detection result St as an input is replaced.

<Configuration Example of the Verification Apparatus>

Figure 15:
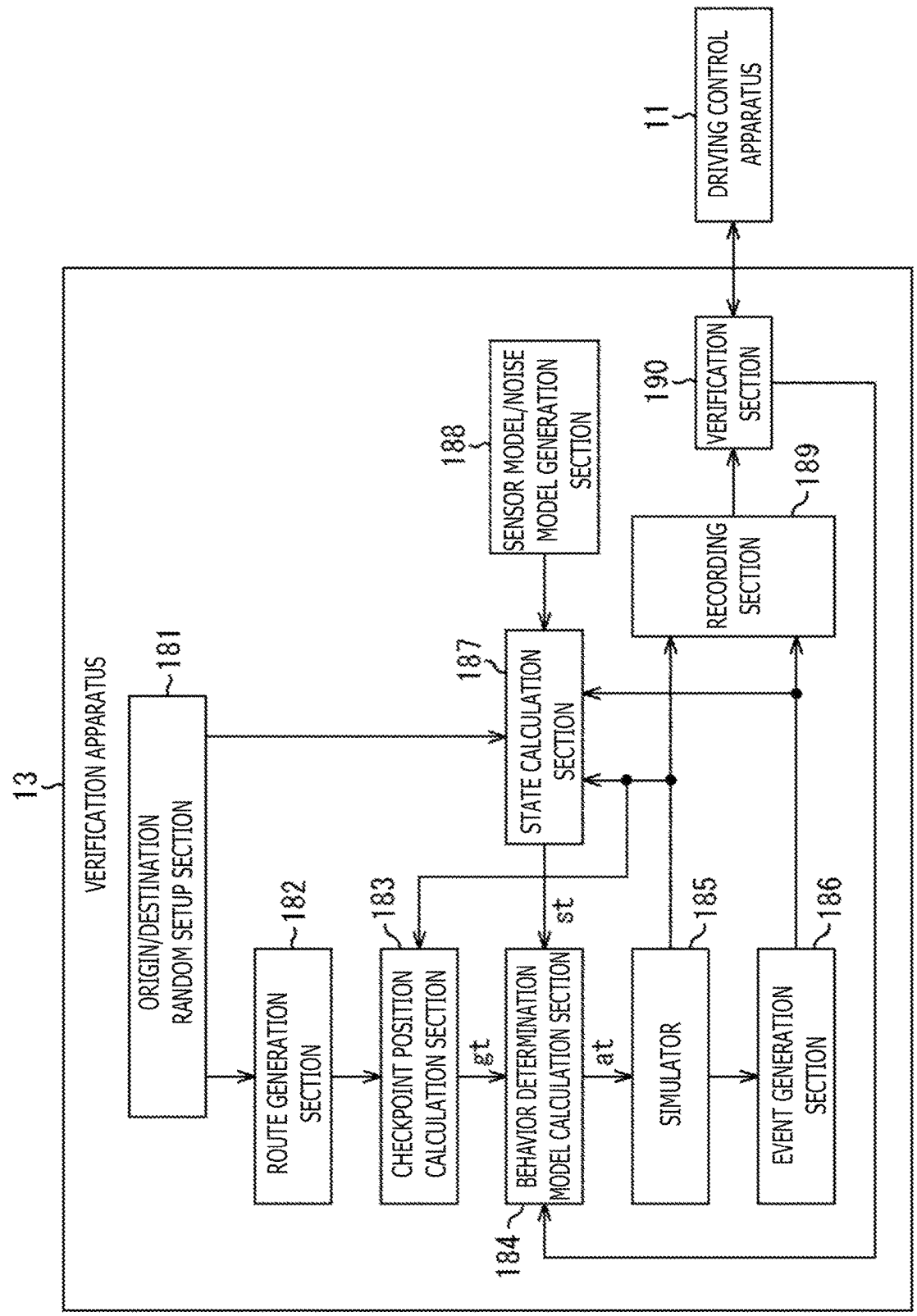
FIG. 15 is a diagram describing a configuration example of a verification apparatus to which the present disclosure is applied.

A description will be given next of a configuration example of the verification apparatus 13 with reference to the block diagram depicted in FIG. 15.

The verification apparatus 13 is designed to verify safety and other factors of the personalization function whose verification has been requested by the driving control apparatus 11. To be more specific, the verification apparatus 13 virtually reproduces simulated driving of a motor vehicle equipped with the driving control apparatus 11 in a virtual space in autonomous driving mode using a personalization function, thereby confirming the presence or absence of defects such as accidents and verifying safety and other factors of the personalization function.

More specifically, the verification apparatus 13 includes an origin/destination random setup section 181, a route generation section 182, a checkpoint position calculation section 183, a behavior determination model calculation section 184, a simulator 185, an event generation section 186, a state calculation section 187, a sensor model/noise model generation section 188, a recording section 189, and a verification section 190.

The origin/destination random setup section 181 randomly specifies an origin and a destination in a virtual space and supplies them to the route generation section 182 and the state calculation section 187.

The route generation section 182 specifies a route from the origin and the destination specified by the origin/destination random setup section 181 and supplies the route to the checkpoint position calculation section 183.

Figure 16:
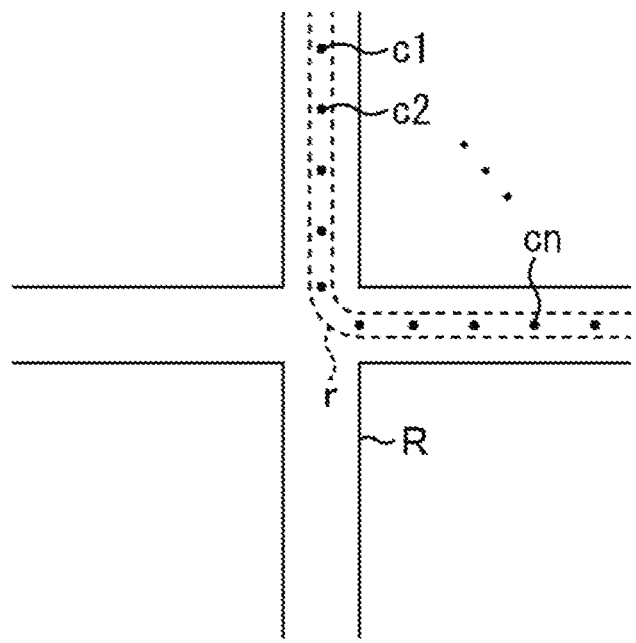
FIG. 16 is a diagram describing checkpoints.

The checkpoint position calculation section 183 calculates a next checkpoint on the generated route and specifies the driving operation target 'gt' at the checkpoint. The checkpoint here refers, for example, to a point where a state is calculated and a behavior is determined on the route map depicted in FIG. 16. In FIG. 16, the positions depicted by black dots on a route r specified along a road R drawn in the map are checkpoints c1 to cn. Then, the next driving operation target 'gt' is specified for each of these checkpoints c1 to cn.

Among specific examples of the driving operation target 'gt' are "relative position and relative attitude angle of next checkpoint (relative to own vehicle)," "speed and acceleration profile when passing checkpoint," and "curvature of route scheduled to be travelled (at checkpoint)." In the stop scene, for example, the speed and the acceleration are 0 (at the stop line) 100 m ahead with the car oriented in the same direction as now.

The sensor model/noise model generation section 188 builds various sensor models making up the detection section 34, generates a noise model for each sensor, and supplies them to the state calculation section 187.

The state calculation section 187 calculates, as a state 'St,' a detection result (observation value) likely to be detected by the detection section 34 based on the traveling position in a virtual space supplied from the simulator 185, event information such as someone rushing out and weather change supplied from the event generation section 186, and sensor model and noise model information supplied from the sensor model/noise model generation section 188.

More specifically, the state 'St' is a virtual detection result of the detection section 34 mounted to the motor vehicle equipped with the driving control apparatus 11 and that has learned a personalization function. The state 'St' is, for example, a "millimeter wave radar" and an "image captured by a stereo camera" or "positions, traveling directions, speeds, angular speeds, accelerations, and angular accelerations of surrounding nearby motor vehicles" and "position, traveling direction, speed, angular speed, acceleration, and angular acceleration of motor vehicle." Also, the detection result may be various kinds of information in addition to the above, and it is possible to contribute to "personalization" by using various kinds of information. For example, it is possible to reflect driving-related habits and customs on highways and common roads and at daytime and nighttime.

It should be noted that, as for the origin for which the traveling state is reproduced by the simulator 185, information supplied from the origin/destination random setup section 181 is used.

The behavior determination model calculation section 184 determines a behavior determination model 'at' using the personalization function supplied from the verification section 190 and whose verification has been requested based on the driving operation target 'gt' at the checkpoint supplied from the checkpoint position calculation section 183 and the state 'St' supplied from the state calculation section 187. The behavior determination model calculation section 184 supplies the behavior determination model 'at' to the simulator 185. This behavior determination model 'at' corresponds to driver's operation information described above.

The simulator 185 reproduces the traveling (action) of the motor vehicle to which the driving control apparatus 11 is mounted in a virtual space based on the behavior determination model 'at' supplied from the behavior determination model calculation section 184 and supplies the result thereof to the event generation section 186, the state calculation section 187, and the recording section 189. The action in the virtual space found by the simulator 185 is theoretically the action itself of the motor vehicle determined by the autonomous driving control block 21.

The event generation section 186 generates events by using the results of the actions at the checkpoints, successively supplied from the simulator 185, as triggers and supplies the events to the state calculation section 187 and the recording section 189.

The recording section 189 records the simulation results supplied from the simulator 185 and various events supplied from the event generation section 186 in association with each other for each checkpoint. That is, the recording section 189 successively records the verification results of the motor vehicle to which the driving control apparatus 11 is mounted in the virtual space while this verification process is in progress.

The verification section 190 accepts a personalization function supplied from the driving control apparatus 11 and whose verification has been requested and supplies the accepted personalization function to the behavior determination model calculation section 184. Also, the verification section 190 reads the verification results recorded in the recording section 189 and supplies the results to the driving control apparatus 11 in association with the personalization function whose verification has been requested.

<Verification Process>

Figure 17:
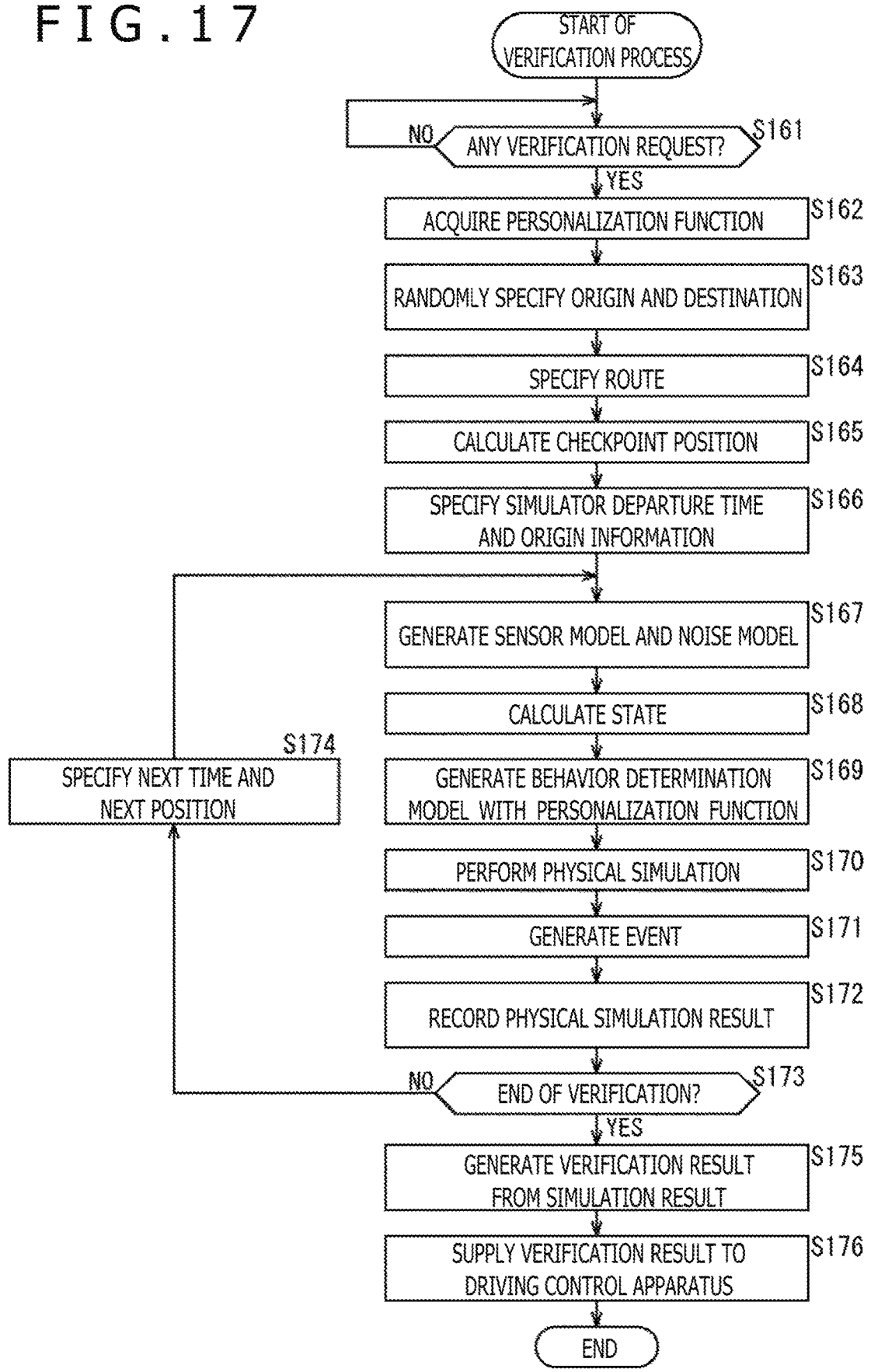
FIG. 17 is a flowchart describing a verification process handled by the verification apparatus depicted in FIG. 15.

A description will be given next of the verification process handled by the verification apparatus 13 depicted in FIG. 15 with reference to the flowchart depicted in FIG. 17.

In step S161, the verification section 190 decides whether or not the driving control apparatus 11 has sent a request for verification of a personalization function via a network and repeats the same process until a request is made. For example, when a request is sent together with a personalization function as a result of the process in step S142 depicted in FIG. 14, the process proceeds to step S162.

In step S162, the verification section 190 acquires a personalization function sent and supplies the function to the behavior determination model calculation section 184.

In step S163, the origin/destination random setup section 181 randomly specifies an origin and a destination in the virtual space in the simulator 185 and supplies them to the route generation section 182 and the state calculation section 187.

In step S164, the route generation section 182 generates a route based on the origin and destination randomly specified by the origin/destination random setup section 181 and supplies the route to the checkpoint position calculation section 183.

In step S165, the checkpoint position calculation section 183 calculates, based on the route supplied, the position of the next checkpoint on the route, specifies the driving operation target 'gt,' and supplies the target to the behavior determination model calculation section 184.

In step S166, the state calculation section 187 specifies a departure time and an origin in the simulator 185.

In step S167, the sensor model/noise model generation section 188 generates sensor model and noise model information and supplies the information to the state calculation section 187.

In step S168, the state calculation section 187 calculates the state 'St' based on the current time, position, and sensor model and noise model information in the simulator 185 and supplies the state to the behavior determination model calculation section 184. It should be noted that when an event is generated by the event generation section 186 which will be described later, the state 'st' is calculated in consideration of the event generated.

In step S169, the behavior determination model calculation section 184 calculates the behavior determination model 'at' using the personalization function whose verification has been requested and supplies the model to the simulator 185. To be more specific, in the case of a personalization function f whose verification has been requested, the behavior determination model calculation section 184 calculates the behavior determination model 'at' (=f(st, gt)) by inputting information of the state 'St' and the driving operation target 'gt' to the personalization function f.

In step S170, the simulator 185 carries out physical simulation and supplies the simulation result to the event generation section 186, the state calculation section 187, and the recording section 189. That is, the simulator 185 reproduces a traveling state in the virtual space that takes place when the motor vehicle to which the driving control apparatus 11 is mounted undergoes the driving operation identified by the behavior determination model 'at.'

In step S171, the event generation section 186 generates an event that matches the behavior of the motor vehicle to which the driving control apparatus 11 is mounted in the virtual space supplied from the simulator 185. The event generation section 186 supplies the event to the state calculation section 187 and the recording section 189.

In step S172, the recording section 189 records the event generated by the event generation section 186 and the simulation result of the simulator 185 in association with the checkpoint.

In step S173, the verification section 190 decides whether or not the verification is over. The end of the verification process is specified, for example, by the duration of simulation and arrival time at the destination. When the verification is not over in step S173, the process proceeds to step S174.

In step S174, the checkpoint position calculation section 183 calculates the position of the next checkpoint, specifies the driving operation target 'gt' at that checkpoint, and supplies the target to the behavior determination model calculation section 184, and the process returns to step S167.

That is, the processes from step S167 to step S174 are repeated until the verification process is over.

Then, when it is considered in step S173 that the verification is over, the process proceeds to step S175.

In step S175, the verification section 190 generates a verification result based on the simulation result recorded in the recording section 189.

In step S176, the verification section 190 supplies the generated verification result to the driving control apparatus 11.

Because of the above process, it is possible to verify safety when the autonomous driving process is performed by a personalization function. It should be noted that when the verification result is sent to the driving control apparatus 11, the personalization function is updated only when there are no accidents and no problems as a result of the processes from step S143 onward in FIG. 14.

It should be noted that motor vehicle's action modes such as "traveling on highway," "traveling on common road (lane)," "passing intersection," "stopping/decelerating," "traveling in non-lane area (parking area)," "making U-turn," and "parked on road shoulder" may be added as the driving operation target 'gt' and the state 'St.' This may facilitate personalization function learning.

Also, although an example has been described above in which the verification apparatus 13 is configured as an external apparatus via a network, typically, the Internet, the verification apparatus 13 may be provided in the driving control apparatus 11 by reinforcing the hardware function.

2. First Modification Example

Although an example has been described above in which only a verification result found by the verification process is supplied from the verification apparatus 13 to the driving control apparatus 11, failure data that resulted, for example, in an accident during simulation and correct data that can avoid accidents may be supplied to the driving control apparatus 11 together with a verification result. As a result, the driving control apparatus 11 can realize relearning because of feedback of failure data and correct data.

<Configuration Example of the Verification Apparatus in the First Modification Example>

A description will be given next of a configuration example of the verification apparatus 13 that supplies not only a verification result but also failure data and correct data to the driving control apparatus 11 with reference to the block diagram depicted in FIG. 18. It should be noted that the components in FIG. 18 having the same functions as those of the verification apparatus 13 depicted in FIG. 15 are denoted by the same names and the same reference numerals, and the description thereof will be omitted. That is, the verification apparatus 13 depicted in FIG. 18 differs from the verification apparatus 13 depicted in FIG. 15 in that a verification section 201 is provided rather than the verification section 190.

The verification section 201 has the same basic functions as the verification section 190 and further supplies not only a verification result but also failure data and correct data to the driving control apparatus 11 if there is a problem with the verification result of the personalization function.

<Configuration Example of the Driving Control Apparatus in the First Modification Example>

A description will be given next of a configuration example of the driving control apparatus 11 that receives not only a verification result but also failure data and correct data from the verification apparatus 13. It should be noted that the components in FIG. 19 having the same functions as those of the driving control apparatus 11 depicted in FIG. 1 are denoted by the same names and the same reference numerals, and the description thereof will be omitted.

Figure 19:
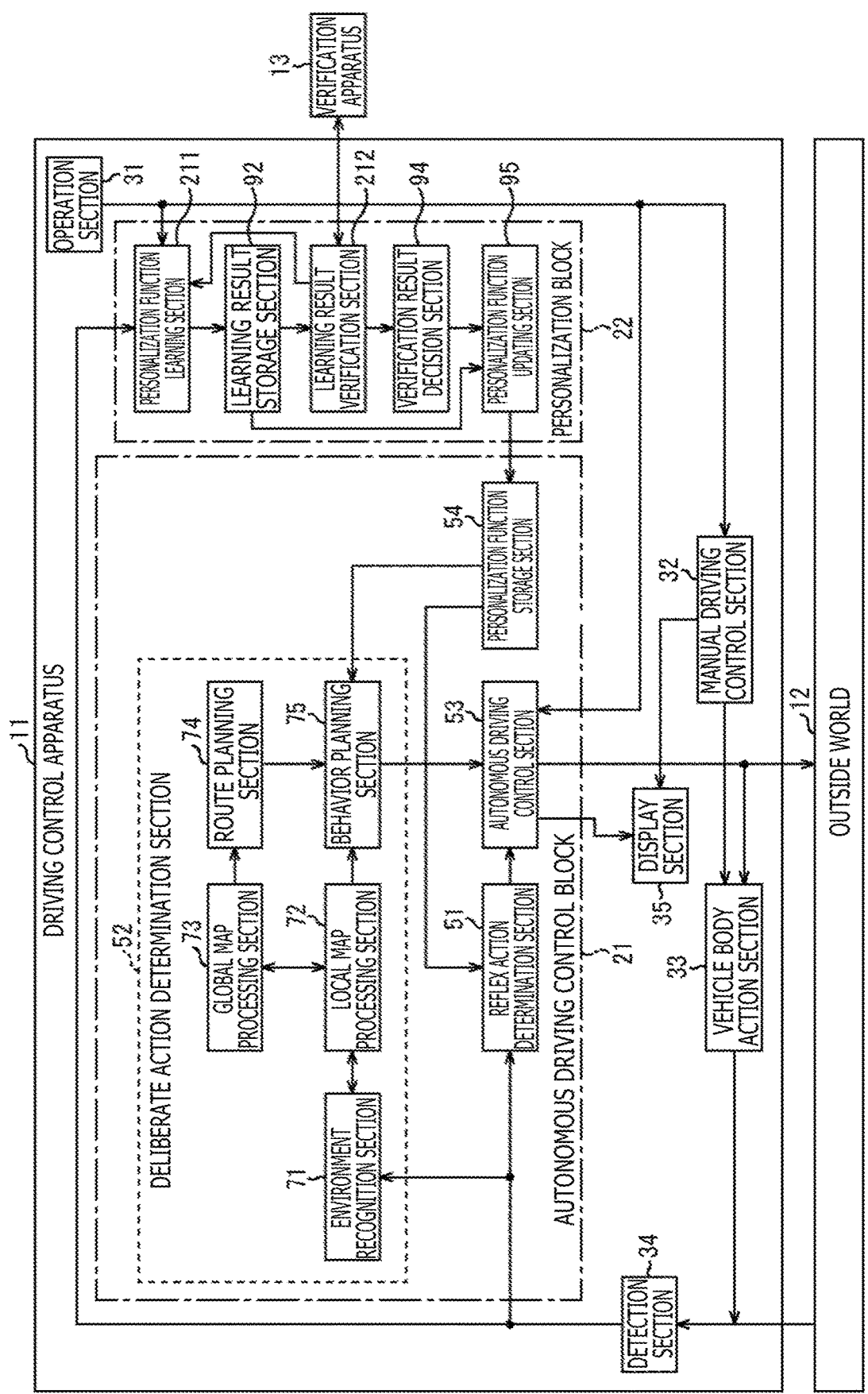
FIG. 19 is a diagram describing a first modification example of the driving control apparatus to which the present disclosure is applied.

That is, the driving control apparatus 11 depicted in FIG. 19 differs from the driving control apparatus 11 depicted in FIG. 1 in that a personalization function learning section 211 and a learning result verification section 212 are provided rather than the personalization function learning section 91 and the learning result verification section 93.

The learning result verification section 212 basically has the same functions as the learning result verification section 93 and further receives a verification result, failure data, and correct data sent from the verification apparatus 13 depicted in FIG. 19. At this time, when failure data and correct data are received together with a verification result indicating that there is a problem with the personalization function whose verification has been requested, the learning result verification section 212 feeds the failure data and the correct data back to the personalization function learning section 211.

The personalization function learning section 211 basically has the same functions as the personalization function learning section 91 and further uses the failure data and the correct data hereafter for function learning when these pieces of data are received from the learning result verification section 212.

Figure 18:
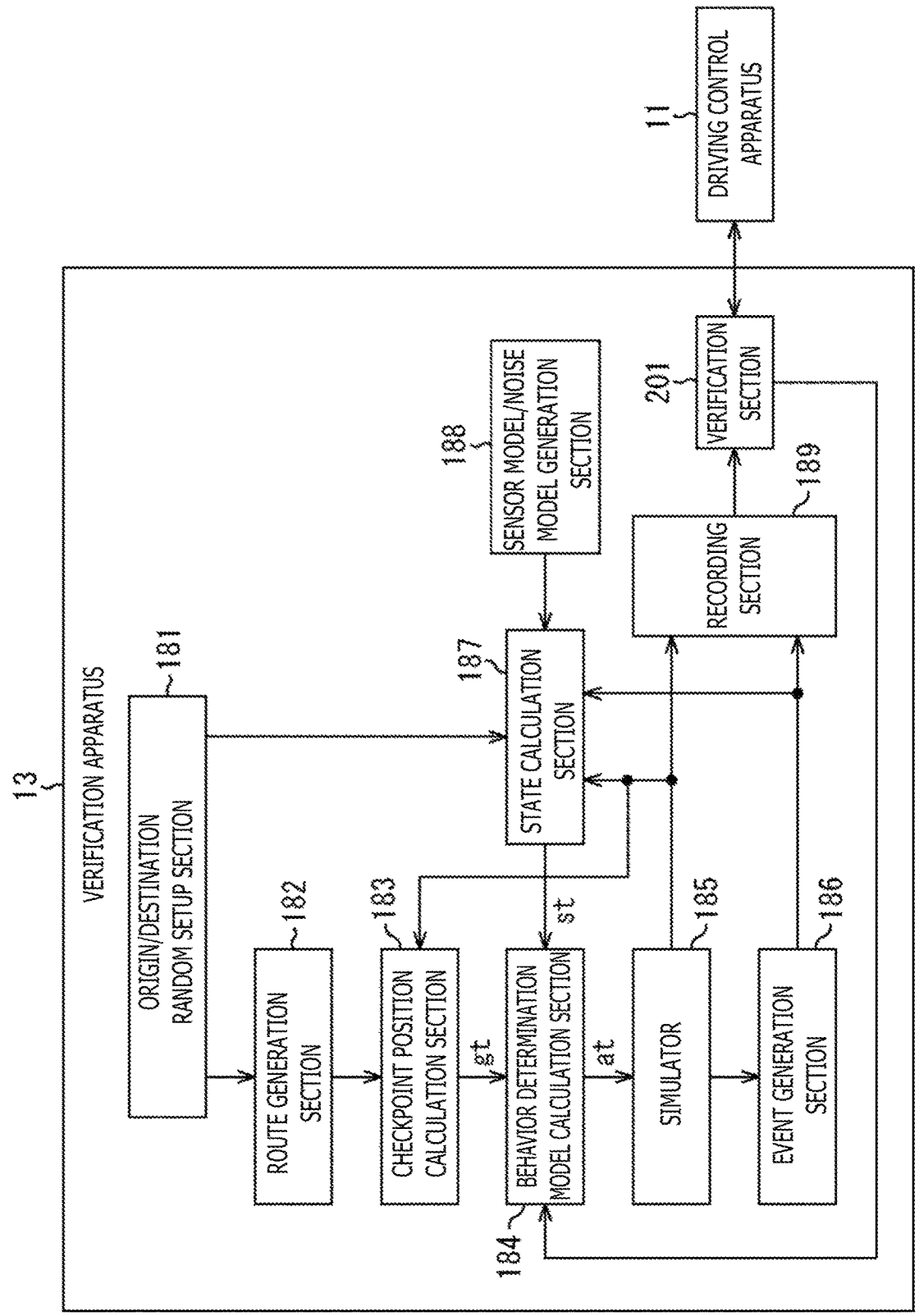
FIG. 18 is a diagram describing a first modification example of the verification apparatus to which the present disclosure is applied.

<Verification Process Handled by the Verification Apparatus Depicted in FIG. 18>

Figure 20:
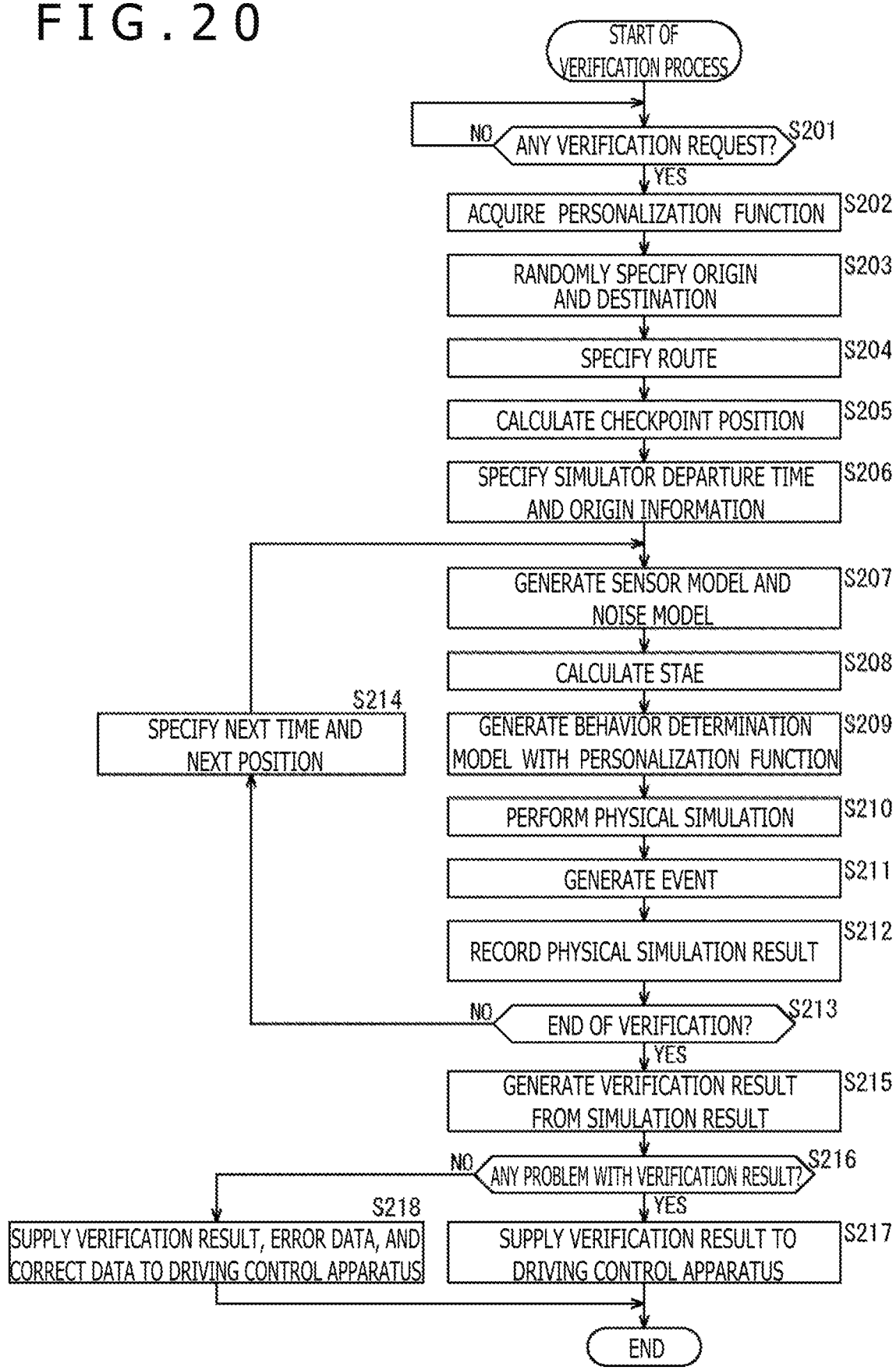
FIG. 20 is a flowchart describing the verification process handled by the verification apparatus depicted in FIG. 18.

A description will be given here of the verification process handled by the verification apparatus 13 in FIG. 18 for sending not only a verification result but also failure data and correct data to the driving control apparatus 11 with reference to the flowchart depicted in FIG. 20. It should be noted that because the processes from step S201 to step S215 and that in step S217 in FIG. 20 are the same as those from step S161 to step S176 in FIG. 17, the description thereof will be omitted.

That is, in step S216, the verification section 201 decides whether or not there is any problem with the verification result. Here, if there is a problem with the verification result, the process proceeds to step S218.

In step S218, the verification section 201 supplies not only the verification result but also failure data and correct data to the driving control apparatus 11.

As a result of the above process, it is possible to supply not only a verification result but also failure data and correct data to the driving control apparatus 11 if there is a problem with a personalization function.

<Personalization Function Updating Process Handled by the Driving Control Apparatus 11 Depicted in FIG. 19>

Figure 21:
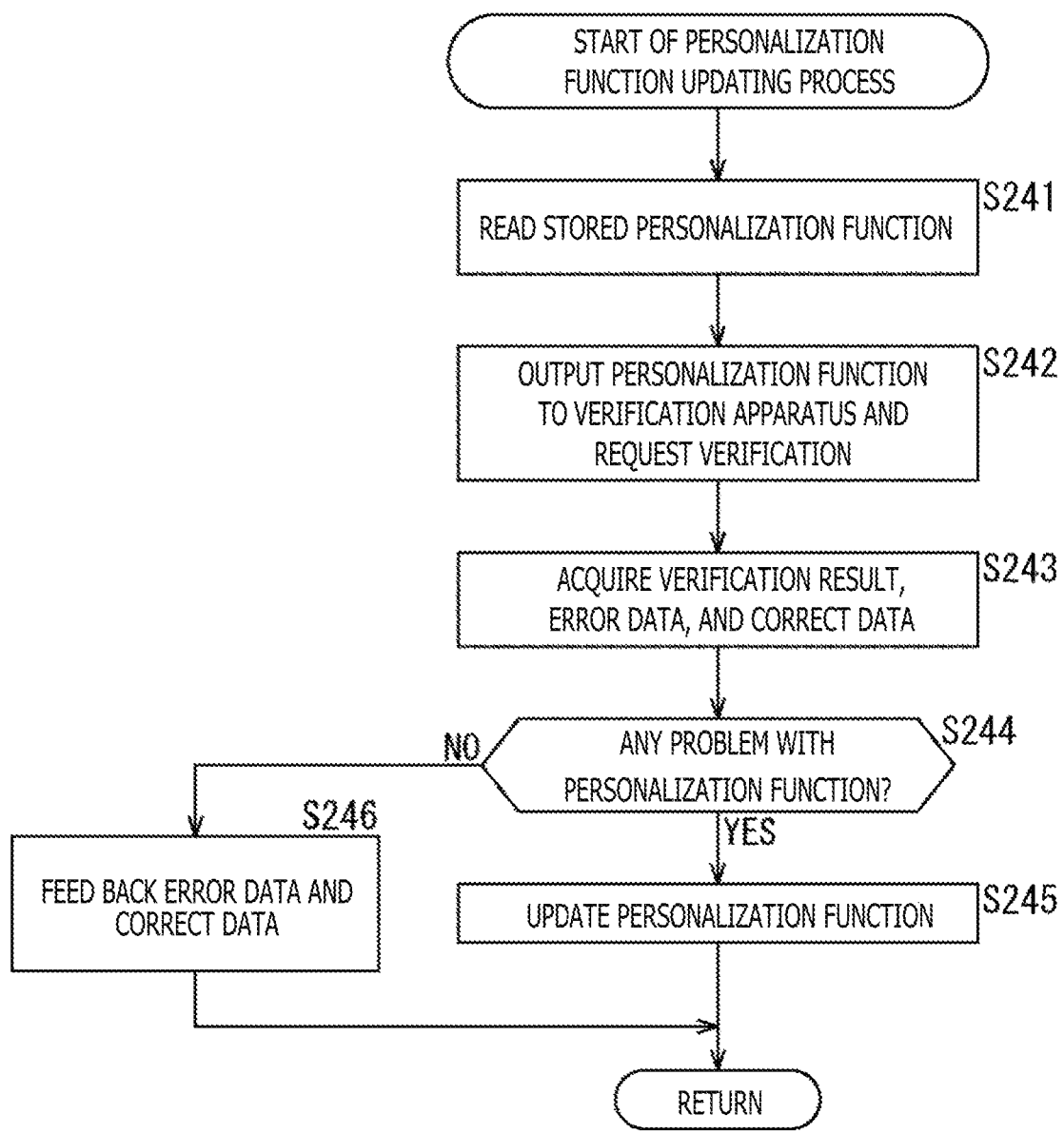
FIG. 21 is a flowchart describing the personalization function updating process handled by the driving control apparatus depicted in FIG. 19.

A description will be given next of the personalization function updating process handled by the driving control apparatus 11 in FIG. 19 to which not only a verification result but also failure data and correct data are sent with reference to the flowchart depicted in FIG. 21. It should be noted that because the processes in steps S241, S242, S244, and S245 in FIG. 19 are the same as those in steps S141, S142, S144, and S145 in FIG. 14, the description thereof will be omitted as appropriate.

That is, in step S243, the learning result verification section 212 acquires failure data and correct data together with a verification result.

Then, in step S244, if there is a problem with the personalization function, the process proceeds to step S246.

In step S246, the learning result verification section 212 supplies the failure data and the correct data to the personalization function learning section 211 for feedback.

The above process allows for learning by the learning result verification section 212 using the failure data and the correct data, thereby realizing relearning. It should be noted that failure data is required for relearning. Therefore, correct data is not essential.

3. Second Modification Example

Although a description has been given above of an example of the verification apparatus 13 that causes the driving control apparatus 11 to send not only a verification result but also failure data and correct data, the updating of a personalization function may be facilitated by subjecting a personalization function to retraining through simulation in the verification apparatus 13 and sending the personalized function back to the driving control apparatus 11 as a corrected function if there is a problem with the personalization function. This makes it possible to receive a corrected function and realize early updating even if a perfect personalization function cannot be achieved by the driving control apparatus 11 by learning.

<Configuration Example of the Verification Apparatus in the Second Modification Example>

A description will be given next of a configuration example of the verification apparatus 13 that generates a corrected function by correcting a personalization function whose verification result has been found to be problematic by retraining and supplies not only a verification result but also failure data and correct data to the driving control apparatus 11. It should be noted that the components in FIG. 22 having the same functions as those of the verification apparatus 13 depicted in FIG. 18 are denoted by the same names and the same reference numerals, and the description thereof will be omitted.

Figure 22:
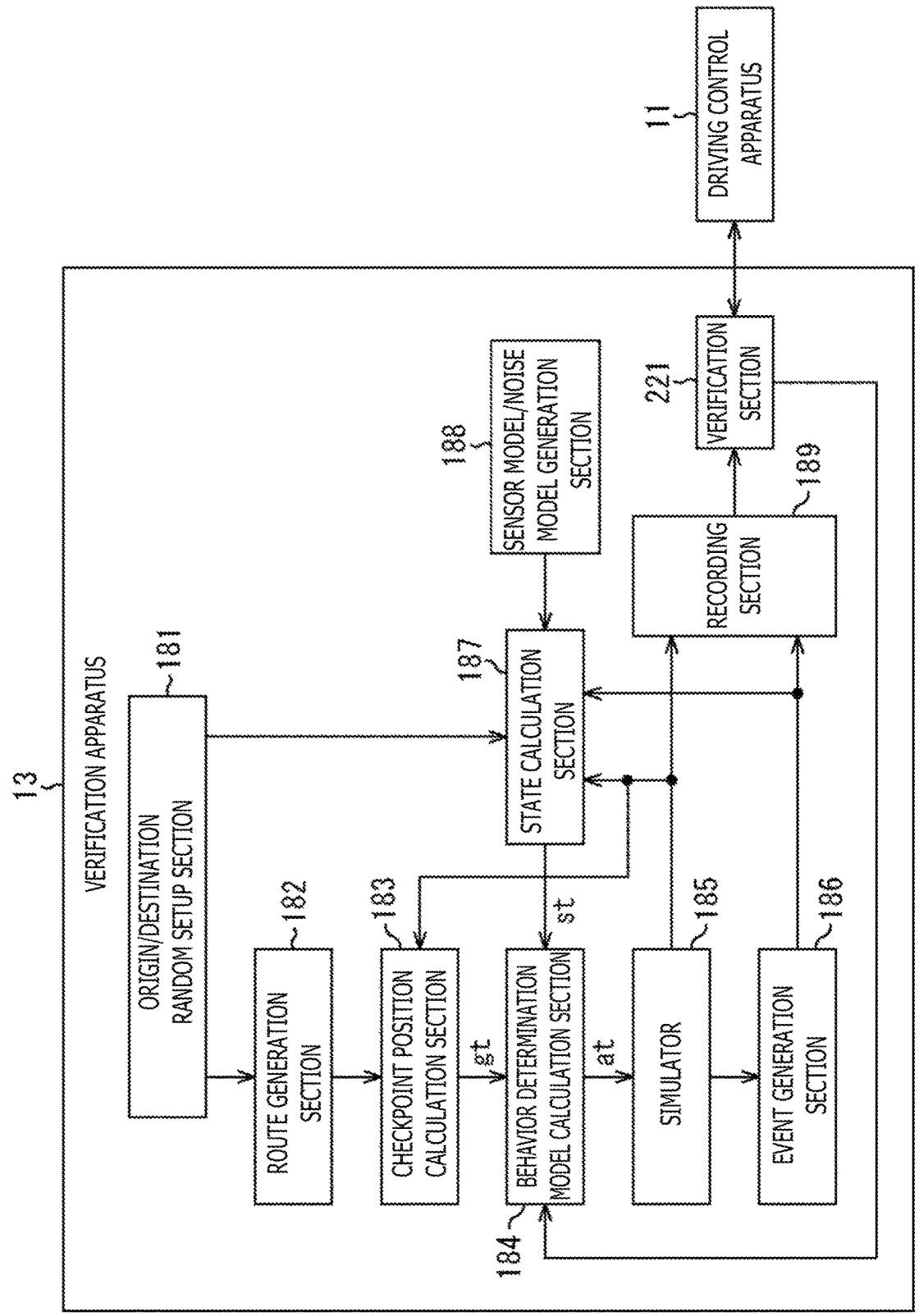
FIG. 22 is a diagram describing a second modification example of the verification apparatus to which the present disclosure is applied.

That is, the verification apparatus 13 depicted in FIG. 22 differs from the verification apparatus 13 depicted in FIG. 18 in that a verification section 221 is provided rather than the verification section 201.

The verification section 221 has the same basic functions as the verification section 201 and further generates a corrected function by subjecting a personalization function to retraining (relearning) if there is a problem with the verification result of the personalization function, and supplies not only a verification result but also failure data and correct data to the driving control apparatus 11. At this time, the verification section 221 subjects the corrected function to the verification process in the same manner as for the personalization function and sends the verification result to the driving control apparatus 11. In this case, therefore, the verification section 221 sends failure data and correct data to the driving control apparatus 11 together with two kinds of verification results, one for the personalization function whose verification has been requested and another for the corrected function.

<Configuration Example of the Driving Control Apparatus in the First Modification Example>

A description will be given next of a configuration example of the driving control apparatus 11 for receiving not only verification results but also failure data, correct data, and a corrected function from the verification apparatus 13 with reference to FIG. 23. It should be noted that the components in FIG. 23 having the same functions as those of the driving control apparatus 11 depicted in FIG. 19 are denoted by the same names and the same reference numerals, and the description thereof will be omitted.

Figure 23:
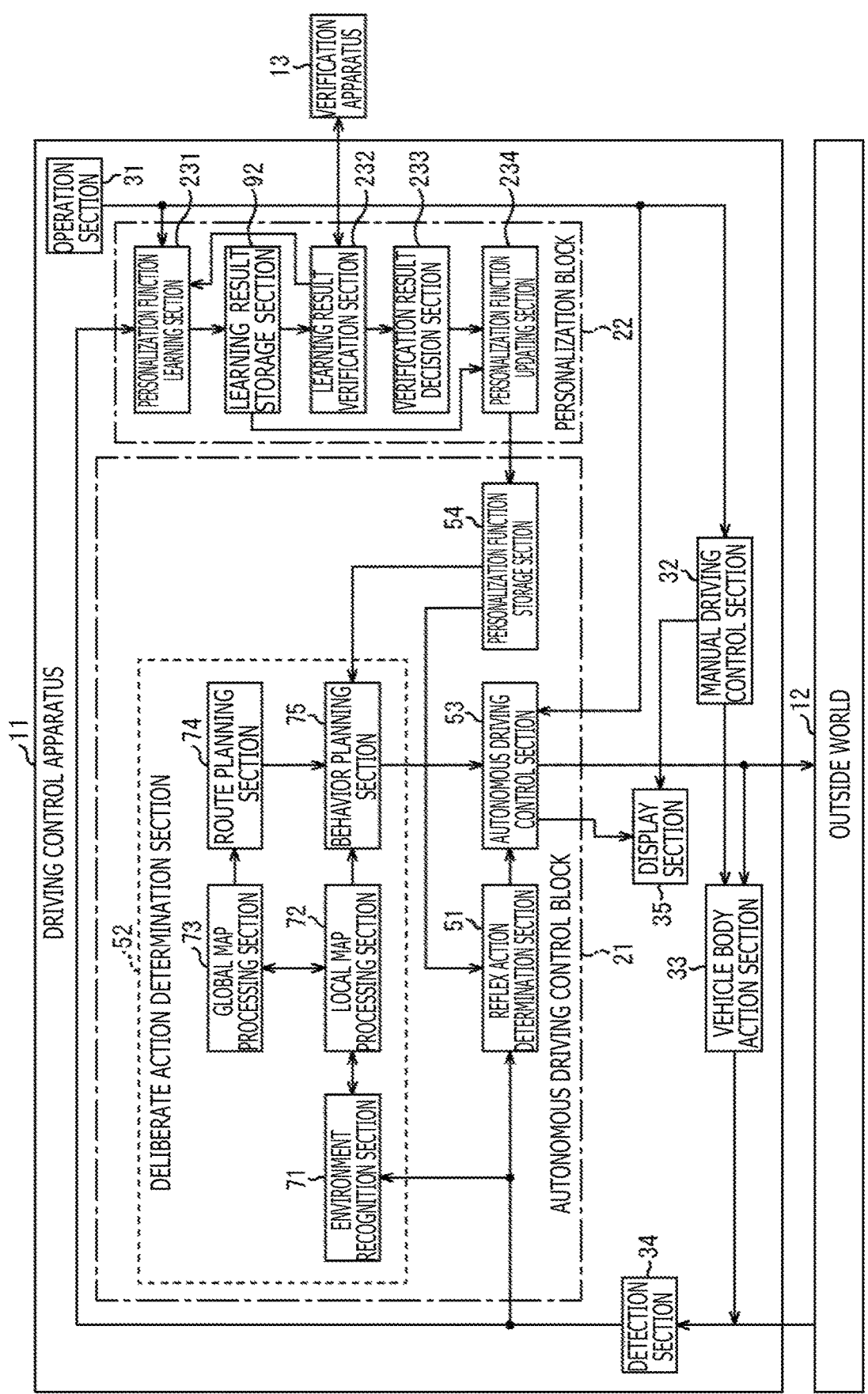
FIG. 23 is a diagram describing a second modification example of the driving control apparatus to which the present disclosure is applied.

That is, the driving control apparatus 11 depicted in FIG. 23 differs from the driving control apparatus 11 depicted in FIG. 19 in that a personalization function learning section 231, a learning result verification section 232, and a verification result decision section 233, and a personalization function updating section 234 rather than the personalization function learning section 211, the learning result storage section 212, the verification result decision section 94, and the personalization function updating section 95.

The learning result verification section 232 basically has the same functions as the learning result storage section 212 and further receives verification results, failure data, correct data, and a corrected function sent from the verification apparatus 13 depicted in FIG. 22. At this time, when failure data, correct data, and a corrected function are received together with verification results indicating that there is a problem with the personalization function whose verification has been requested, the learning result verification section 232 feeds the failure data, the correct data, and the corrected function back to the personalization function learning section 231.

The personalization function learning section 231 basically has the same functions as the personalization function learning section 211 and further uses the failure data, the correct data, and the corrected function hereafter for function learning when these pieces of data and the function are acquired from the learning result verification section 232.

Further, the verification result decision section 233 basically has the same functions as the verification result decision section 94 and further makes a decision as to updating of the personalization function based on the verification result of a corrected function when a corrected function is sent together, and updates the personalization function with the corrected function when there is no problem with the verification result.

The personalization function updating section 234 basically has the same functions as the personalization function updating section 95 and further updates the associated personalization function stored in the personalization function storage section 54 with the corrected function with the corrected function when there is no problem with the verification result of the corrected function.

<Verification Process Handled by the Verification Apparatus Depicted in FIG. 22>

Figure 24:
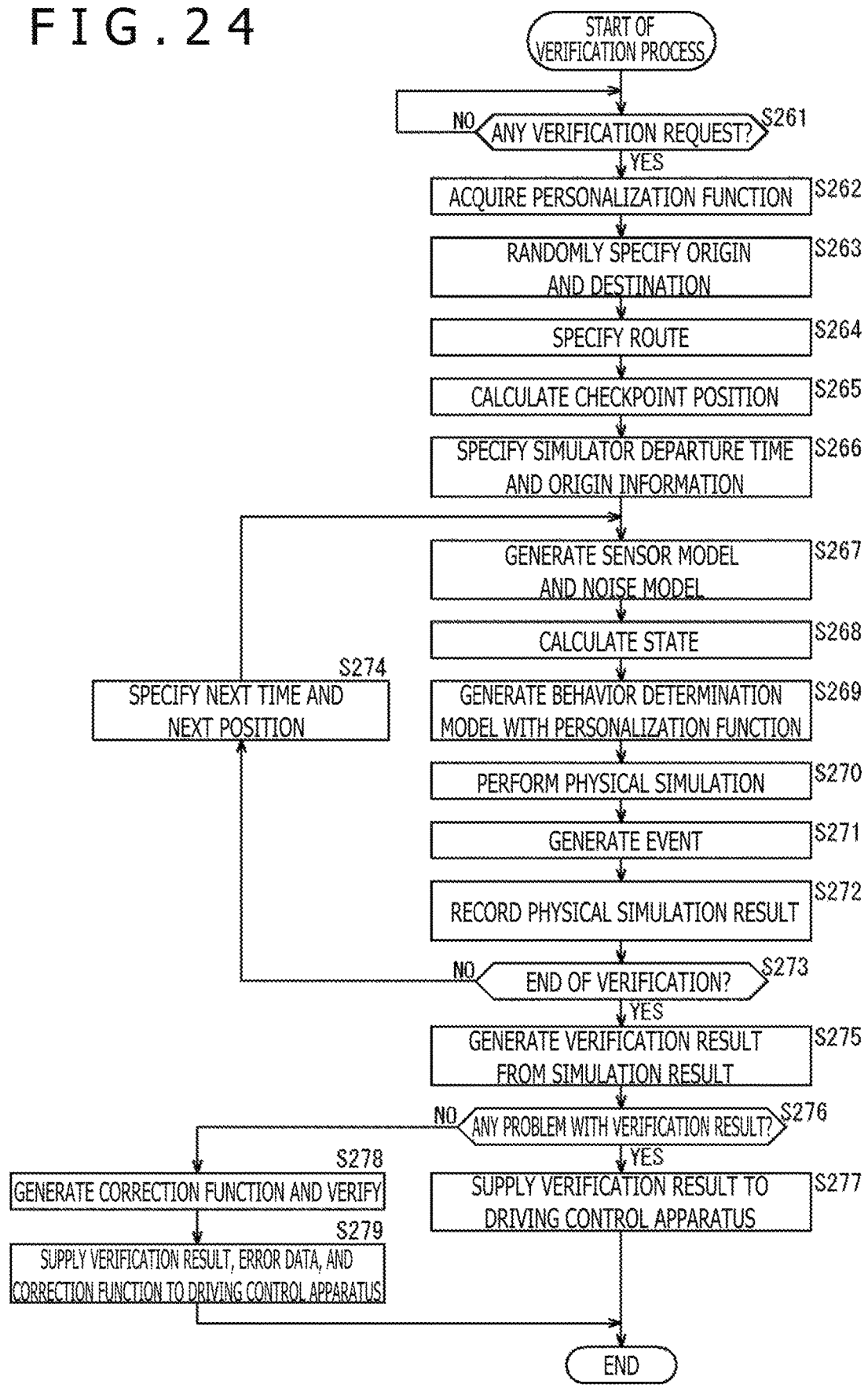
FIG. 24 is a flowchart describing the verification process handled by the verification apparatus depicted in FIG. 22.

A description will be given here of the verification process for generating a corrected function obtained by correcting a personalization function by retraining if there is a problem with a verification result with reference to the flowchart depicted in FIG. 24. It should be noted that because the processes in steps S261 to S275 and step S277 in FIG. 20 are the same as those in steps S161 to S176 in FIG. 17, the description thereof will be omitted as appropriate.

That is, in step S276, the verification section 221 decides whether or not there is any problem with the verification result. Here, if there is a problem with the verification result, the process proceeds to step S278.

In step S278, the verification section 221 corrects the personalization function by subjecting it to retraining (relearning), generates a corrected function, and further verifies the corrected function.

In step S279, the verification section 190 supplies failure data and the corrected function to the driving control apparatus 11 together with the verification result of the corrected function.

It should be noted that there is a possibility that the corrected function may not necessarily reach a safe level depending on the amount of learning. However, a state is created in which learning required to achieve a perfect corrected function is performed to a certain extent. Therefore, it is possible to improve learning efficiency by taking advantage of the corrected function.

As a result of the above process, it is possible to supply not only a verification result but also failure data and a corrected function to the driving control apparatus 11.

<Personalization Function Updating Process Handled by the Driving Control Apparatus Depicted in FIG. 23>

Figure 25:
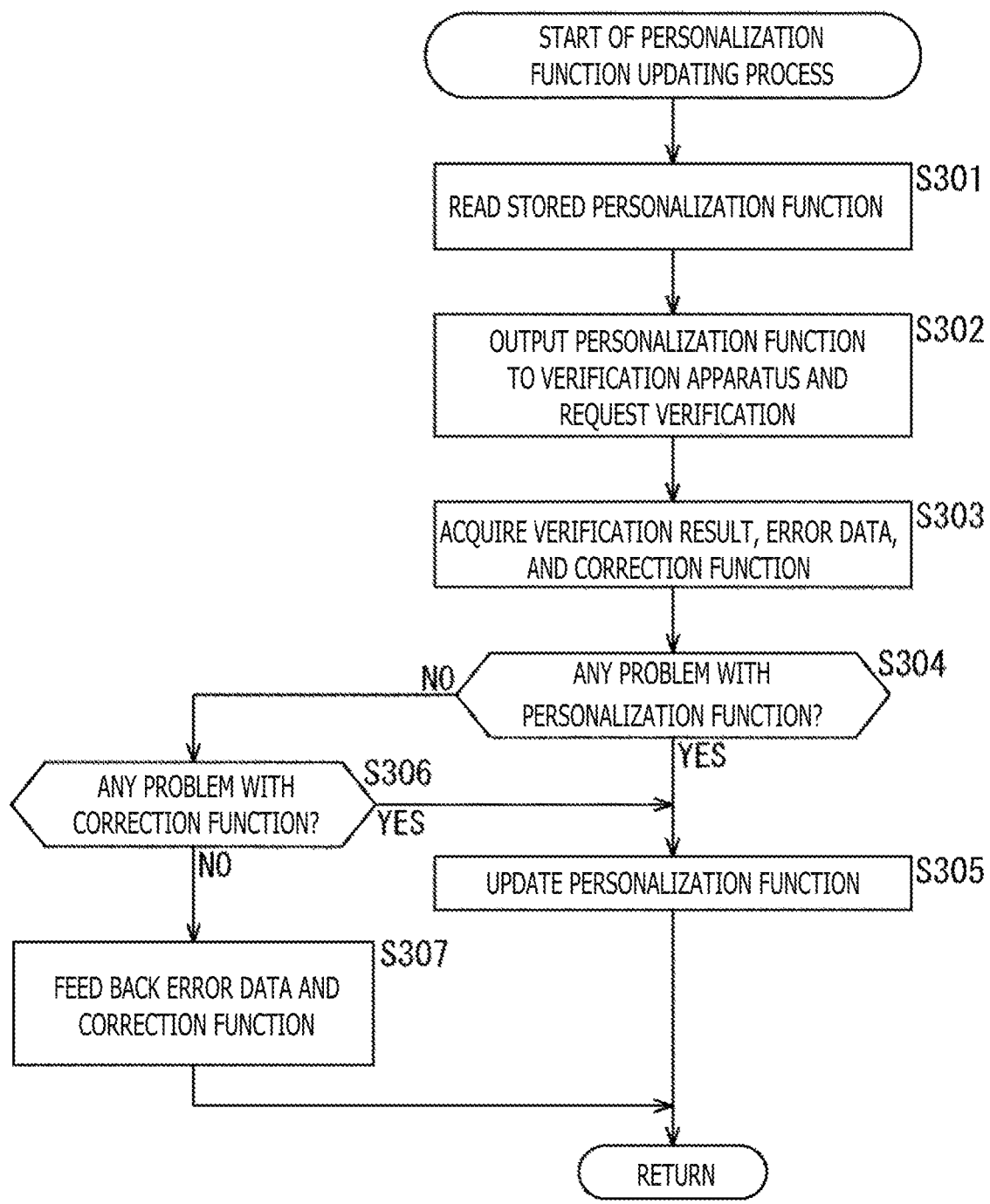
FIG. 25 is a flowchart describing the personalization function updating process handled by the driving control apparatus depicted in FIG. 23.

A description will be given next of the personalization function updating process handled by the driving control apparatus 11 when failure data and a corrected function are sent together with a verification result with reference to the flowchart depicted in FIG. 25. It should be noted that because the processes in steps S301, S302, S304, and S305 in FIG. 21 are the same as those in steps S141, S142, S144, and S145 in FIG. 14, the description thereof will be omitted as appropriate.

That is, in step S303, the learning result verification section 232 acquires failure data and a corrected function together with a verification result.

Then, in step S304, if the verification result decision section 233 decides that there is a problem with the personalization function, the process proceeds to step S306.

In step S306, the verification result decision section 233 decides whether or not there is a problem with the corrected function. If it is decided in step S306 that there is a problem, the process proceeds to step S307.

In step S307, the learning result verification section 232 supplies the failure data and the corrected function to the personalization function learning section 231 for feedback.

The above process allows for relearning. Further, learning is advanced to a certain extent, thereby making it possible to improve learning efficiency.

On the other hand, in step S306, when there is no problem with the corrected function, the process proceeds to step S305. That is, in this case, in step S305, the personalization function updating section 234 updates the associated personalization function stored in the personalization function storage section 54 with the corrected function sent.

As a result of the above process, if there is a problem with the personalization function following the verification by the verification apparatus 13, a corrected function is found by retraining. When there is no problem with the corrected function found, the driving control apparatus 11 can update the personalization function immediately.

Also, even when the corrected function is not perfect, it is possible to subject the function to relearning using a corrected function whose learning is advanced to a certain extent and failure data, thereby allowing for improved learning efficiency.

4. First Application Example

The technology according to the present disclosure is applicable to a variety of products. For example, the technology according to the present disclosure may be realized as an apparatus mounted to one of motor vehicle, electric vehicle, hybrid electric vehicle, motorcycle, and so on.

Figure 26:
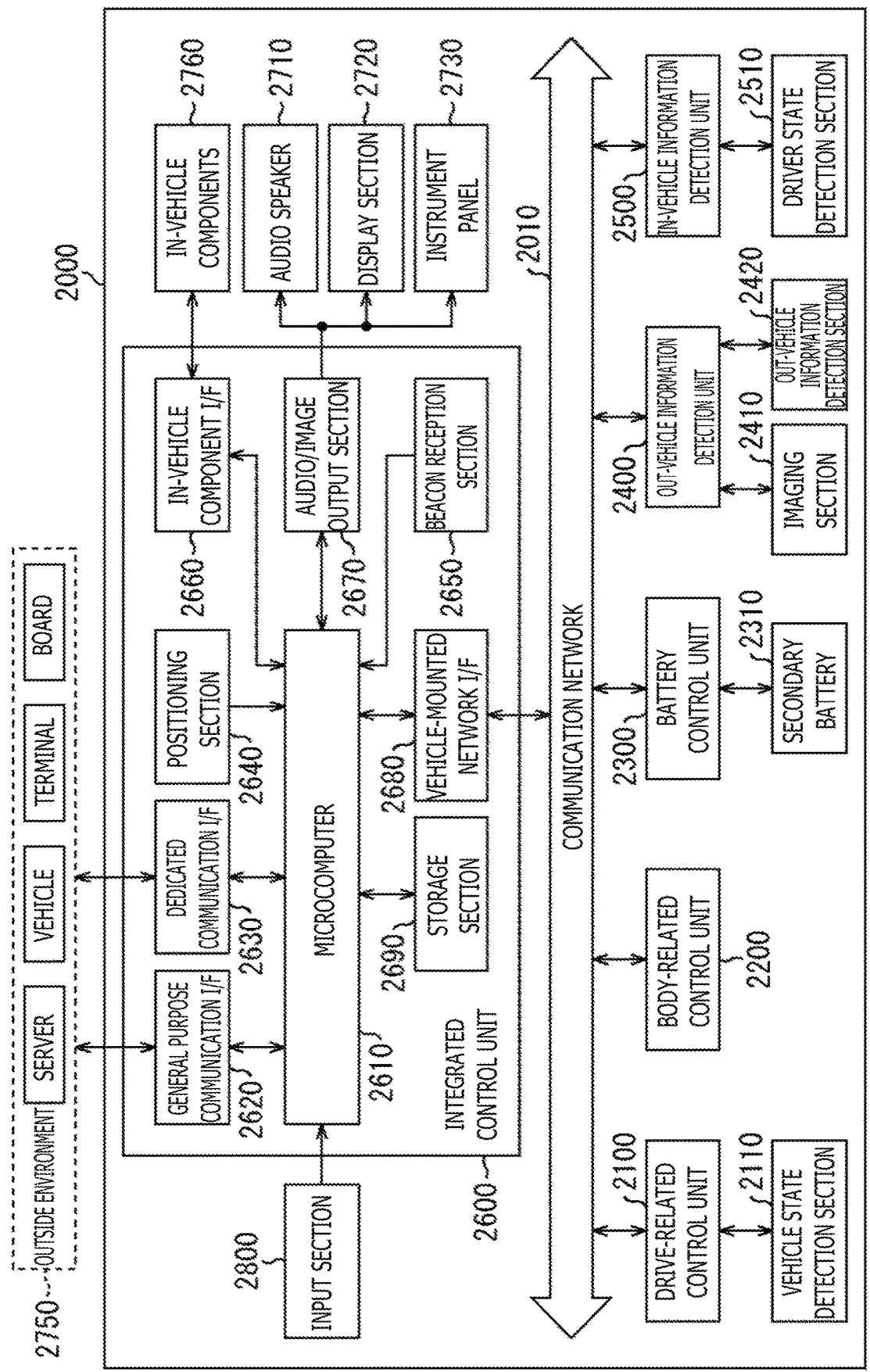
FIG. 26 is an explanatory diagram illustrating an example of positions where an out-vehicle information detection section and an imaging section are installed.

FIG. 26 is a block diagram illustrating a schematic configuration of a motor vehicle control system 2000 to which the technology according to the present disclosure is applicable. The motor vehicle control system 2000 includes a plurality of electronic control units connected via a communication network 2010. In the example depicted in FIG. 26, the motor vehicle control system 2000 includes a drive-related control unit 2100, a body-related control unit 2200, a battery control unit 2300, out-vehicle information detection unit 2400, an in-vehicle information detection unit 2500, and an integrated control unit 2600. The communication network 2010 that connects the plurality of these control units may be an on-vehicle communication network such as CAN (Controller Area Network), LIN (Local Interconnect Network), LAN (Local Area Network) and FlexRay (registered trademark) compliant with an arbitrary standard.

Each control unit includes a microcomputer, a storage section, and a drive circuit. The microcomputer handles operations according to a variety of programs. The storage section stores programs executed by the microcomputer or parameters used for various operations, and so on. The drive circuit drives various apparatuses to be controlled. Each control unit includes not only a network I/F for communication with other control units via the communication network 2010 but also a communication I/F for communication with in- and out-vehicle apparatuses or sensors in a wired or wireless fashion. In FIG. 26, a microcomputer 2610, a general-purpose communication I/F 2620, a dedicated communication I/F 2630, a positioning section 2640, a beacon reception section 2650, an in-vehicle apparatus I/F 2660, an audio/video output section 2670, an on-vehicle network I/F 2680, and a storage section 2690 are depicted as functional components of the integrated control unit 2600. Other control units similarly include a microcomputer, a communication I/F, a storage section, and so on.

The drive-related control unit 2100 controls the action of the drive-related apparatuses of the motor vehicle in accordance with various programs. For example, the drive-related control unit 2100 functions as a control apparatus of a driving force generating apparatus for generating a driving force of a motor vehicle such as internal combustion engine and drive motor, a driving force transmission mechanism for transmitting a driving force to the wheels, a steering mechanism for adjusting the steering angle of a motor vehicle, and Zc a for generating a braking force of a motor vehicle. The drive-related control unit 2100 may also have functions as a control apparatus such as ABS (Antilock Brake System) or an ESC (Electronic Stability Control).

A vehicle state detection section 2110 is connected to the drive-related control unit 2100. The vehicle state detection section 2110 includes, for example, at least one of a gyrosensor for detecting the angular speed of axial rotational motion of a vehicle body, an acceleration sensor for detecting the acceleration of a motor vehicle, and a sensor for detecting the amount of depression of the accelerator pedal, the amount of depression of the brake pedal, the steering angle of the steering wheel, engine revolutions per minute, wheel rotational speed, and so on. The drive-related control unit 2100 performs operations using signals input from the vehicle state detection section 2110, thereby controlling the internal combustion engine, the drive motor, the electric power steering apparatus, or the brake apparatus.

The body-related control unit 2200 controls the action of various apparatuses provided on the vehicle body in accordance with various programs. For example, the body-related control unit 2200 functions as a control apparatus of a keyless entry system, a smart key system, and a power window apparatus or various lamps such as headlights, rear lights, brake lamp, turn signals, or fog lamp. In this case, radio waves emitted from a portable transmitter that replaces a key or various switch signals can be input to the body-related control unit 2200. The body-related control unit 2200 accepts these radio wave and signal inputs and controls the motor vehicle's door lock apparatus, power window apparatus, lamps, and so on.

The battery control unit 2300 controls a secondary battery 2310, a power supply source of the drive motor, in accordance with various programs. For example, battery temperature, battery output voltage, remaining battery charge, or other information is input to the battery control unit 2300 from a battery apparatus having the secondary battery 2310. The battery control unit 2300 performs arithmetic processing using these signals, thereby controlling temperature control over the secondary battery 2310, a cooling apparatus provided on the battery apparatus, or other apparatus.

The out-vehicle information detection unit 2400 detects information outside a motor vehicle equipped with the motor vehicle control system 2000. For example, at least one of an imaging section 2410 and an out-vehicle information detection section 2420 is connected to the out-vehicle information detection unit 2400. The imaging section 2410 includes at least one of a ToF (Time Of Flight) camera, a stereo camera, a monocular camera, an infrared camera, and other cameras. The out-vehicle information detection section 2420 includes, for example, an environment sensor that detects current weather or climate or a surrounding information detection sensor that detects other vehicles, obstacles, pedestrians, or others around the motor vehicle equipped with the motor vehicle control system 2000.

The environment sensor may be, for example, one of a rain drop sensor that detects rainy weather, a fog sensor that detects fog, a sunlight sensor that detects sunlight level, and a snow sensor that detects snowfall. The surrounding information detection sensor may be one of an ultrasonic sensor, a radar apparatus, and an LIDAR (Light Detection and Ranging, Laser Imaging Detection and Ranging) apparatus. These imaging section 2410 and out-vehicle information detection section 2420 may be included as separate sensors or apparatuses or as an integrated apparatus included a plurality of sensors or apparatuses.

Figure 27:
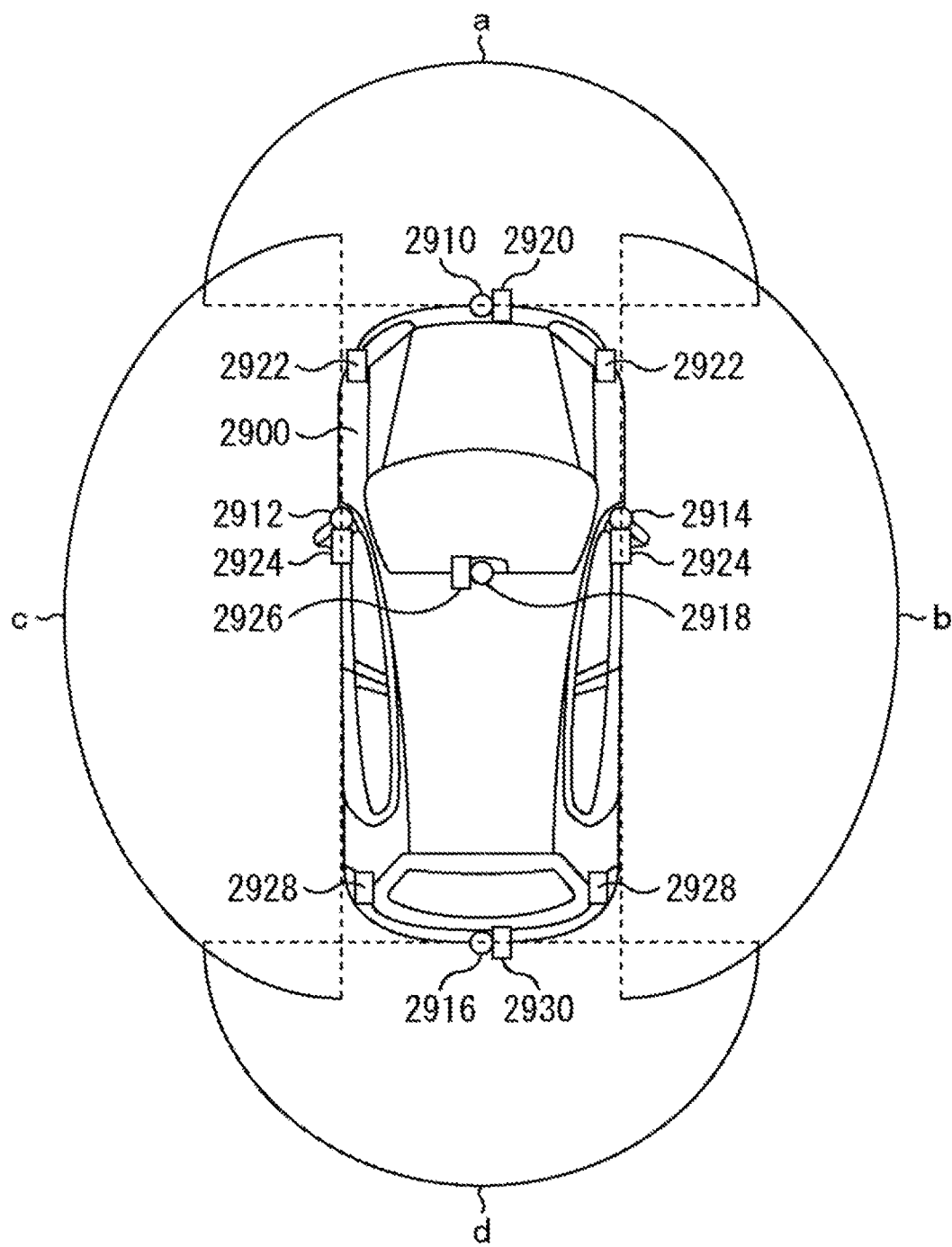
FIG. 27 is a diagram describing a low power consumption action of a reception action section of an existing receiver.

Here, FIG. 27 illustrates examples of installation positions of the imaging section 2410 and the out-vehicle information detection section 2420. Imaging sections 2910, 2912, 2914, 2916, and 2918 are provided, at least one on a front nose, side mirrors, a rear bumper, a back door, and a top of a front glass in a compartment. The imaging section 2910 provided on the front nose and the imaging section 2918 provided on the top of the front glass in the compartment acquire mainly front images of a motor vehicle 2900. The imaging sections 2912 and 2914 provided on the side mirrors acquire mainly side images of the motor vehicle 2900. The imaging sections 2916 provided on the rear bumper or the back door acquire mainly rear images of the motor vehicle 2900. The imaging section 2918 provided on the top of the front glass in the compartment is used mainly to detect motor vehicles ahead, pedestrians, obstacles, traffic lights, traffic signs, or driving lanes.

It should be noted that FIG. 27 illustrates examples of imaging ranges of the imaging sections 2910, 2912, 2914, and 2916. An imaging range 'a' depicts the imaging range of the imaging section 2910 provided on the front nose. Imaging ranges 'b' and 'c' depict the imaging ranges of the imaging sections 2912 and 2914 provided on the side mirrors. An imaging range 'd' depicts the imaging range of the imaging section 2916 provided on the rear bumper or the back door. For example, superimposing image data, captured by the imaging sections 2910, 2912, 2914, and 2916, one on top of the other, provides a bird's eye view image as seen from above the motor vehicle 2900.

Out-vehicle information detection sections 2920, 2922, 2924, 2926, 2928, and 2930 provided on the front, the rear, the sides, corners, and on the top of the front glass in the compartment of the motor vehicle 2900 may be, for example, ultrasonic sensors or radar apparatuses. The out-vehicle information detection sections 2920, 2926, and 2930 provided on the front nose, the rear bumper, the back door, and on the top of the front glass in the compartment of the motor vehicle 2900 may be, for example, LIDAR apparatuses. These out-vehicle information detection sections 2920 to 2930 are used mainly to detect motor vehicles ahead, pedestrians, obstacles, or others.

A description will continue with reference back to FIG. 26. The out-vehicle information detection unit 2400 causes the imaging section 2410 to capture images outside the vehicle and receives captured image data. Also, the out-vehicle information detection unit 2400 receives detection information from the connected out-vehicle information detection section 2420. When the out-vehicle information detection section 2420 is an ultrasonic sensor, a radar apparatus, or an LIDAR apparatus, the out-vehicle information detection unit 2400 causes an ultrasonic wave, an electromagnetic wave, or other wave to be emitted and receives information about a received reflected wave. The out-vehicle information detection unit 2400 may perform an object detection process for detecting persons, vehicles, obstacles, signs, characters on the road, or others or a distance detection process based on the received information. The out-vehicle information detection unit 2400 may perform an environment recognition process for detecting rainfall, fog, road surface condition or others based on the received information. The out-vehicle information detection unit 2400 may calculate a distance to an object outside the vehicle based on the received information.

Also, the out-vehicle information detection unit 2400 may perform an object recognition process for recognizing persons, vehicles, obstacles, signs, characters on the road, or others or a distance detection process based on the received information. The out-vehicle information detection unit 2400 may generate a bird's eye view image or a panoramic image by performing distortion correction, position alignment, or other process on the received image data and combine the data with image data captured by the different imaging section 2410. The out-vehicle information detection unit 2400 may perform a viewpoint conversion process using image data captured by the different imaging section 2410.

The in-vehicle information detection unit 2500 detects in-vehicle information. For example, a driver state detection section 2510 that detects the driver's state is connected to the in-vehicle information detection unit 2500. The driver state detection section 2510 may be a camera that images the driver, a biological sensor that detects biological information of the driver, a microphone that collects audio in the compartment, or other apparatus. A biological sensor is provided, for example, on a seat surface, the steering wheel, or other location to detect biological information of a passenger sitting on the seat or the driver holding the steering wheel. The in-vehicle information detection unit 2500 may calculate fatigue level or concentration level of the driver based on detection information input from the driver state detection section 2510. Whether the driver is drowsing may be decided. The in-vehicle information detection unit 2500 may subject a collected audio signal to a noise canceling process or other process.

The integrated control unit 2600 controls the actions within the motor vehicle control system 2000 as a whole in accordance with various programs. An input section 2800 is connected to the integrated control unit 2600. The input section 2800 is realized, for example, by a touch panel, buttons, a microphone, switches, levers, or others on which input operation can be made. The input section 2800 may be, for example, a remote control apparatus based on infrared radiation or other radio waves or an external connection apparatus such as mobile phone, PDA (Personal Digital Assistant), or others capable of manipulating the motor vehicle control system 2000. The input section 2800 may be, for example, a camera, and in this case, a passenger can input information by gesture. Further, the input section 2800 may include an input control circuit that generates an input signal based on the above information input by a passenger or others by using the input section 2800 and outputs the input signal to the integrated control unit 2600. Passengers and so on input various data to the motor vehicle control system 2000 and instruct the motor vehicle control system 2000 to process data.

The storage section 2690 may include a RAM (Random Access Memory) that stores various programs executed by a microcomputer and a ROM (Read Only Memory) that stores various parameters, operation results, sensor values, and other data. Also, the storage section 2690 may be realized by a magnetic storage device such as HDD (Hard Disc Drive), semiconductor storage device, optical storage device, magneto-optical storage device, or other device.

The general-purpose communication I/F 2620 is a general-purpose communication interface that intermediates communication with various apparatuses existing in an outside environment 2750. A cellular communication protocol such as GSM (registered trademark) (Global System of Mobile communications), WiMAX, LTE (Long Term Evolution), or LTE-A (LTE-Advanced) or other wireless communication protocol such as wireless LAN (also referred to as Wi-Fi (registered trademark)) may be implemented in the general-purpose communication I/F 2620. The general-purpose communication I/F 2620 may connect, for example, to an apparatus (e.g., application server or control server) existing on an external network (e.g., Internet, cloud network, or carrier's own network) via a base station and an access point. Also, the general-purpose communication I/F 2620 may connect to a terminal existing near the motor vehicle (e.g., pedestrian's or shop's terminal or MTC (Machine Type Communication) terminal) by using, for example, P2P (Peer To Peer) technology.

The dedicated communication I/F 2630 is a communication protocol that supports a communication protocol developed to be used in motor vehicles. A standard protocol such as WAVE (Wireless Access in Vehicle Environment), a combination of IEEE802.11p, a lower layer, and IEEE1609, an upper layer, or DSRC (Dedicated Short Range Communications), for example, may be implemented in the dedicated communication I/F 2630. The dedicated communication I/F 2630 typically carries out V2X communication, a concept that includes one or more of vehicle to vehicle communication, vehicle to infrastructure communication, and vehicle to pedestrian communication.

The positioning section 2640 carries out positioning by receiving a GNSS signal (e.g., GPS signal from GPS (Global Positioning System) satellite) from a GNSS (Global Navigation Satellite System) satellite and generates position information including longitude, latitude, and altitude of the motor vehicle. It should be noted that the positioning section 2640 may identify the current position by exchanging signals with wireless access points or acquire position information from a terminal such as mobile phone, PHS, or smartphone.

The beacon reception section 2650 acquires current position, traffic jams, road closures, required time, or other information by receiving radio waves or electromagnetic waves emitted from wireless stations or other apparatuses installed on roads. It should be noted that the functions of the beacon reception section 2650 may be included in the dedicated communication I/F 2630.

The in-vehicle apparatus I/F 2660 is a communication interface that intermediates communication between the microcomputer 2610 and various pieces of equipment existing in the vehicle. The in-vehicle apparatus I/F 2660 may establish wireless connection by using a wireless communication protocol such as wireless LAN, Bluetooth (registered trademark), NFC (Near Field Communication), or WUSB (Wireless USB). Also, the in-vehicle apparatus I/F 2660 may establish wired connection by using a connection terminal which is not depicted (and a cable if required). The in-vehicle apparatus I/F 2660 exchanges control signals or data signals, for example, with a mobile apparatus or a wearable apparatus of a passenger, or an information apparatus carried into or installed in the motor vehicle.

The on-vehicle network I/F 2680 is an interface that intermediates communication between the microcomputer 2610 and the communication network 2010. The on-vehicle network I/F 2680 sends and receives signals and others according to a given protocol supported by the communication network 2010.

The microcomputer 2610 of the integrated control unit 2600 controls the motor vehicle control system 2000 in accordance with various programs based on information acquired via at least one of the general-purpose communication I/F 2620, the dedicated communication I/F 2630, the positioning section 2640, the beacon reception section 2650, the in-vehicle apparatus I/F 2660, and the on-vehicle network I/F 2680. For example, the microcomputer 2610 may calculate a control target value of the driving force generating apparatus, the steering mechanism, or the brake apparatus on the basis of in-vehicle and out-vehicle information acquired, and may output instruction of control with respect to the drive-related control unit 2100. For example, the microcomputer 2610 may perform cooperative control for motor vehicle collision avoidance, or impact alleviation, follow-up traveling based on vehicle-to-vehicle distance, constant vehicle speed traveling, autonomous driving, and so on.

The microcomputer 2610 may create local map information including information around the current position of the motor vehicle on the basis of information acquired via at least one of the general-purpose communication I/F 2620, the dedicated communication I/F 2630, the positioning section 2640, the beacon reception section 2650, the in-vehicle apparatus I/F 2660, and the on-vehicle network I/F 2680. Also, the microcomputer 2610 may predict risks such as collision of the motor vehicle, approaching pedestrian, and entry into a closed road and generate a warning signal. A warning signal may be a signal that causes a warning tone to be produced or a warning lamp to be lit.

The audio/video output section 2670 sends at least either an audio or video output signal to an output apparatus that is capable of visually or auditorily notifying information to the motor vehicle's passenger or outside of the vehicle. In the example depicted in FIG. 26, an audio speaker 2710, a display section 2720, and an instrument panel 2730 are depicted as output apparatuses. The display section 2720 may include, for example, at least one of an on-board display and a head-up display. The display section 2720 may include an AR (Augmented Reality) display function. The output apparatus may be an apparatus other than the above such as headphone, projector, or lamp. When the output apparatus is a display apparatus, the display apparatus visually displays results obtained by various processes performed by the microcomputer 2610 or information received from other control units in various forms such as text, image, table, and graph. Also, when the output apparatus is an audio output apparatus, the audio output apparatus converts an audio signal made up of audio data, acoustic data, or other data into an analog signal and auditorily outputs the analog signal.

It should be noted that, in the example depicted in FIG. 26, at least two control units connected via the communication network 2010 may be combined into a single control unit. Alternatively, each control unit may include a plurality of control units. Further, the motor vehicle control system 2000 may include a separate control unit that is not depicted. Also, in the description given above, some or all of the functions assumed by any of the control units may be assumed by other control unit. That is, as long as information is sent and received via the communication network 2010, given arithmetic processing may be performed by one of the control units. Similarly, a sensor or apparatus connected to one of the control units may be connected to other control unit so that the plurality of control units mutually send and receive detection information via the communication network 2010.

In the motor vehicle control system 2000 described above, the driving control apparatus 11 according to the present embodiment described using FIG. 1 is applicable to the integrated control unit 2600 of the application example depicted in FIG. 26. For example, the autonomous driving control block 21, the personalization block 22, and the manual driving control section 32 of the driving control apparatus 11 depicted in FIG. 1 correspond to the microcomputer 2610, the storage section 2690, and the on-vehicle network I/F 2680 of the integrated control unit 2600. For example, the integrated control unit 2600 can realize autonomous driving safely by functioning as the autonomous driving control block 21. Also, the personalization block 22 can realize autonomous driving tailored to preferences of each user by learning a personalization function.

Also, at least some of the components of the driving control apparatus 11 described using FIG. 1 may be realized in a module (e.g., integrated circuit module configured on a single die) for the integrated control unit 2600 depicted in FIG. 26. Alternatively, the driving control apparatus 11 described using FIG. 1 may be realized by the plurality of control units of the motor vehicle control system 2000 depicted in FIG. 26. That is, the detection section 34 may be realized by at least one of the out-vehicle information detection unit 2400 and the in-vehicle information detection unit 2500 of the motor vehicle control system 2000 depicted in FIG. 26.

It should be noted that computer programs for realizing the respective functions of the driving control apparatus 11 described using FIG. 1 can be implemented in one of the control units. Also, a computer-readable recording medium storing such computer programs can be provided. The recording medium is, for example, a magnetic disk, an optical disc, a magneto-optical disc, a flash memory, and so on. Also, the above computer programs may be delivered, for example, via a network rather than using a recording medium.

5. Second Application Example

<Example of Performing the Processes by Software>

Incidentally, the series of processes described above can be performed not only by hardware but also by software. When the series of processes are performed by software, the program making up the software is installed to a computer built into dedicated hardware, a general-purpose personal computer capable of performing various functions as various programs are installed thereto, and so on from a recording medium.

Figure 28:
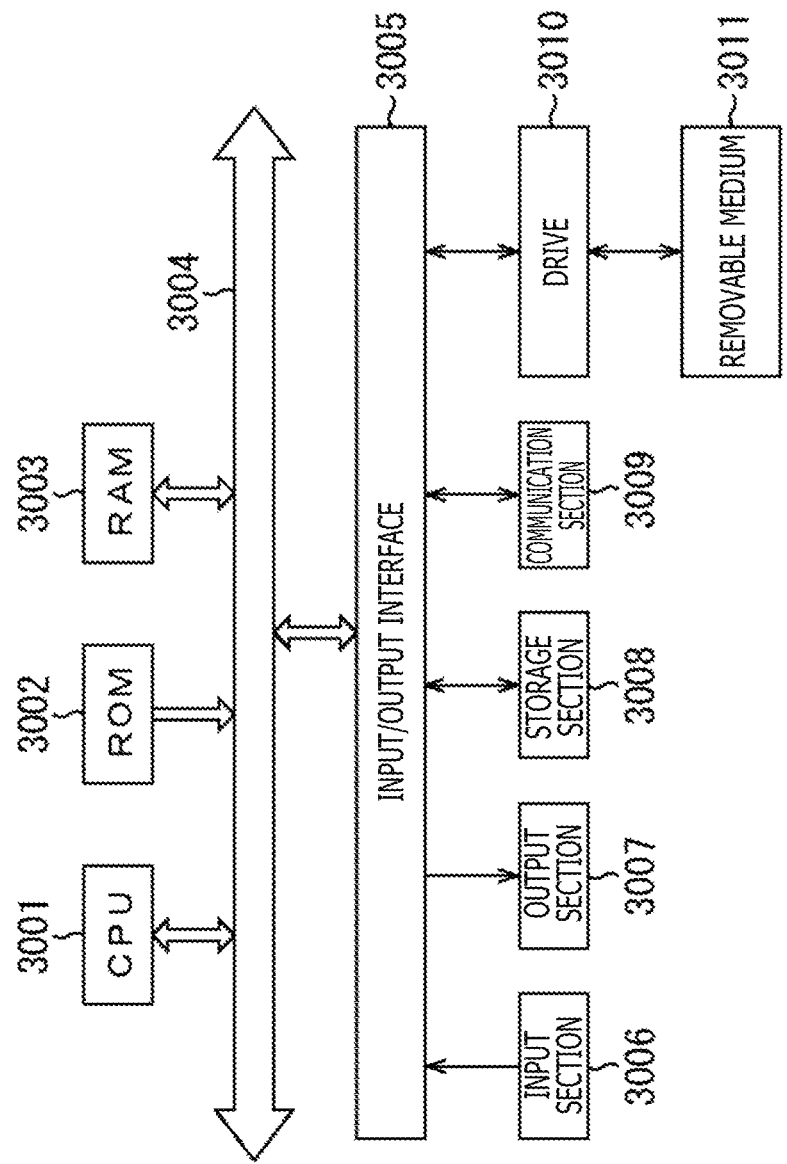
FIG. 28 is a diagram illustrating a configuration example of a general-purpose personal computer.

FIG. 28 illustrates a configuration example of a general-purpose personal computer. This personal computer has a CPU (Central Processing Unit) 3001 built thereinto. An I/O interface 3005 is connected to the CPU 3001 via a bus 3004. A ROM (Read Only Memory) 3002 and a RAM (Random Access Memory) 3003 are connected to the I/O interface 3005.

An input section 3006, an output section 3007, a storage section 3008, and a communication section 3009 are connected to the I/O interface 3005. The input section 3006 includes a keyboard, a mouse, and other input devices from which the user inputs operation commands. The output section 3007 outputs processing operation screens and processing result images. The storage section 3008 includes a hard disk drive and so on that stores programs and various data. The communication section 3009 includes a LAN (Local Area Network) adapter and so on that handles communication processes via a network, typically the Internet. A drive 3010 is also connected to the I/O interface 3005. The drive 3010 reads data from and writes data to a removable medium 3011 such as magnetic disk (including flexible disk), optical disc (including CD-ROM (Compact Disc-Read Only Memory), DVD (Digital Versatile Disc), magneto-optical disk (MD (Mini Disc)), or semiconductor memory.

The CPU 3001 performs various processes in accordance with the program stored in the ROM 3002 or the program read from the removable medium 3011 such as magnetic disk, optical disc, magneto-optical disk, or semiconductor memory, installed in the storage section 3008, and loaded into the RAM 3003 from the storage section 3008. Data required for the CPU 3001 to perform various processes is also stored in the RAM 3003 as appropriate.

In the computer configured as described above, the series of processes described above are performed as the CPU 3001 loads, for example, the program stored in the storage section 3008 into the RAM 3003 via the I/O interface 3005 and the bus 3004 for execution.

The program executed by the computer (CPU 3001) can be provided, for example, recorded on the removable medium 3011 as a package medium. Alternatively, the program can be provided via a wired or wireless transmission medium such as local area network, the Internet, or digital satellite broadcasting.

In the computer, the program can be installed to the storage section 3008 via the I/O interface 3005 as the removable recording medium 3011 is inserted into the drive 3010. Also, the program can be received by the communication section 3009 via a wired or wireless transmission medium such as a local area network, the Internet, or digital satellite broadcasting and installed to the storage section 3008. In addition to the above, the program can be installed, in advance, to the ROM 3002 or the storage section 3008.

It should be noted that the program executed by the computer may be a program that performs the processes chronologically according to the sequence described in the present specification, or in parallel, or at a necessary time as when the program is called.

Also, in the present specification, a system refers to a set of a plurality of components (e.g., apparatuses, modules (parts)), and it does not matter whether or not all the components are accommodated in the same housing. Therefore, a plurality of apparatuses accommodated in different housings and connected via a network and a single apparatus having a plurality of modules accommodated in a single housing are both systems.

It should be noted that embodiments of the present disclosure are not limited to that described above and can be modified in various ways without departing from the gist of the present disclosure.

For example, the present disclosure can have a cloud computing configuration in which a single function is shared among a plurality of apparatuses and processed in a collaborative manner via a network.

Also, each of the steps described in the flowcharts may be not only performed by a single apparatus but also shared and performed by a plurality of apparatuses.

Further, when a plurality of processes are included in a single step, the plurality of processes included in that single step can be not only performed by a single apparatus but also shared and performed by a plurality of apparatuses.

It should be noted that the present disclosure can have the following configurations:

<1> A driving control apparatus including:
 a detection section adapted to detect a condition of a moving object;
 a deliberate action determination section adapted to determine an action of the moving object as a deliberate action on the basis of a detection result of the detection section;
 a reflex action determination section adapted to determine, on the basis of the detection result of the detection section, an action of the moving object in a shorter time period than a process carried out by the deliberate action determination section; and
 an action control section adapted to control the action of the moving object on the basis of the deliberate action and a reflex action determined by the reflex action determination section.

<2> The driving control apparatus of feature <1>, in which the deliberate action determination section includes:
 a local processing section adapted to extract local information around the moving object on the basis of the detection result of the detection section;
 a global processing section adapted to extract global information in a wider area than around the moving object on the basis of the detection result of the detection section; and
 a behavior determination section adapted to determine an action on the basis of the local information and the global information.

<3> The driving control apparatus of feature <1>, in which the action control section performs control such that if a conflict occurs between the deliberate action and the reflex action, the occurrence of the conflict is presented.

<4> The driving control apparatus of feature <3>, in which the action control section resolves the conflict in response to input from the driver and controls the action of the moving object on the basis of the deliberate action and the reflex action.

<5> The driving control apparatus of feature <1>, in which the action control section stores a plurality of resolution modes in advance to deal with a conflict between the deliberate action and the reflex action, resolves the conflict in accordance with one of the plurality of resolution modes, and controls the action of the moving object on the basis of the deliberate action and the reflex action.

<6> The driving control apparatus of feature <5>, in which the resolution modes include:
 a first resolution mode that gives priority to the deliberate action or the reflex action;
 a second resolution mode that selects 'first come priority' or 'replace with last come' between the deliberate action and the reflex action;
 a third resolution mode that gives priority to the deliberate action or the reflex action, whichever is higher in terms of command priority level or action environment certainty level;
 a fourth resolution mode that takes a weighted average or majority decision using both the deliberate action and the reflex action;
 a fifth resolution mode that adds the fact that the deliberate action and the reflex action are opposed to each other to the input so that recalculation is performed by the two;
 a sixth resolution mode that gives priority to the priority level of the command itself for the deliberate action and the reflex action;
 a seventh resolution mode that stops the vehicle without issuing either of the deliberate action or the reflex action or maintains the current state; and
 an eighth resolution mode that allows the driver of the moving object to intervene.

<7> The driving control apparatus of feature <6>, in which the action control section displays a slide bar that can be operated to specify a parameter that is used when the deliberate action and the reflex action are determined and controls the action of the moving object on the basis of the deliberate action and the reflex action determined by using the parameter whose value is proportional to the position of the slide bar operated by the driver.

<8> The driving control apparatus of feature <1>, in which the action control section controls the action during autonomous driving control of the moving object on the basis of the deliberate action and the reflex action.

<9> A driving control method including the steps of:
 detecting a condition of a moving object;
 determining an action of the moving object as a deliberate action on the basis of a detection result of the condition of the moving object;
 determining, on the basis of the detection result, an action of the moving object in a shorter time period than a process carried out by the deliberate action determination section; and
 controlling the action of the moving object on the basis of the deliberate action and a reflex action determined in a shorter time period than the process for determining the deliberate action.

<10> A program causing a computer to function as:
 a detection section adapted to detect a condition of a moving object;
 a deliberate action determination section adapted to determine an action of the moving object as a deliberate action on the basis of a detection result of the detection section;
 a reflex action determination section adapted to determine, on the basis of the detection result of the detection section, an action of the moving object in a shorter time period than a process carried out by the deliberate action determination section; and
 an action control section adapted to control the action of the moving object on the basis of the deliberate action and a reflex action determined by the reflex action determination section.

REFERENCE SIGNS LIST

11 Driving control apparatus
12 Outside world
13 Verification apparatus
21 Autonomous driving control block
22 Personalization block
31 Operation section
32 Manual driving control section
33 Vehicle body action section
34 Detection section 51 Reflex action determination section
52 Deliberate action determination section
53 Autonomous driving control section
54 Personalization function storage section
71 Environment recognition section
72 Local map processing section
73 Global map processing section
74 Route planning section
75 Behavior planning section
91 Personalization function learning section
92 Learning result storage section
93 Learning result verification section
94 Verification result decision section
95 Personalization function updating section
181 Origin/destination random setup section
182 Route generation section
183 Checkpoint position calculation section
184 Behavior determination model calculation section
185 Simulator
186 Event generation section
187 State calculation section
188 Sensor model/noise model generation section
189 Recording section
190 Verification section
201 Verification section
211 Personalization function learning section
212 Learning result verification section
221 Verification section
231 Personalization function learning section
232 Learning result verification section
233 Verification result decision section
234 Personalization function updating section

The invention claimed is:

1. An information processing apparatus for a vehicle comprising:
at least one circuit configured to:
detect a condition of the vehicle on the basis of information acquired by an in-vehicle sensor;
determine at least a deliberate operation of the vehicle on the basis of a detection result of the condition of the vehicle and a reflex operation of the vehicle that is determined in a shorter time period than the deliberate operation of the vehicle on the basis of the detection result of the condition of the vehicle; and
control the operation of the vehicle on the basis of the deliberate operation and the reflex operation.

2. The information processing apparatus of claim 1,
wherein the condition of the vehicle includes local information around the vehicle and global information in a wider area than the local information around the vehicle; and
wherein the deliberate operation and the reflex operation are based on the detection result of the condition of the vehicle.

3. The information processing apparatus of claim 1,
wherein the at least one circuit is further configured to:
present, on the basis of a conflict between the deliberate operation and the reflex operation, information of occurrence of the conflict to a user of the vehicle.

4. The information processing apparatus of claim 3,
wherein the conflict is resolved by determining which of the deliberate operation and the reflex operation controls the vehicle on the basis of a user instruction.

5. The information processing apparatus of claim 3,
wherein the conflict is resolved according to at least one of a plurality of resolution modes.

6. The information processing apparatus of claim 5,
wherein the plurality of resolution modes includes a first resolution mode in which the conflict is resolved by prioritizing the deliberate operation or the reflex operation.

7. The information processing apparatus of claim 5,
wherein the plurality of resolution modes includes a second resolution mode in which the conflict is resolved by determining the earlier of the deliberate operation or the reflex operation as the operation of the vehicle.

8. The information processing apparatus of claim 5,
wherein the plurality of resolution modes includes a third resolution mode in which the conflict is resolved by determining the later of the deliberate operation or the reflex operation as the operation of the vehicle.

9. The information processing apparatus of claim 5,
wherein the plurality of resolution modes includes a fourth resolution mode in which the conflict is resolved by determining a higher reliability of the deliberate operation or the reflex operation as the operation of the vehicle.

10. The information processing apparatus of claim 5,
wherein the plurality of resolution modes includes a fifth resolution mode in which the conflict is resolved by taking a weighted average or majority decision using both the deliberate operation and the reflex operation.

11. The information processing apparatus of claim 5,
wherein the plurality of resolution modes includes a sixth resolution mode in which the conflict is resolved by recalculating a result based on the deliberate operation and the reflex operation.

12. The information processing apparatus of claim 5,
wherein the plurality of resolution modes includes a seventh resolution mode in which the conflict is resolved by prioritizing the deliberate operation or the reflex operation on the basis of a priority associated with operation content of the deliberate operation and the reflex operation.

13. The information processing apparatus of claim 5,
wherein the plurality of resolution modes includes an eighth resolution mode in which the conflict is resolved by stopping or continuing the driving without controlling the vehicle on the basis of the deliberate operation and the reflex operation.

14. The information processing apparatus of claim 5, in which the plurality of resolution modes includes a ninth resolution mode in which the conflict is resolved by controlling the vehicle by operation of the user without controlling the vehicle on the basis of the deliberate operation and the reflex operation.

15. The information processing apparatus of claim 1,
wherein a parameter of the deliberate operation and the reflex operation is controlled by a user.

16. The information processing apparatus of claim 1,
wherein the vehicle is controlled in an autonomous driving mode and a manual driving mode; and
wherein, in the autonomous driving mode, the vehicle is controlled on the basis of the deliberate operation and the reflex operation.

17. A control method of an information processing apparatus, the method comprising;
detecting a condition of a vehicle;
determining a deliberate operation of the vehicle on the basis of a detection result of the condition of the vehicle;
determining a reflex operation that is determined in a shorter time period than the deliberate operation of the vehicle on the basis of the detection result of the condition of the vehicle; and controlling the operation of the vehicle on the basis of the deliberate operation and the reflex operation.

18. A non-transitory computer readable medium including executable instructions, which when executed by a computer, cause the computer to execute an information processing method, the method comprising:

detecting a condition of a vehicle;

determining a deliberate operation of the vehicle on the basis of a detection result of the condition of the vehicle;

determining a reflex operation that is determined in a shorter time period than the deliberate operation of the vehicle on the basis of the detection result of the condition of the vehicle; and controlling the operation of the vehicle on the basis of the deliberate operation and the reflex operation.

\* \* \* \* \*